United States Patent [19]
Kojima

[11] Patent Number: 5,876,265
[45] Date of Patent: Mar. 2, 1999

[54] END POINT POLISHING APPARATUS AND POLISHING METHOD

[75] Inventor: Tadayuki Kojima, Kanagawa, Japan

[73] Assignee: Fujitsu Limited, Kawasaki, Japan

[21] Appl. No.: 939,114

[22] Filed: Sep. 26, 1997

Related U.S. Application Data

[63] Continuation-in-part of Ser. No. 637,433, Apr. 25, 1996.

[30] Foreign Application Priority Data

Apr. 26, 1995 [JP] Japan ................................ 7-102574
Sep. 12, 1997 [JP] Japan ................................ 9-249241

[51] Int. Cl.⁶ .................................................. B24B 49/00
[52] U.S. Cl. .................................. 451/10; 451/11; 451/41; 451/285; 451/288; 438/691; 438/692
[58] Field of Search ............................ 451/8, 10, 11, 451/41, 54, 285, 287, 288; 438/690–693; 156/345

[56] References Cited

U.S. PATENT DOCUMENTS 5,222,329  6/1993  Yu .
5,245,794  9/1993  Salugsugan .
5,399,234  3/1995  Yu et al. ..................................... 438/14
5,643,046  7/1997  Ichiro et al. ................................. 451/6
5,667,424  9/1997  Yang ............................................ 451/6

FOREIGN PATENT DOCUMENTS 6-45299 A   2/1994  Japan .
9-150367 A  6/1997  Japan .

*Primary Examiner*—Eileen P. Morgan
*Attorney, Agent, or Firm*—Armstrong, Westerman, Hattori, McLeland & Naughton

[57] ABSTRACT

A polishing apparatus of the present invention comprises an amplifier for amplifying a first signal being input from the vibration detecting device attached on a second surface plate to then output a second signal, a gain indicator for determining unsuitableness of a gain of the amplifier based on a magnitude of the second signal output from the amplifier and then indicating correction of said gain, a gain adjuster for adjusting the gain of the amplifier based on a gain correction signal output from the gain indicator, a polishing end-point analyzing portion for determining an end-point of polishing based on change in the second signal, and a control portion for terminating drive of the first surface plate based on a polishing end-point signal being output from the polishing end-point analyzing portion.

15 Claims, 50 Drawing Sheets

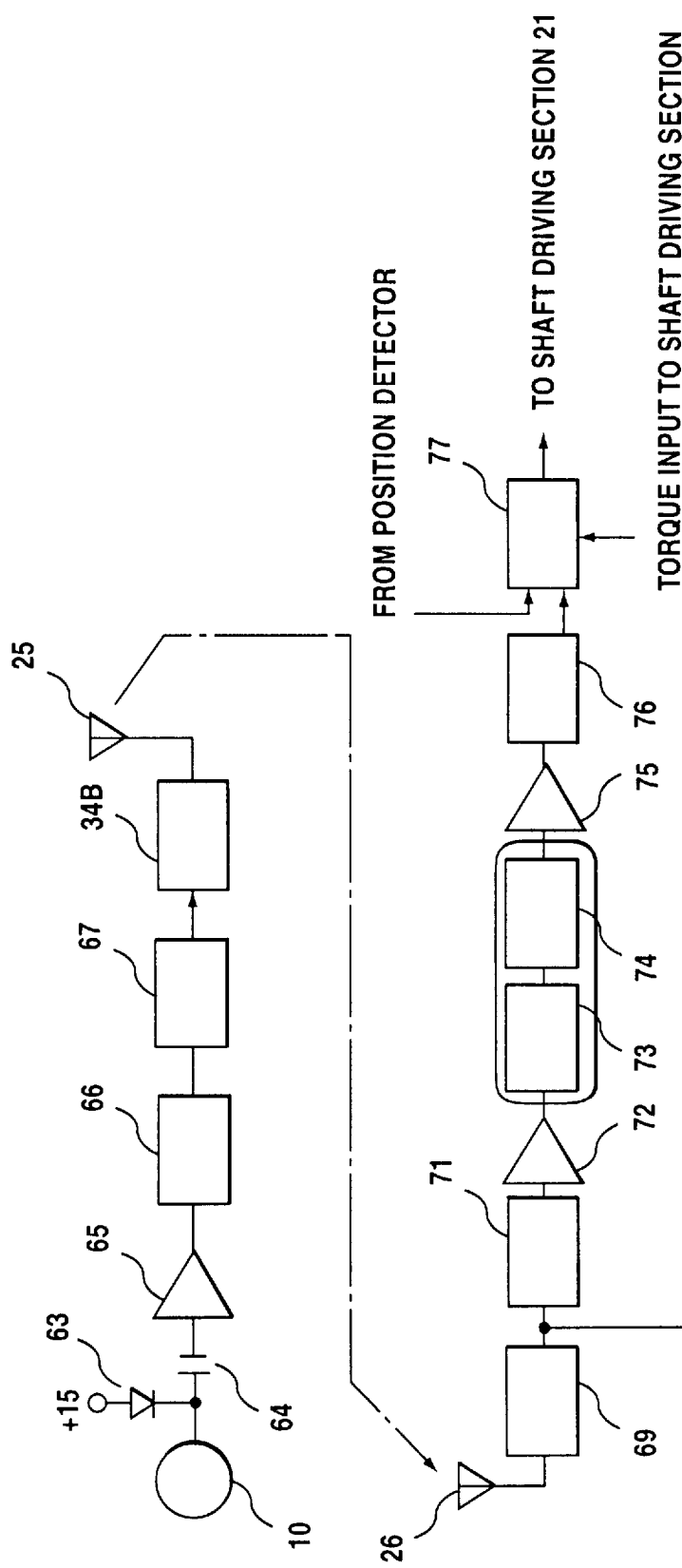

END POINT POLISHING APPARATUS AND POLISHING METHOD

This application is a continuation-in-part of application Ser. No. 08/637,433, filed Apr. 25, 1996.

BACKGROUND OF THE INVENTION

1. Field of the Invention

The present invention relates to a polishing apparatus and a polishing method and, more particularly, a polishing apparatus and a polishing method for use in planalization of insulating film, conductive film, etc. constituting a semiconductor device.

2. Description of the Prior Art

An integration density of semiconductor devices such as a semiconductor memory device is increasing with the years, and a multilayer structure of interconnection in their internal circuits is in progress more and more. Interlayer insulating films formed on the interconnection may be planalized by means of a Chemical Mechanical Polishing (referred to as "CMP" hereinafter) technique to permit such multilayer structure of interconnection. The CMP technique makes much account of end-point detection and automation of polishing in light of time and cost.

However, since polishing rate cannot be kept constant from various causes such as degradation of the abrasive cloth, it has been difficult to determine end of polishing strictly even if a polishing time is controlled. For this reason, up to now such working steps have been repeated until a planalized surface can be implemented that polishing is carried out for a short time and is then interrupted once to examine polished state of the object. The above working steps are not practical because these steps take much time and labor.

As a method of an end-point detection of the CMP, there has been up to this time a method wherein variation in torque of a motor for rotating a surface plate (to be also called as "head" hereinafter) is first detected and then frictional resistance of polished surface of the object is monitored based on the detected variation. But the method have little sensitivity since it can detect no high frequency component and thus it can detect only positional and time averages of a fitting friction force caused between the polished surface of the object and the head. In addition, the method cannot be applied in some cases because of the structure of the head. For instance, in an air-back system in which the head and its enclosure are coupled to each other via an elastic material, it is difficult to transfer influence of friction caused by the polished surface to the rotation axis, so that detection sensitivity is extremely decreased. Therefore, the air-back system has not been adequate to practical use.

There has been another method in which the end-point of polishing is detected by measuring the object to be polished through an optical thicknessmeter. But the end-point cannot be detected by the method in real time. Moreover, in case both a silicon nitride film and an $SiO_2$ film have to be polished concurrently, a polished film thickness cannot be measured precisely through the optical thicknessmeter.

Hence, there have been proposed an end-point detection of polishing based on variations in a rotating torque of the motor and vibration of the surface plate in patent application Publications (KOKAIs) 6-320416 and 6-45299. However, in these Publications (KOKAIs), the end-point cannot be detected when the polished surface has been planalized simply, but it can be detected when different material is exposed to the polished surface with progress of polishing thereby to cause a change in frictional resistance of the polished surface and also a change in vibration.

There has been recited a method of measuring distortion of the surface plate due to friction between the polished surface and the abrasive cloth through a distortion sensor in patent application Publication (KOKAI) 6-320416.

However, since vibration caused by polishing is weak in a polishing apparatus in which a distortion sensor is put, mechanical vibrations (sound) such as motor vibration in the polishing apparatus are picked up by the distortion sensor as a background noise. Thus, sufficient sensitivity cannot be attained by the polishing apparatus. As a result, it become difficult to detect precisely polishing condition of the polished surface in an entire area or detect the end-point of polishing, and therefore additional polishing is required after fundamental polishing being completed.

If distortion of the head caused by friction between the polished surface and the abrasive cloth is to be measured by the distortion sensor, the distortion does not appear so obviously as to be picked up by the distortion sensor. Further, change in unevenness of the wafer surface cannot be detected by the distortion sensor in the actual circumstances even if vibration of the polishing apparatus itself is reduced by a filter, for the distortion sensor has no sensitivity to high vibration frequency.

In the conventional polishing apparatus, because no objective index concerning setting and replace timing of the abrasive cloth has been established, these workings are often executed wastefully.

In addition, if the polished surface has been scratched by dust (foreign materials) once in polishing, such scratch cannot be detected until the object to be polished is taken out after the polishing to observe or check the polished surface through a microscope. No countermeasure has been taken against the dust which is produced and entered in the course of polishing the surface by virtue of the CMP. The polished surface has been merely estimated indirectly by observing scratches formed on the polished surface through the microscope.

Meanwhile, in the prior art, polishing condition has been estimated after completing the polishing. Therefore, even if the dust is entered into the polished surface in an initial stage of polishing the lot (usually 25 wafers) to begin scratching of the polished surface of the object to be polished, mixture of the dust has not been able to be found until polishing of the concerned lot is terminated. For this reason, the objects to be polished after the dust acting to scratch the polished surface is entered have been scratched as a matter of course, so that the objects of polishing such as a semiconductor wafer are wasted. In addition, a part of the polished surface has been broken off as the dust from the scratched surface to thus increase the dust still more.

Moreover, location of the dust on the polished surface cannot be identified even if the dust exists in polishing the surface, and therefore in some cases the abrasive cloth must be exchanged as a whole to remove the dust. In such cases, it takes much time and labor to exchange the abrasive cloth.

Furthermore, in the foregoing Patent Application Publications (KOKAIs), to transmit the detection signal of the surface plate vibration from the surface plate to the amplifier has been recited. In the event that it is intended to transmit the signal via a radio system, the radio signal is interrupted temporarily by the shaft of the motor for rotating the surface plate.

In the meanwhile, an amount of polishing is dependent on profiles of patterns and in addition it changes widely according to polishing conditions such as applied pressure, number of revolution, flow rate of abrasive liquid, and surface conditions of the abrasive cloth. Accordingly, if an amount of polishing is controlled according to an elapsed time, trial-polishing would be carried out once lot by lot so as to confirm the polishing rate. However, a plenty of time and labor are required for such trial-polishing. Further, in the case that several kinds of lots including different patterns therein are polished, a time required for the trial-polishing is increased in the whole polishing time to thus reduce a throughput.

SUMMARY OF THE INVENTION

It is an object of the present invention to provide a polishing apparatus and a polishing method capabling of detecting variations in polishing precisely in real time by detecting vibration in polishing with high sensitivity to shorten a polishing time, facilitating confirmation of existence of dusts, transmitting vibration of a surface plate via a radio system properly, and improving a detecting capability of natural vibration in polishing used to check polishing conditions.

According to an aspect of the present invention, since polishing is stopped by a signal analyzing means which analyzes vibration intensity detected by said vibration detectors through frequency analysis, integrates relative to time said vibration intensity from which vibration component (e.g., natural vibration component of the polishing apparatus) caused by causes other than polishing, and transmits a polishing stop signal to stop polishing operation when variation in a resultant integral value relative to time is less than a first reference value or when said resultant integral value is less than a second reference value, an end-point of polishing can be easily detected.

In the signal analyzing means, since a signal for indicating degradation of said abrasive cloth is output when either a time from start of polishing to stop of polishing is shorter than a preset time or variation of said resultant integral value relative to time is decreased in excess of a designated value, either end of polishing or degradation of said abrasive cloth can be easily determined and an optimum polishing operation can be implemented.

Since it has been confirmed experimentally that polishing is not being carried out uniformly if a decreasing factor of vibration intensity in particular vibration frequency is larger than that of vibration intensity in other vibration frequency, polishing conditions are modified by detecting such attenuation of vibration intensity to provide uniform polishing, thereby resulting in optimum polishing.

In a polishing apparatus having a structure wherein a first surface plate for supporting the object to be polished and a rotation force transmitting mechanism are connected via an elastic substance, since a vibration detector is attached to the first surface plate, natural vibration of the rotation force transmitting mechanism may be absorbed by the elastic substance, and an S/N ratio can be improved when vibration of the object to be polished is detected. Thereby, an end-point of polishing can be grasped quickly and precisely.

Since a mechanism for inducing vibration in polishing is formed in the abrasive cloth, vibration intensity of the vibration generated in polishing is enhanced, and a vibration frequency bandwidth to be detectable by the vibration detector is broadened. Thus, fine control of the polishing conditions and the end-point detection in polishing is facilitated.

In this case, if cavities are formed in the abrasive cloth and the surface plate, induced vibration in polishing is amplified, so that change in vibration intensity of vibration can be grasped readily.

By calculating an attenuation amount of vibration by the vibration detector in polishing as a RMS value, and measuring change in the RMS value every time interval, a time point when integral value of the change or change amount for a predetermined time interval becomes zero or more may be used as the end-point detection of polishing.

In this case, if the first surface plate takes moving operation on the abrasive cloth in addition rotation operation, an AC component is too large to determine the end-point of polishing. In such event, if the detection signal is corrected by dividing the RMS value by a function including location information of the first surface plate, the end-point of polishing can be detected quickly and accurately.

According to another aspect of the present invention, in case an output of the vibration detector for detecting vibration in polishing is transmitted to the outside by radio, a stable transmission-reception can be accomplished even when the antenna is rotated or swung since a transmitting antenna and a receiving antenna are arranged in a coaxial manner.

In order to supply power to the vibration detector and the transmitting portion attached to the surface plate, since an annular conductor is provided around a shaft for rotating the surface plate and power is then supplied through a brush being contacted to the annular conductor, situations, for example, time and labor for exchange of a battery, operation stop because of an electric power shortage, etc. can be avoided. A commercially available slip ring may be utilized as the annular conductor.

According to still another aspect of the present invention, since an automatic frequency control mechanism is employed when plural polishing are carried out concurrently and polishing information are transmitted and received by radio, a stable receiving state can be kept even if a transmitting frequency is fluctuated due to temperature change.

According to yet still anther aspect of the present invention, after detecting abnormality of vibration intensity detected by the vibration detector attached to the surface plate in polishing, if a detecting time of abnormality of vibration intensity is shorter than a rotating period of the surface plate, a signal indicating presence of the dust is output from a signal analyzing portion. Therefore, polished surfaces of the succeeding object to be polished can be prevented beforehand from being scratched by the dust.

In case abnormality of vibration intensity is generated longer than the rotating period of the surface plate, the surface of the object to be polished is damaged by causes other than the scratch. Therefore, polishing is immediately ceased and abnormal operation of the polishing apparatus due to causes other than the dust can be readily detected.

According to further aspect of the present invention, in a structure wherein an air-back type upper surface plate which is protected from vibration of the enclosure which has an inner airtight cavity is provided, a vibration detector for detecting circumferential vibration is provided on the upper surface plate, and end of polishing, etc. are determined according to change in vibration intensity signal or vibration spectrum signal output from the vibration detector. Thereby, by detecting change in vibration intensity or vibration spectrum in the rotating direction of the air-back type upper surface plate, determination as to change in polishing conditions can be facilitated.

In case the signal from the vibration detector is output to the controller via a bandpass filter, vibration component depending upon proper frequency vibration in the polishing apparatus may be removed so as to mate with the polishing apparatus and polishing conditions, so that only the vibration generated by actual polishing can be selected.

In case vibration signal detected by the vibration detector is transmitted to a controller by radio, an amplitude range of the vibration signal may be expanded by a logarithmic amplifier and then transmitted by radio, and the vibration signal is restored by an inverse logarithmic amplifier after reception, thereby improving the S/N ratio.

In case an output signal from the vibration detector is small, the output signal can be amplified by connecting a plurality of the vibration detectors. In addition, since unnecessary vibration components not to be detected by these detectors are increased, noises due to unnecessary vibration components can be reduced by selecting directions and arrangements of these detectors such that such unnecessary components are canceled mutually and necessary components are added, thereby improving an S/N ratio.

According to still further aspect of the present invention, in case vibration of the object to be polished supporting plate which changes with the progress of polishing is detected by a vibration detector, inputting of background noise such as motor sound into the vibration detector can be suppressed to thus improve an S/N ratio since sound-proof material is arranged around the vibration detector.

In case vibration of the object to be polished supporting plate which changes with the progress of polishing is detected by a vibration detector, an S/N ratio can be improved because vibration frequency to be detected is converted into a maximum sensitivity frequency of the vibration detector.

In case vibration of the object to be polished supporting plate which changes with the progress of polishing is detected by a vibration detector, detected vibration being input into the vibration detector can be amplified by resonance and thus improve an S/N ratio since a vibration plate having a natural vibration frequency identical to vibration frequency to be detected is interposed between the object to be polished supporting plate and the vibration detector.

In case vibration of the object to be polished supporting plate which changes with the progress of polishing is detected by a vibration detector, vibration transmitting efficiency from the object to be polished to the vibration detector can be enhanced to thus improve an S/N ratio since a vibration transmitting substance contacting to both the vibration detector and the object to be polished is formed through the object to be polished supporting plate.

In case vibration of the object to be polished supporting plate which changes with the progress of polishing is detected by a vibration detector, background noise can be suppressed significantly to thus improve an S/N ratio since energy supply for driving the object to be polished supporting plate is halted temporarily in detecting.

In case vibration of the object to be polished supporting plate which changes with the progress of polishing is detected by a vibration detector, an S/N ratio can be improved since vibration frequency to be detected is differentiated from vibration frequency of the background noise and it is set to be identical to a natural vibration frequency of the object to be polished supporting plate.

In case vibration of the object to be polished supporting plate which changes with the progress of polishing is detected by a vibration detector, inputting of background noise into the vibration detector can be eliminated to thus improve an S/N ratio since a vibration plate being vibrated in opposite phase to the background noise is interposed between the object to be polished supporting plate and the vibration detector.

In case vibration of the object to be polished supporting plate which changes with the progress of polishing is detected by a vibration detector, time and labor for exchanging the detectors because of failure of the vibration detectors can be reduced since a plurality of vibration detectors are provided on the object to be polished supporting plate to be selected.

According to yet still further aspect of the present invention, since a displacement detector for detecting location of the object to be polished supporting plate in polishing is provided, friction force between the abrasive cloth and the object to be polished is changed with the progress of polishing to thus displace location of the object to be polished supporting plate, so that an end-point of polishing, etc. can be detected according to a change amount of the displacement. In this case, since a change amount of location of the object to be polished supporting plate is different in the vibration frequency bandwidth from background noise, a detection with an excellent S/N ratio can be attained without influence of vibration of the motor.

In the present invention, since various approaches for amplifying natural vibration in polishing, improving an S/N ratio, etc., it becomes easy to determine an end-point of polishing of wafer without different material for detecting the end-point of polishing, and the like.

According to further another aspect of the present invention, the vibration detecting device is secured on the upper surface plate, the first signal output from this vibration detecting device is amplified by the amplifier, the magnitude of the second signal output from this amplifier is measured by the gain indicator, the gain indicator instructs the gain adjusting portion to modify gain of the amplifier if the gain indicator determines that the magnitude of the second signal is not optimum, and the gain adjusting portion adjusts gain of the amplifier to an optimum value based on the instruction.

Change of the second signal output from the amplifier is analyzed by the signal analyzer, and an end-point of polishing is then detected according to the analyzed results. The control circuit terminates an operation of the upper surface plate to finish the polishing operation when the end-point of polishing is detected.

Like this, when the gain of the amplifier is adjusted based on the output signal of the amplifier, S/N ratio can be improved since natural vibration signal in polishing can be enhanced relative to radiation noise and propagation noise even if unevenness of the polished surface is small. As a result, with no influence of the degree of unevenness of the polished surface, the end-point of polishing can be detected by the polishing apparatus with higher precision.

BRIEF DESCRIPTION OF THE DRAWINGS

FIG. 40 is a block diagram showing a signal system in the polishing apparatus according to the twelfth embodiment of the present invention;

DESCRIPTION OF THE PREFERRED EMBODIMENTS

Preferred embodiments of the present invention will be explained with reference to accompanying drawings hereinafter.

(First Embodiment)

Figure 1:
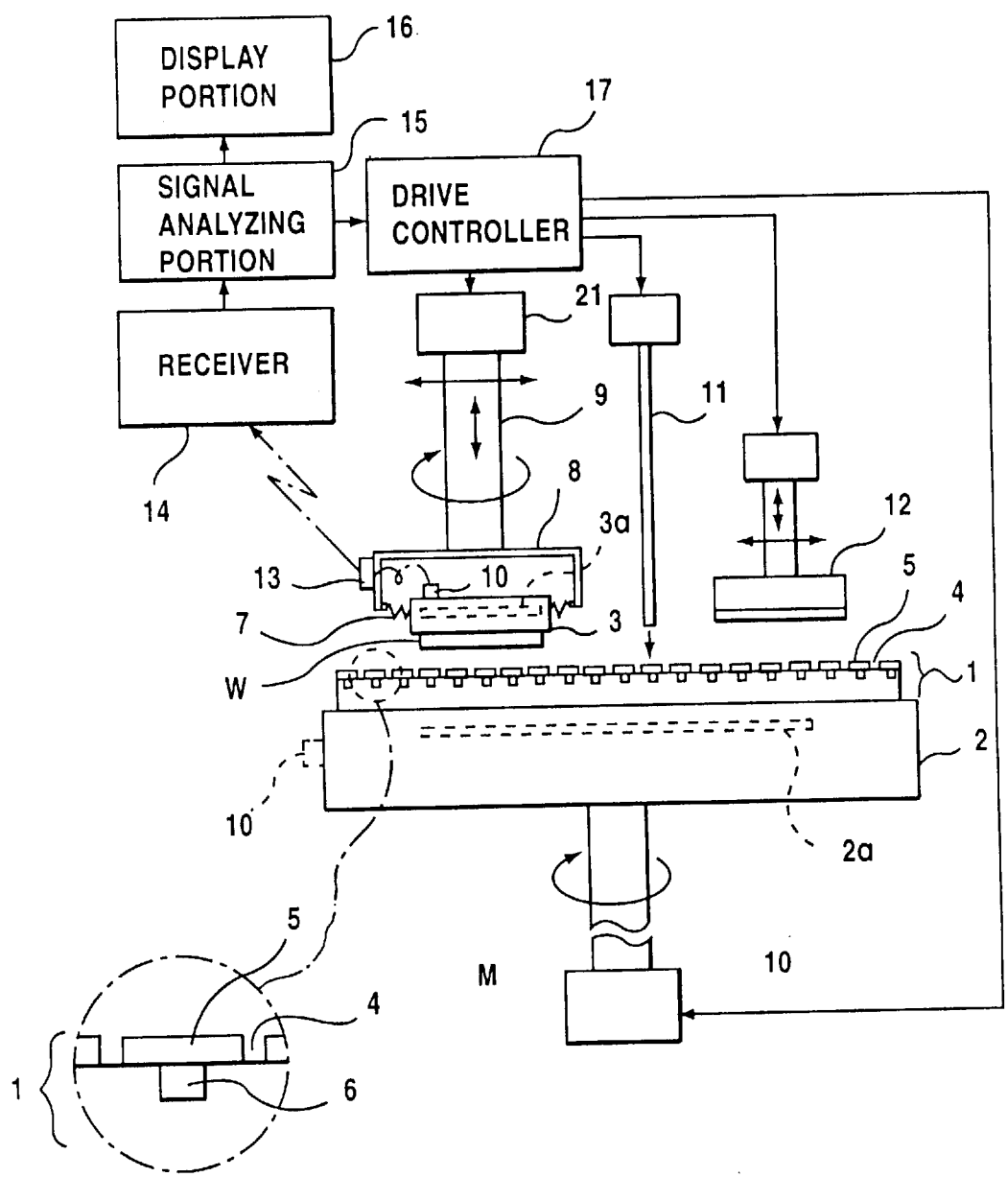
FIG. 1 is a schematic view showing a configuration of a polishing apparatus according to a first embodiment of the present invention.

FIG. 1 shows pertinent portions of a configuration of a polishing apparatus according to a first embodiment of the present invention.

The polishing apparatus comprises a circular-disk type lower surface plate 2 being driven by a motor M, and a circular-disk type upper surface plate 3 for supporting an object to be polished W via an adsorption pad (not shown). Resonance portions 2a, 3a respectively consisting of one cavity or more are formed respectively in the lower surface plate 2 and the upper surface plate 3. An abrasive cloth 1 which being opposed and contacted to an object to be polished W is stuck on the lower surface plate 2.

The abrasive cloth 1 is formed of cellular urethane to have a two-layered structure, for example.

Figure 2A:
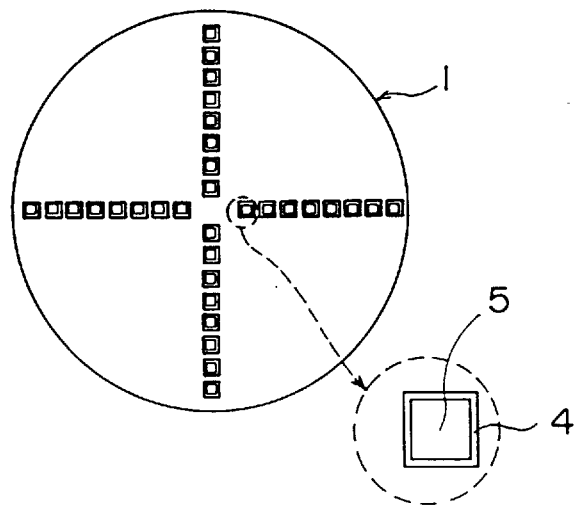
FIGS. 2A and 2B are plan views showing grooves of an abrasive cloth being applied to the polishing apparatus according to the first embodiment of the present invention.
Figure 2B:
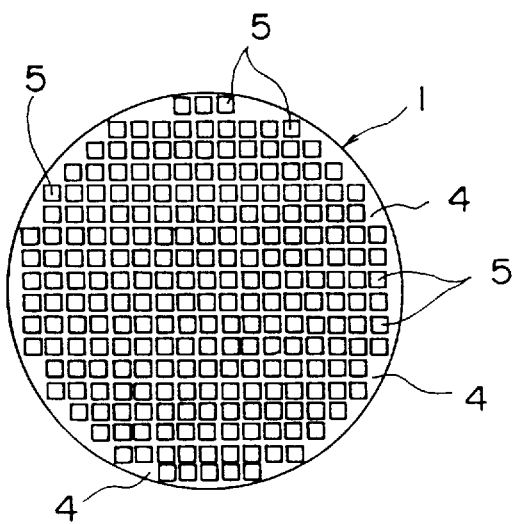

As shown in FIGS. 2A and 2B, first grooves 4 of an about 2 mm depth are formed on an upper layer portion of the abrasive cloth 1 at a plurality of areas. A plurality of rectangular areas surrounded by the first grooves 4 are formed respectively to have a width of 20 mm square, for example, and they may act as resonance portions 5 for inducing vibration at the time of polishing while contacting the object to be polished W. Second grooves (cavities) 6 superposed on the resonance portions 5 are formed in the lower layer of the abrasive cloth 1 so as to resonate with vibration of the resonance portions 5.

Although forming areas of the first grooves 4 are not restricted particularly, they are shown in FIGS. 2A and 2B by way of example. In FIG. 2A, the first grooves 4 have respectively a rectangular plan shape and a plurality of the first grooves 4 are formed in the cruciform direction. In FIG. 2B, a plurality of the first grooves 4 are formed linearly in vertical and horizontal directions.

Figure 3:
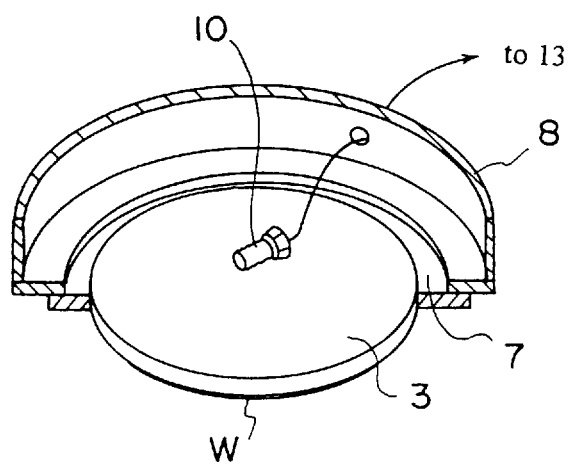
FIG. 3 is a perspective view, partially in section, showing a head used in the polishing apparatus according to the first embodiment of the present invention.

As shown in FIG. 3, the upper surface plate 3 is supported by an enclosure 8 of the internal cavity via an elastic substance 7 such as rubber, spring, etc. to make different movements from those of the enclosure 8. An upper portion of the enclosure 8 is fixed to a lower end of a shaft 9 which being rotated and moved upwardly and downwardly by a shaft driving portion 21. The enclosure 8, the upper surface plate 3 and the elastic substance 7 are called as a "head" as a whole. The internal pressure in an internal space of the head is kept up to push the upper surface plate 3 to the abrasive cloth 1.

A vibration detecting device (to be also called as "accelerator device" hereinafter) 10 is attached to an upper or side portion of the upper surface plate 3. An output end of the vibration detecting device 10 is connected to a transmitter 13 attached to the enclosure 8. For example, a piezoelectric acceleration sensor may be used as the vibration detecting device 10.

The head having such a structure that a space surrounded by the enclosure 8, the upper surface plate 3 and the elastic substance 7 is kept up at predetermined pressure is called as an air-back type head. In the air-back type head, a downward pressure is applied to the upper surface plate 3 to be restored to its original position if the upper surface plate 3 is displaced upwardly whereas an upward pressure is applied to the upper surface plate 3 to be restored to its original position if the upper surface plate 3 is displaced downwardly, and then the downward or upward pressure is maintained. The downward or upward pressure is supplied from the outside through the cavity in the shaft 9.

The transmitter 13 transmits vibration information as for vibration frequency and vibration intensity supplied from the vibration detecting device 10 to a receiver 14 by radio signals. A signal analyzing portion 15 analyzes vibration information received from the receiver 14, and subtracts natural vibration components produced by various causes other than polishing (e.g., natural vibration components of the polishing apparatus) from resultant power spectrum between vibration frequency and vibration intensity. A display portion 16 displays the result of subtraction. A drive controller 17 moves, drives and stops the shaft 9 and the dresser 12, or controls a supply amount of polishing liquid supplied via a nozzle 11.

The surface of the abrasive cloth 1 is set by the dresser 12. Vertical movement and rotational movement of the dresser 12 is controlled by the drive controller 17.

The number of rotation of a motor M for rotating the lower surface plate 2 is also controlled by the drive controller 17.

For purposes of illustration, there are wafer formed of silicon, germanium, and compound semiconductor, etc., and conductive film, insulating film, metal film, those being formed on the wafer, as a object to be polished W to be polished by the above polishing apparatus.

A plurality of micropores may be formed in the abrasive cloth 1 in place of the first and second grooves.

Subsequently, an operation of the polishing apparatus will be explained taking polishing of the semiconductor wafer as an example.

First the semiconductor wafer W is stuck on the under surface of the upper surface plate 3 as the object to be polished W, then the lower surface plate 2 is rotated according to the signal supplied from the drive controller 17. The shaft 9 is rotated and brought down according to the signal supplied from the drive controller 17 to push the semiconductor wafer W to the abrasive cloth 1. The polishing liquid is supplied to the abrasive cloth 1 via the nozzle 11 during polishing.

After polishing being commenced, vibration of the semiconductor wafer W due to friction between the semiconductor wafer W and the abrasive cloth 1 causes vibration of the vibration portions 5 formed in the abrasive cloth 1. The vibration of the vibration portions 5 is amplified by resonance in the second groove 6 and resonance portions 2a, 3a formed respectively in the lower surface plate 2 and the upper surface plate 3, and then transmitted to the vibration detecting device 10.

As vibrations being input to the vibration detecting device 10, a vibration component propagated from a shaft driving portion 21 for driving the shaft 9 is present in addition to the vibration component caused by friction. Natural vibration of the shaft driving portion 21 acts as a noise for the vibration detecting device 10 for detecting frictional vibration. However, since the vibration detecting device 10 is attached to the upper surface plate 3, natural vibration of the shaft driving portion 21 propagated to the shaft 9 and the enclosure 8 is attenuated by virtue of vibration adsorption of the elastic substance 7. As a result, since natural vibration of the shaft driving portion 21 propagated to the upper surface plate 3 is weakened, the noise which is input to the vibration detecting device 10 can be reduced.

Vibration information such as vibration frequency and vibration intensity detected by the vibration detecting device 10 are sent to the display portion 16 via the transmitter 13, the receiver 14, and the signal analyzing portion 15 and then displayed on the display portion 16. A power spectrum of vibration shown in FIG. 4, for instance, is displayed on the display portion 16. The power spectrum can be derived by subtracting a natural vibration component produced by causes other than polishing by means of the signal analyzing portion 15.

In the state where unevenness still remains on the whole polished surface in an initial state of polishing, it can be seen that enhanced vibration intensity appears over the wide vibration frequency bandwidth from low frequency to high frequency. When a part of the polished surface is planalized locally with progress of polishing, not only vibration intensity is reduced over all vibration frequency ranges, but also attenuation of the vibration intensity in the low vibration frequency such as about 500 Hz becomes remarkable. Attenuation in the low frequency range is a peculiar phenomenon which is caused by the fact that a part of the polished surface has been polished to be flat. On the contrary, if the entire polished surface has been polished uniformly, vibration intensity in a high frequency range about 1000 Hz has been reduced. If a part of the polished surface is planalized, the number of rotation of the upper surface plate 3 and the lower surface plate 2 and the pressure supplied to the upper surface plate 3 are controlled by the drive controller 17, and therefore the variation in polishing can be reduced.

Figure 4A:
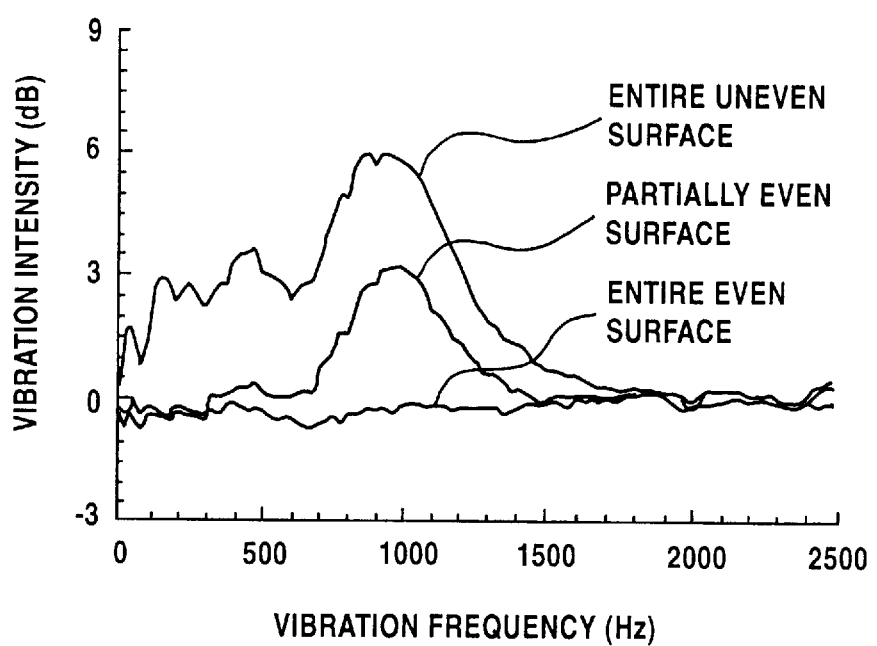
FIG. 4A is a graph illustrating spectrum indicating relations between vibration frequency and vibration intensity which are detected by a vibration detecting device in the course of polishing by means of the polishing apparatus according to the first embodiment of the present invention.

No vibration is produced when the entire polished surface has been planalized uniformly, and therefore, as shown in FIG. 4, the vibration intensity becomes almost zero over all vibration frequency bandwidth.

As stated earlier, since the vibration frequency bandwidth is widened and also the vibration intensity is enhanced in terms of inducing vibration of the excitation portions 5 provided in the abrasive cloth 1, not only the sensitivity can be improved, but also the vibration can be amplified by resonances of the second grooves 6 of the abrasive cloth 1 and the resonance portions 2a, 3a in the lower surface plate 2 and the upper surface plate 3.

Thereby, it is feasible to detect existence of minute unevenness on the polished surface and to amplify them. A minute unevenness of the polished surface wherein polishing state is less than 0.05 $\mu$m can be detected according to change in vibration, and a situation of variation in polishing on the polished surface can be grasped with good precision. By either changing polishing pressure or changing the number of rotation of the upper surface plate 3 or the lower surface plate 2 to reduce the variation, variation in polishing can be corrected by automatic modification. Thus, polishing conditions can be detected with high precision, so that end of polishing can be readily determined and also supplementary polishing can be omitted. Hence, a throughput can be improved.

If spectrum of vibration intensity relative to vibration frequency is integrated by the signal analyzing portion 15, the integral value is reduced gradually with the progress of polishing. Therefore, it is determined that polishing is completed when variation in the integral value with respect to time becomes zero. At that time, the signal analyzing portion 15 sends a polishing terminating signal to the drive controller 17. The drive controller 17 disconnects the semiconductor wafer W from the abrasive cloth 1 by stopping rotation of the shaft 9 or lifting the shaft 9 and terminates polishing operation.

In this case, an average value of vibration intensity over a predetermined frequency bandwidth may be adopted as the integral value.

Figure 4B:
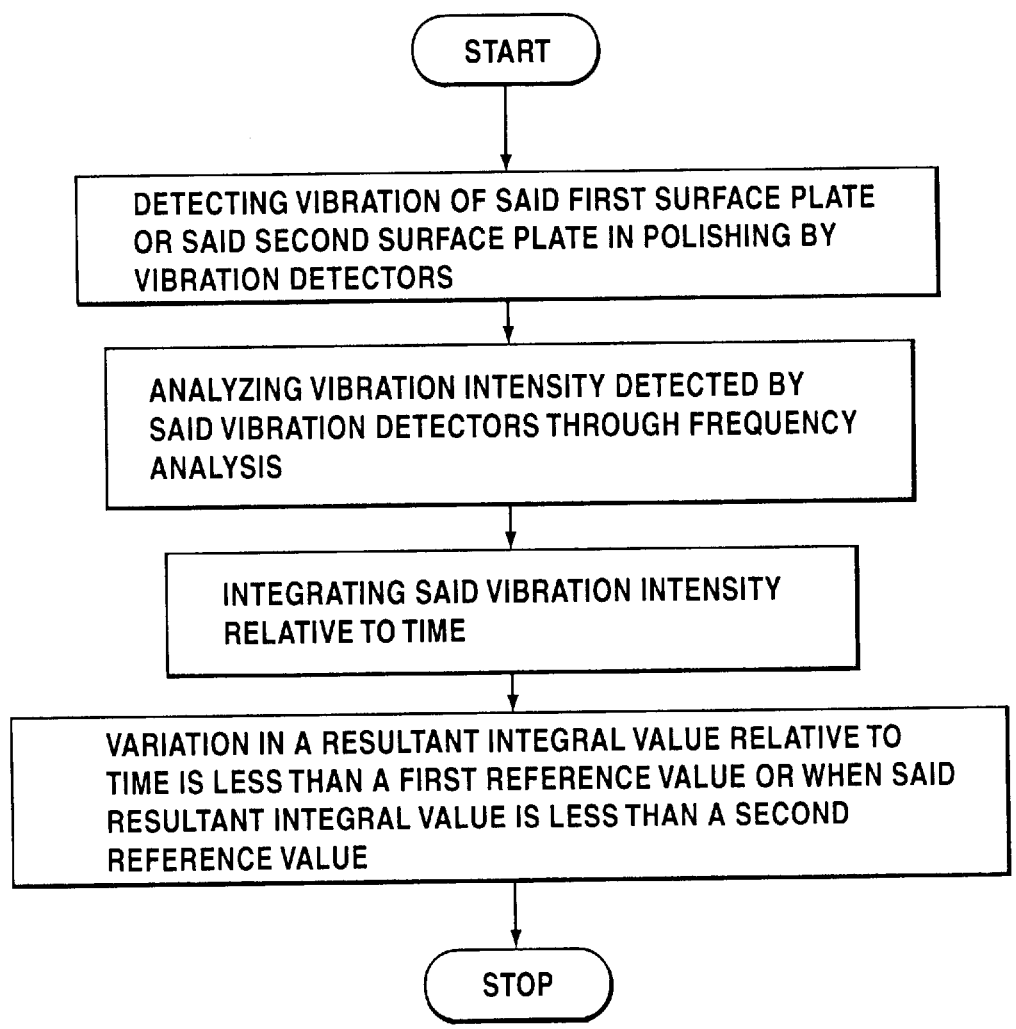
FIG. 4B is a flow chart according to the first embodiment of the present invention.

In the event that the integral value does not become zero completely when the polishing operation is terminated, it may be determined that the polishing operation is finished when the integral value reaches a predetermined reference value or variation in the integral value relative to time becomes smaller than a predetermined reference value as shown in FIG. 4B Meanwhile, if the abrasive cloth 1 is worn away before polishing is terminated, friction between the object to be polished W and the excitation portions 5 is reduced to eliminate vibration, and therefore vibration intensity attenuates sharply, thus resulting in the substantially same characteristic as that of the termination of polishing. Such sharp attenuation of vibration intensity is transmitted to the signal analyzing portion 15 via the vibration detecting device 10, the transmitter 13, and the receiver 14 and then is determined as degradation of the abrasive cloth 1 by the signal analyzing portion 15. In this case, the signal analyzing portion 15 makes the drive controller 17 stop polishing, and the dresser 12 is driven to set the abrasive cloth 1. Polishing of the object to be polished W is started again after the setting of the abrasive cloth 1 is finished.

When the surface of the abrasive cloth 1 becomes smooth, vibration intensity appears in the vibration frequency range of 0 to several hundreds Hz in the order of several dB. Therefore, it would be understood that abrasion of the abrasive cloth 1 may detected based on information as for appearance of vibration intensity in such vibration frequency range and variation in vibration intensity.

Either the time from start to end of polishing which being shorter than a predetermined time or variation of the integral value relative to time which being decreased in excess of a designated value may be adopted as a degradation criterion of the abrasive cloth 1.

In turn, polishing of an insulating film covering the wirings of the semiconductor device by the above polishing apparatus will be explained.

Figure 5A:
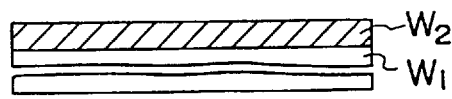
FIGS. 5A and 5B are sectional views showing a part of steps of manufacturing a semiconductor device.
Figure 5B:
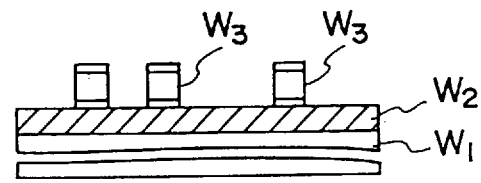
Figure 6A:
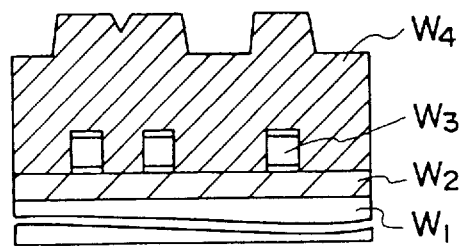
FIGS. 6A and 6B are sectional views showing a first example wherein an insulating film of a semiconductor device is polished by means of the polishing apparatus according to the first embodiment of the present invention.
Figure 6B:
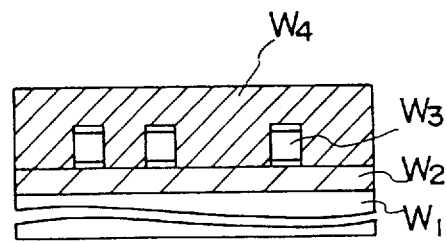

To form the interconnection of the semiconductor device, as shown in FIG. 5A, first a first insulating film $W_2$ is formed on a semiconductor substrate $W_1$, then a metal film is formed on the first insulating film $W_2$, and then as shown in FIG. 5B interconnection patterns $W_3$ are formed by patterning the metal film. Thereafter, as shown in FIG. 6A, a second insulating film $W_4$ is formed to protect the interconnection patterns $W_3$. Differences in level formed between the interconnection patterns $W_3$ and the first insulating film $W_2$ appear as unevenness on the surface of the second insulating film $W_4$. The surface of the second insulating film $W_4$ is polished until an end-point is detected by the above polishing apparatus. As a result, as shown in FIG. 6B, the polished surface becomes flat.

Figure 7A:
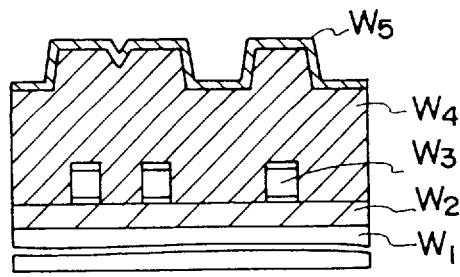
FIGS. 7A and 7B are sectional views showing a second example wherein the insulating film of the semiconductor device is polished by means of the polishing apparatus according to the first embodiment of the present invention.
Figure 7B:
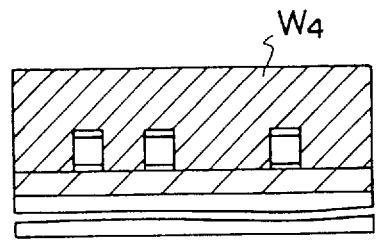

In case the second insulating film $W_4$ is formed of, for example, an $SiO_2$ film employing TEOS, a polishing rate is high. Therefore, as shown in FIG. 7A, there are some cases a silicon nitride film $W_5$ is formed on the second insulating film $W_4$ by CVD. The silicon nitride film $W_5$ has an uneven surface. The surfaces of the second insulating film $W_4$ and the silicon nitride film $W_5$ are polished until the end-point is detected by the polishing apparatus of the present invention. As a result, as shown in FIG. 7B, the polished surface becomes even. Since the silicon nitride is hard rather than $SiO_2$, an amount of polishing achieved when the silicon nitride film $W_5$ is formed is less than an amount of polishing achieved when the silicon nitride film $W_5$ is not formed.

Figure 8A:
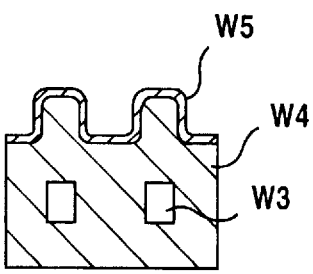
FIGS. 8A to 8C are sectional views showing a first example how to progress polishing of an insulating film of a semiconductor device by means of the polishing apparatus according to the first embodiment of the present invention.
Figure 8B:
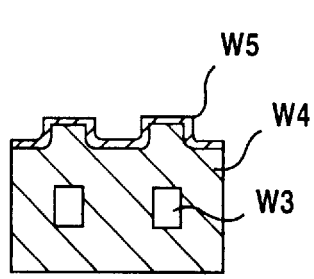
Figure 8C:
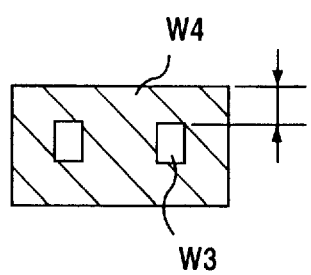

If only the second insulating film $W_4$ has to be polished, the polished surface is varied as shown in FIGS. 8A to 8C. In this case, waveforms of vibration input into the vibration detecting device 10 is reduced, as shown in FIG. 10, with the progress of polishing.

Figure 9A:
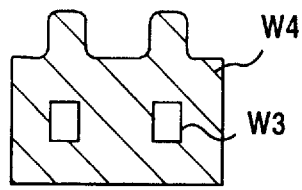
FIGS. 9A to 9C are sectional views showing a second example how to progress polishing of an insulating film of a semiconductor device by means of the polishing apparatus according to the first embodiment of the present invention.
Figure 9B:
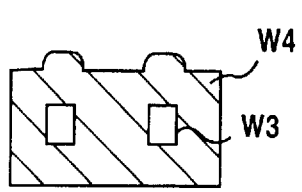
Figure 9C:
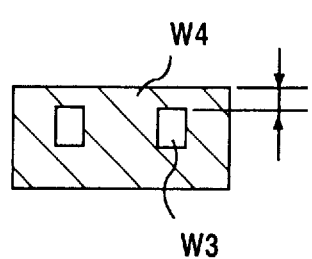

On the other hand, the second insulating film $W_4$ and the silicon nitride film $W_5$ are to be polished, the silicon nitride film $W_5$ covering the entire surface in an initial state is lost partially with the progress of polishing to thus expose the second insulating film $W_4$, as shown in FIGS. 9A and 9B. If the second insulating film $W_4$ and the silicon nitride film $W_5$ are further polished, the end-point of the polishing is detected at the time when the polished surface is planarized, and at that time polishing of the polished surface is ceased. Only the first insulating film $W_4$ is exposed on the polished surface, as shown in FIG. 9C, or the silicon nitride film $W_5$ remains partially on the polished surface.

Figure 10:
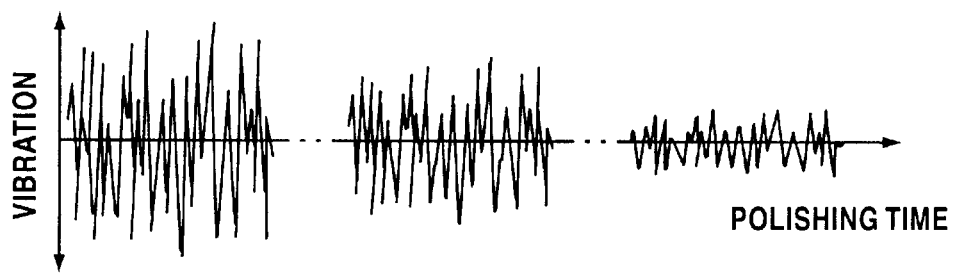
FIG. 10 is a views showing changes in waveform which being output from a vibration detecting device in the polishing apparatus according to the first embodiment of the present invention.

In these polishing, vibration waveforms being input into the vibration detecting device 10 are given as shown in FIG. 10.

Accordingly, as recited in patent application Publication (KOKAI) 6-320416, the above polishing apparatus does not detect the situation where the amplitude is increased according to variation in the film quality, but it detects the event where vibration intensity is reduced in proportion to an increase of a flatness of the polished surface. Hence, the polishing apparatus is so constructed that it determines the end-point of polishing in the stage where the reduction of vibration reaches a predetermined criterion and then ceases the polishing operation.

A plurality of foregoing vibration detecting device 10 may be attached to the upper surface plate 3. For instance, polishing states may be detected in more detail by detecting vibrations in the vertical and lateral circumferential directions separatingly. In this case, the integral value of spectrum of vibration intensity may be detected by an average value which being derived from a plurality of the vibration detecting device 10. Vibration of the vibration detecting device 10 may not be vibration in the vertical direction, but vibration in the lateral or circumferential direction. The vibration in the circumferential direction will be explained in detail in eighth and ninth embodiments. The vibration detecting device 10 may be attached the lower surface plate 2 instead of the upper surface plate 3. Similarly, this is true for the following embodiments.

(Second Embodiment)

Figure 11:
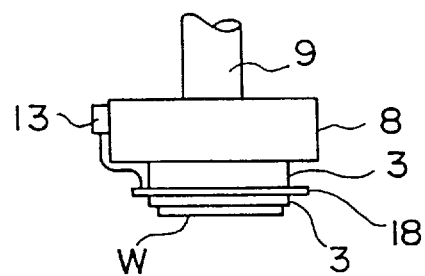
FIG. 11 is a side view showing a head portion of a polishing apparatus according to a second embodiment of the present invention.

FIG. 11 is a side view showing a head portion of a polishing apparatus according to a second embodiment of the present invention.

In the second embodiment, as shown in FIG. 11, a vibration detecting device (acceleration device) 18 made of piezoelectric material such as ceramic or crystal is interposed in an intermediate layer of the upper surface plate 3. As a result, not only vertical vibration to the polished surface of the object to be polished W but also friction caused along the polished surface in the torsional direction, i.e., "fitting friction force" can be detected. Since the fitting friction force is reduced sharply when a part of the polished surface is planarized locally, variation in polishing can be removed by adjusting polishing conditions (e.g., polishing pressure, polishing rate, etc.) not to reduce the fitting friction force sharply if an entire surface of the polished surface has to be polished uniformly.

Like the first embodiment, the vibration detecting device 18 is connected to the transmitter 13 in the second embodiment. The vibration detecting device 18 may be applied to the polishing apparatus wherein the excitation portions 5 are not formed in the abrasive cloth 1.

(Third Embodiment)

Figure 12:
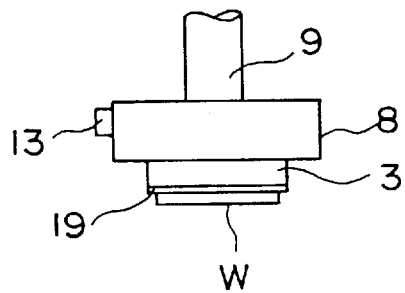
FIG. 12 is a side view showing a head portion of a polishing apparatus according to a third embodiment of the present invention.

FIG. 12 is a side view showing a head portion of a polishing apparatus according to a third embodiment of the present invention.

In the third embodiment, as shown in FIG. 12, a film-like pressure sensor 19 such as a strain gauge is interposed between the object to be polished W and the upper surface plate 3. As a result, change in pressure being applied to the object to be polished W in the direction vertical to the polished surface can be detected as change in electric resistance, so that vibration frequency and vibration intensity in the vertical direction can be detected. A sensor of the type for detecting pressure distribution may be used as the pressure sensor 19.

The vibration detecting device 18 is connected to the transmitter 13 in the third embodiment, like the first embodiment, and may be applied to the polishing apparatus wherein the excitation portions are not formed in the abrasive cloth.

(Fourth Embodiment)

Figure 13:
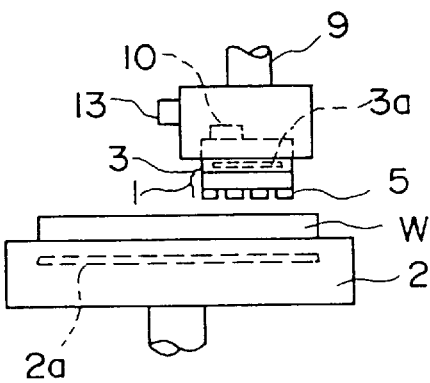
FIG. 13 is a side view showing a head portion of a polishing apparatus according to a fourth embodiment of the present invention.

In the foregoing embodiments, the object to be polished has been attached to the upper surface plate while the abrasive cloth has been stuck to the lower surface plate. Conversely, as shown in FIG. 13, the object to be polished W may be attached to the lower surface plate 2 while the abrasive cloth 1 may be stuck to the upper surface plate 3.

In the fourth embodiment, the excitation portions 5 are also formed in the abrasive cloth 1, and the vibration detecting device 10 and the transmitter 13 are also attached to the upper surface plate 3.

In the fourth embodiment, the second grooves 6 may be formed in the abrasive cloth 1 and the resonance portions 2a, 3a may be formed as cavities in the upper surface plate 3 and the lower surface plate 2, like the first embodiment.

(Fifth Embodiment)

Figure 14:
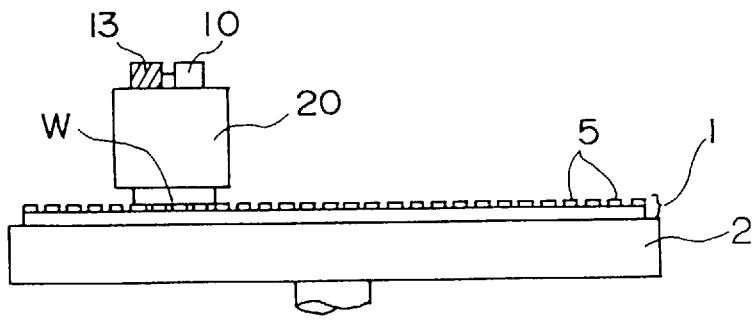
FIG. 14 is a side view showing a head portion of a polishing apparatus according to a fifth embodiment of the present invention.

A mechanism for rotating the upper surface plate by the shaft has been provided in the above embodiments. But, as shown in FIG. 14, the vibration detecting device 10 and the transmitter 13 may be attached to the upper surface plate 20 even if a so-called deadweight type polishing apparatus including the upper surface plate 20 without rotating mechanism is utilized. In this event, the excitation portions 5 may be formed in the abrasive cloth 1 on the lower surface plate 2, and the resonance portions may be formed as cavities in the upper surface plate 3 and the lower surface plate 2.

Note that like reference symbols in FIG. 14 designate identical or corresponding parts in FIG. 1.

(Sixth Embodiment)

Figure 15A:
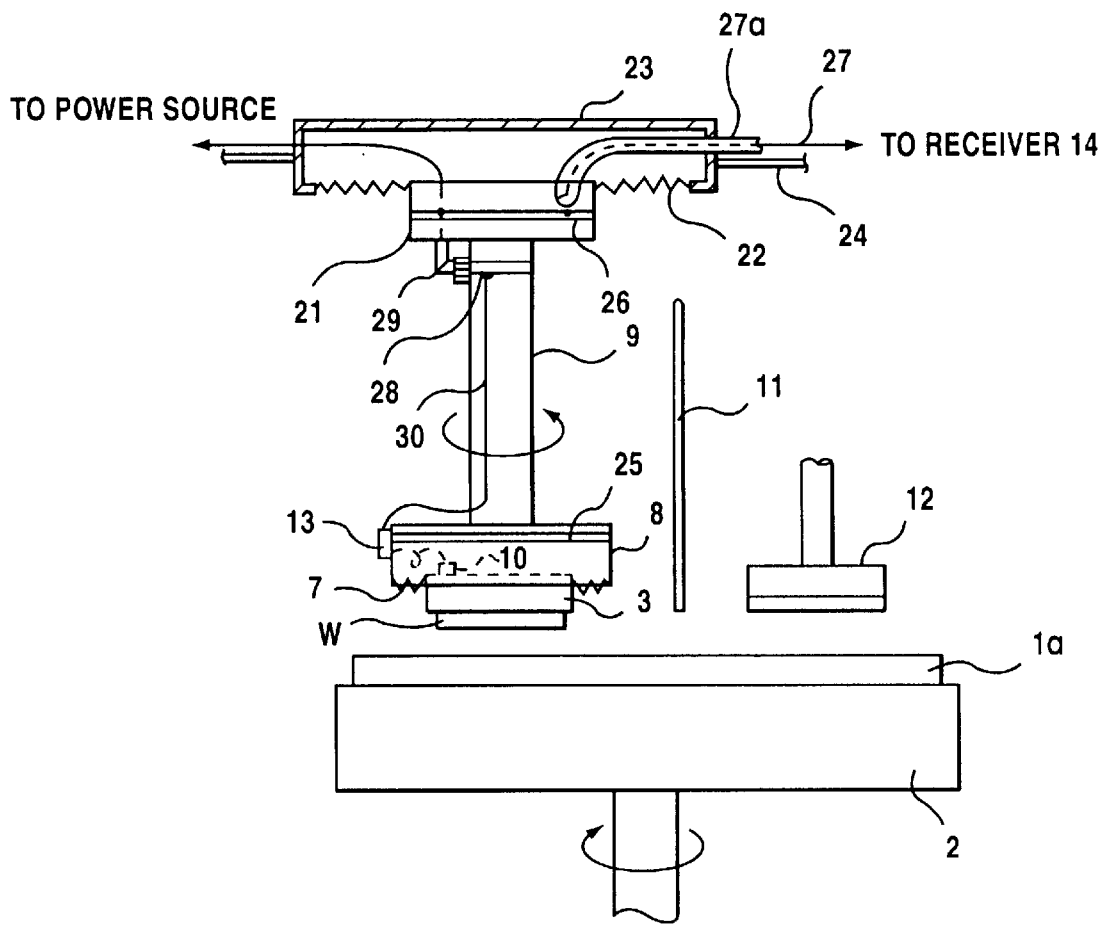
FIG. 15A is a side view showing a polishing apparatus according to a sixth embodiment of the present invention.

Although it can be supposed that a battery is used as a power source of the transmitter in the above polishing apparatuses, polishing will be obstructed if power-supply capability of the battery is decreased during when the polishing apparatus is being driven. FIG. 15A is a side view showing a polishing apparatus according to a sixth embodiment of the present invention. In the sixth embodiment, a polishing apparatus is disclosed which includes a structure for supplying power to the transmitter without the battery and a structure for connecting the transmitter with the receiver by radio. Like reference symbols in FIG. 15 refer to identical or corresponding parts in FIG. 1. Referring to FIG. 15A, a shaft driving portion 21 including a motor is provided on the shaft 9. The shaft driving portion 21 is coupled to a swing apparatus 23 via an elastic substance 22. The swing apparatus 23 is connected to a belt 24 and is arranged movably along the upper surface of the abrasive cloth 1a in the vertical and horizontal directions.

The vibration detecting device (e.g., acceleration sensor) 10 are fixed to the upper surface plate 3 at a location remote from a center of the upper surface plate 3 by a distance of ¼ to ¾ times as long as a radius of the plate 3. At least a coil of the transmitting antenna 25 connected to the transmitter 13 is wound on an outer circumference of the enclosure 8 to which the transmitter 13 is attached. In addition, at least a coil of the receiving antenna 26 is wound on an outer circumference of the swing apparatus, and the receiving antenna 26 is then connected to the receiver 14 shown in FIG. 1 via a signal line 27 which being arranged along the elastic substance 22 and the belt 24. The receiving antenna 26 is surrounded by a shielding line 27a which being grounded.

An annular conductor 28 isolated from the surface is formed around the shaft 9. A conductive brush 29 which is connected to power-supply interconnection to be extended outwardly is contacted to the annular conductor 28. An electric interconnection 30 is extended from the annular conductor 28 along the internal or external surface of the shaft 9, and is connected to power supply terminal of the transmitter 13. The electric interconnection 30 is covered with the insulating substance.

If the elastic substance 7 for fixing the upper surface plate 3 on the enclosure 8 is formed of the insulating substance, the upper surface plate 3 which being formed of conductor or a metal which being evaporated on the surface of the upper surface plate 3 must be connected to an earth line so as to maintain a potential between the upper surface plate 3 and the transmitter 13 at ground potential. Thereby, only one wire will suffice to be the electric wire 30 extended in the longitudinal direction of the shaft 9 which is at ground potential.

According to the above polishing apparatus, even when the upper surface plate 3 is rotated by the shaft 9, the signal output from the transmitter 25 is transmitted through the almost annular transmitting antenna 25 being formed around the upper surface plate 3 by radio. Since the radio signal is input into the receiver 14 shown in FIG. 1 via the almost annular receiving antenna 26 being formed around the shaft driving portion 21, the radio signal is in no way interfered with the shaft 9. In this event, if the swing apparatus 23 is swung, the transmitting antenna 25 and the receiving antenna 26 are swung simultaneously and also the transmitting antenna 25 is rotated. The receiving antenna 26 is not rotated at all.

If one of the transmitting antenna 25 and the receiving antenna 26 is arranged around the shaft 9 in a substantially annular manner, transmission and reception are enabled. But to avoid instability in transmission and reception conditions due to swing of the shaft 9, it is preferable that both the transmitting antenna 25 and the receiving antenna 26 are formed to have an annular shape respectively and are formed by a coaxial arrangement.

Since dissipation power of the transmitter 13 is supplied through the electric wire 30 being arranged along the shaft 9, labor of exchanging the battery for supplying power to the transmitter 13 can be neglected, and in addition interruption of polishing because of insufficient power may be avoided to thus improve a throughput.

The abrasive cloth 1a in which the excitation portions are formed like the first embodiment may be employed. Furthermore, structures shown in the first embodiment other than a power supply system and a signal transmission system may also be adopted.

(Seventh Embodiment)

In case a plurality of objects to be polished are to be polished in parallel by using plural polishing apparatuses shown in the first and sixth embodiments, construction of a management system for managing plural polishing apparatuses is requested. Therefore, a seventh embodiment of the present invention for embodying the management system will be explained with reference to FIG. 16.

Figure 16:
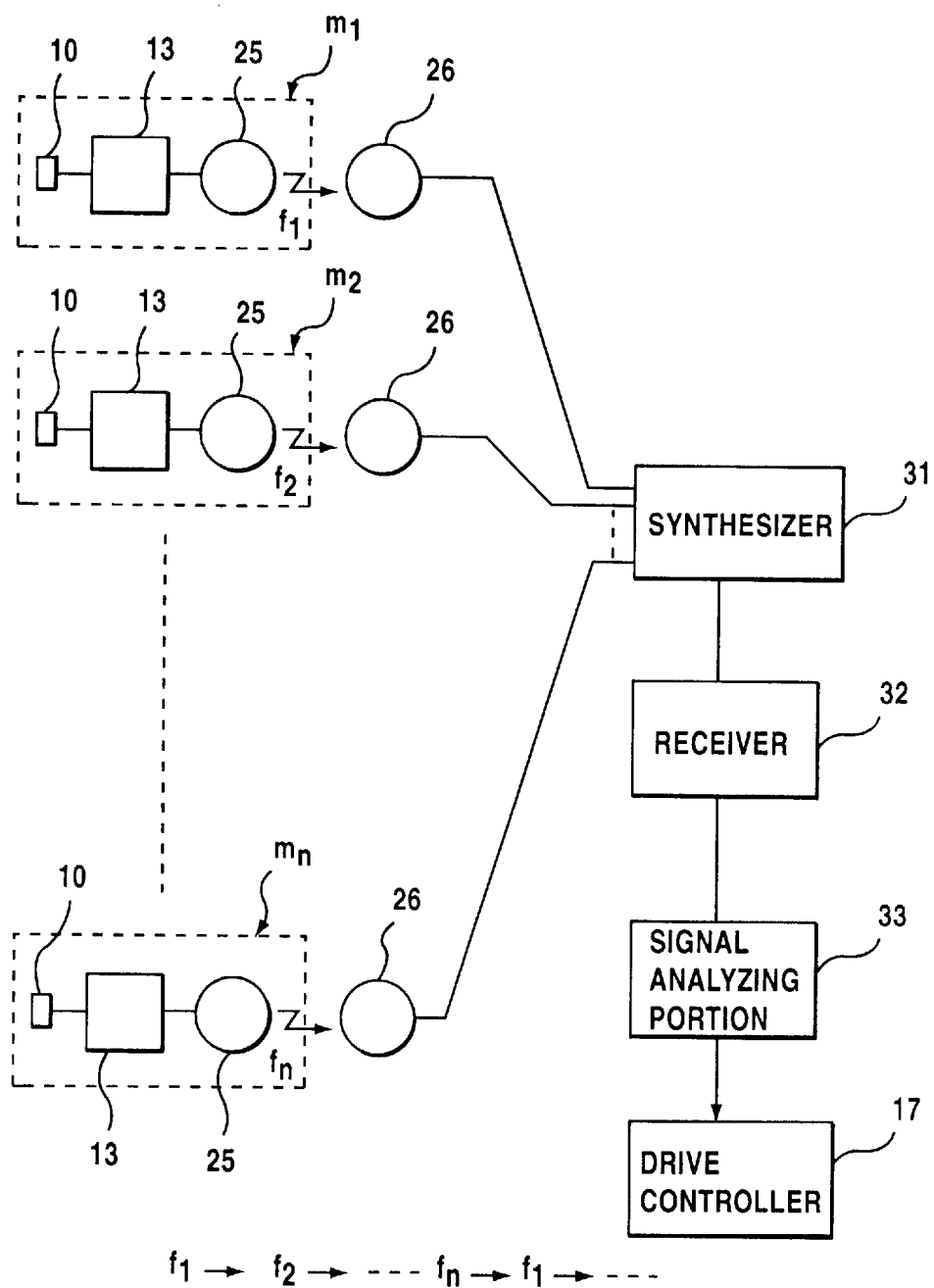
FIG. 16 is a block diagram showing a circuit configuration of a polishing apparatus according to a seventh embodiment of the present invention.

In FIG. 16, the transmitter 13 for transmitting signals $f_l$ to $f_n$ having different frequencies is attached to a plurality of polishing apparatuses $m_l$ to $m_n$ each having the above structure. The above vibration detecting devices 10 are connected respectively to the transmitters 13. The transmitters 13 are so constructed to transmit the signal through only a specific vibration frequency bandwidth by filters.

The signals being output from respective transmitters 13 are propagated via the transmitting antenna 25 and the receiving antenna 26 by radio. Signals $f_l$ to $f_n$ with different frequencies being input into the receiving antennas 26 in the upstream of the transmitting antennas 25 are input into the receiver 32 via a synthesizer 31. The receiver 32 tunes signals $f_l$ to $f_n$ supplied from a plurality of the transmitters 13 in sequence in a time division scheme every time when a signal analyzing portion 33 requests a fixed amount of received data, and transmits the tuned signals to the signal analyzzing portion 33. The receiver 32 is equipped with an automatic tuning (automatic frequency control) mechanism. The automatic tuning mechanism holds automatically variation in frequencies of tuned signals within a reference frequency bandwidth, and therefore inconveniences such as impossible reception can be avoided even if frequencies of respective signals $f_l$ to $f_n$ are shifted slightly because of temperature variation or the like. As a result, respective signals $f_l$ to $f_n$ may always be received in the best receiving conditions even when transmitting frequencies of the transmitters 13 are varied because of temperature changes and the like.

The receiver 32 transmits the signals $f_l$ to $f_n$ having frequencies identical to or most close to the tuned signals to the signal analyzing portion 33. Therefore, signal processing can be implemented normally in the signal analyzing portion 33.

The signal analyzing portion 33 controls the drive controllers 17 provided in respective polishing apparatuses $m_l$ to $m_n$ based on the signals $f_l$ to $f_n$ treated in a time division scheme so as to drive/suspend the surface plate, control the pressure, adjust the number of rotation of the surface plate, or drive/suspend the dresser.

Tuning is carried out in sequence in the order of magnitude of frequency and is repeated many times.

With the above procedures, a plurality of the polishing apparatuses can be managed effectively and optimally.

(Eighth Embodiment)

Figure 17:
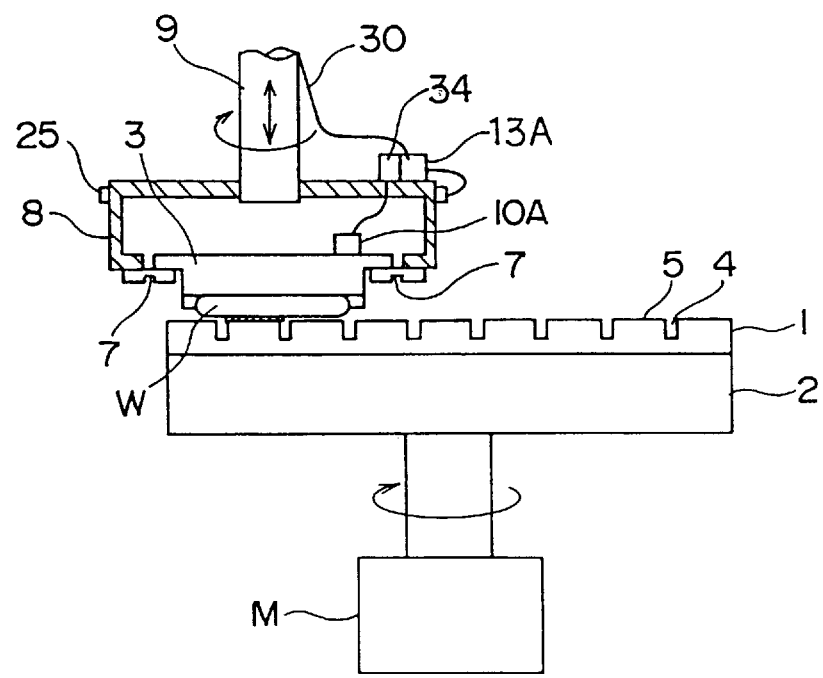
FIG. 17 is a side view showing a polishing apparatus according to an eighth embodiment of the present invention.
Figure 18:
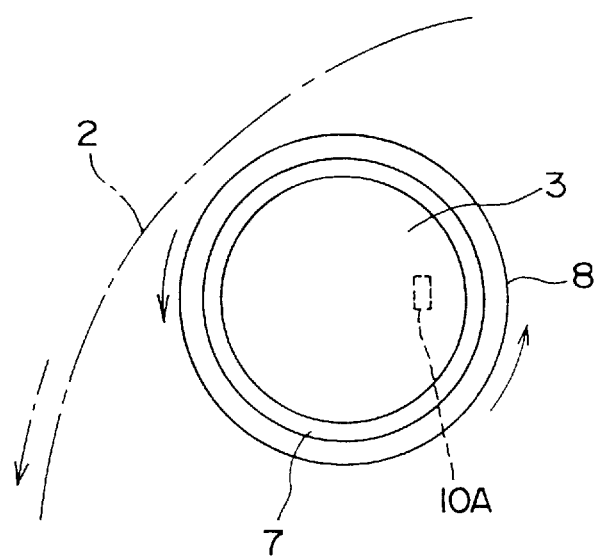
FIG. 18 is a bottom view showing an upper surface plate in the polishing apparatus according to the eighth embodiment of the present invention.

In the eighth embodiment, a polishing apparatus will be explained which controls polishing based on vibration in the circumferential direction (rotational direction) of the polished surface. FIG. 17 is a side view showing the polishing apparatus according to the eighth embodiment of the present invention. FIG. 18 is a bottom view showing the upper surface plate in the polishing apparatus according to the eighth embodiment. Like reference symbols in FIG. 17 designate identical or corresponding parts in FIGS. 1 and 15, and parts not illustrated in FIG. 17 have the same structures as any of those in FIGS. 1 and 15.

In the eighth embodiment, material of the elastic substance 7 for connecting the air-back type enclosure 8 to the upper surface plate 3 is not restricted particularly, but mechanical strength of the elastic substance 7 can be increased if rubber sheets having a multilayered structure in which a cloth is superposed therein or a plurality of stacked rubber sheets is used.

The vibration detecting device 10A is attached on the upper surface plate 3, and is directed so as to detect minute vibration in the circumferential direction of the upper surface plate 3, as shown in FIG. 18. The vibration detecting device 10A is so constructed that it can select the direction of vibration to be detected by changing its direction. The vibration detecting devices 10 in the above first to seventh embodiments have been directed to detect vertical vibration.

The vibration detecting device 10A is connected to a transmitter 13A on the enclosure 8 via a signal line. A signal output terminal of the transmitter 13A is connected to an annular transmitting antenna 25 formed on an outer circumferential surface of the enclosure 8. A power supply terminal of the transmitter 13A is connected to an annular conductor 28 shown in FIG. 15. A mechanism for receiving a radio signal output from the annular transmitting antenna 25 is formed so as to include the annular receiving antenna 26 shown in FIG. 15.

In FIG. 17, a reference numeral 34 denotes an integrated circuit including a first amplifier 34a, a filter 34b, and a second amplifier 34c, which will be described later.

Figure 19:
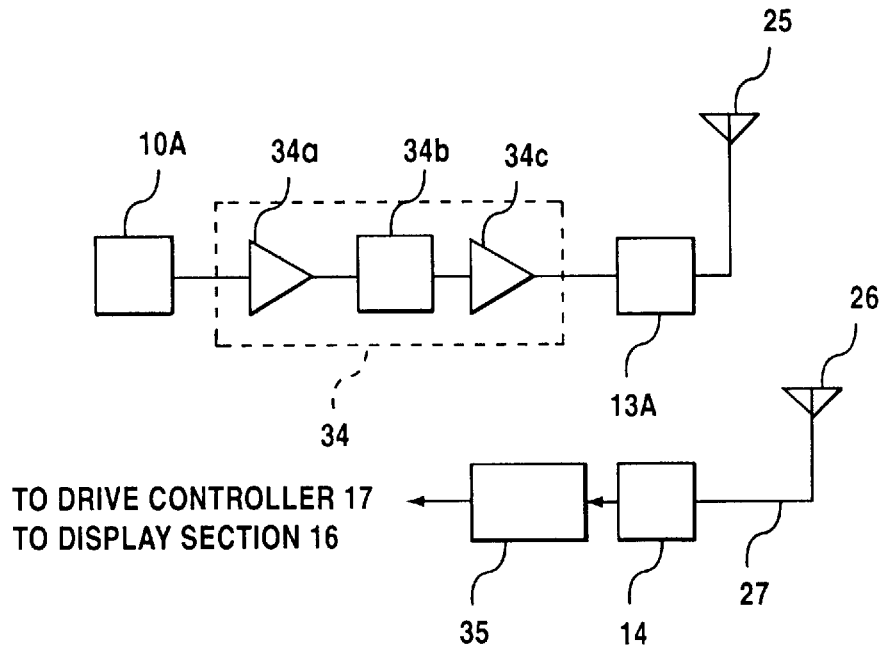
FIG. 19 is a block diagram showing a signal system in the polishing apparatus according to the eighth embodiment of the present invention.

FIG. 19 shows circuit configurations of a transmission system and a reception system in the polishing apparatus according to the eighth embodiment.

The vibration detecting device 10A is connected to the transmitter 13A via the first amplifier 34a, the filter 34b, and the second amplifier 34c by a wire. Such vibration detecting device 10A is used that its sensitivity is equivalent to 50 mV/G (about 50 μV/Gal) or more and its noise level is equivalent to 1 mG (about 1 Gal) or less. If an acceleration sensor is used as the vibration detecting device 10A, either its resonance frequency is more than 20 kHz or the sensor vibrates in resonance with the frequency at which vibration intensity is changed with the progress of polishing.

The first amplifier 34a has an amplification factor of 500, the filter 34b is a bandpass filter over 10 Hz to 30 kHz, and the second amplifier 34c has an amplification factor of 1/50. An FM transmitter is used as the transmitter 13A, for instance.

Figure 20:
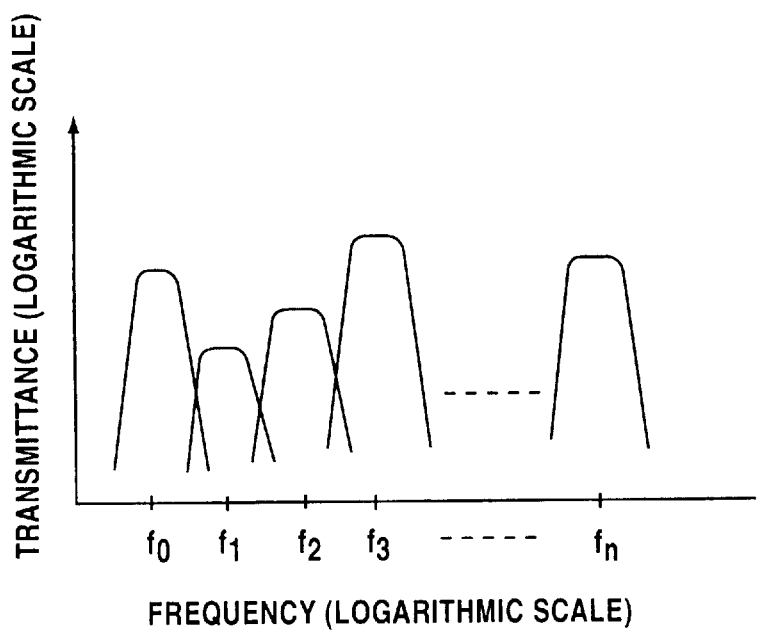
FIG. 20 is a chart illustrating an example of relationship between passing frequency and signal transmittance of plural bandpass filters applied to the polishing apparatus according to the eighth embodiment of the present invention.

Operational amplifiers on the market may be utilized as the first amplifier 34a and the second amplifier 34c. The filter 34b may be formed by employing in combination a plurality of bandpass filter like graphic equalizers with different center frequencies so as to respond immediately to change in vibration mode because of change in polishing conditions, exchange of the object to be polished, or reconstruction of the polishing apparatus, otherwise the filter 34b may be formed by employing a programmable bandpass filter so as to modify its transmittance in respective vibration frequency bandwidths. An example of a filter characteristic obtained by graphic equalizers is shown in FIG. 20. It is preferable that the bandpass filters having attenuation rate of more than 34 dB/oct and bandwidths which are equivalent to their center frequencies or less or are about 1 kHz are used.

Meanwhile, in the reception system, the receiver 14 connected to the receiving antenna 26 comprises a processing portion 35 having the signal analyzing portion 15, and the drive controller 17, shown in FIG. 1. The processing portion 35 comprises an FFT analyzer, a CPU board, or a so-called personal computer. The processing portion 35 is composed to receive spectrum of vibration frequency from about 10 Hz to about 30 kHz.

Although the configuration for measuring proper polishing vibration has been explained in the above, other vibrations caused by the motor for rotating the lower surface plate 2 and the upper surface plate 3, for example, are input in actual into the vibration detecting device 10A. Therefore, it is preferable that the polishing apparatus is constructed so as to achieve that vibration of the upper surface plate 3 caused by vibration of the polishing apparatus itself is less than 50 mG (about 50 Gal). As a method of determining whether or not vibration is less than 50 mG, polishing vibrations which influence the upper surface plate 3 may be measured if a flat wafer is used as the object to be polished W.

Next, end-point detection of polishing will be explained by employing the above polishing apparatus.

First, polishing of the object to be polished W is commenced by rotating the lower surface plate 2 and the upper surface plate 3 and pushing the object to be polished W being stuck to a lower surface of the lower surface plate 2 to the abrasive cloth 1. As explained in the first embodiment, the abrasive cloth 1 includes the lattice-like grooves 4 and the vibration portions 5.

Figure 21:
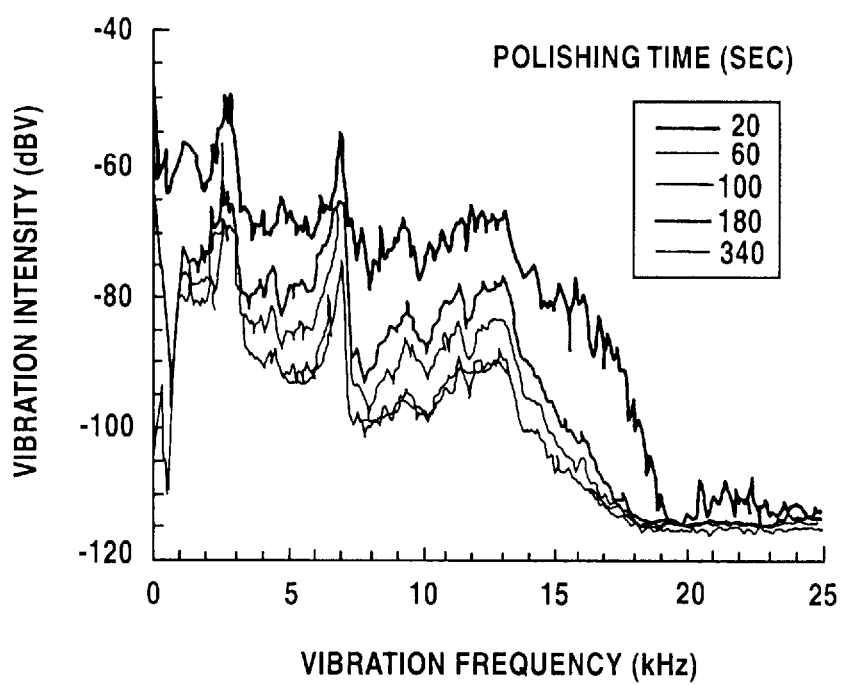
FIG. 21 is a graph illustrative of spectra showing relations between vibration frequency and vibration intensity detected by a vibration detecting device in the polishing apparatus according to the eighth embodiment of the present invention.

It has been investigated how a relation between vibration frequency of 0 to 25 kHz in the circumferential direction of the upper surface plate 3 and vibration intensity is varied with respect to polishing time. As a result, the result shown in FIG. 21 has been derived. It can be seen that vibration intensity is reduced over all vibration frequency bandwidths with the progress of polishing.

Then, a vibration signal detected by the vibration detecting device 10A is input into the processing portion 35 via the transmitter 13A and the receiver 14. The processing portion 35 compares the vibration signal in measuring with reference spectrum as a reference value, and determines that polishing is ended when a ratio of the integral value of vibration intensity in a particular frequency bandwidth against the integral value of reference spectrum is decreased below a predetermined threshold value or when an amount of time variation in the integral value of vibration intensity in a particular frequency bandwidth is reduced below a predetermined threshold value.

Performance of the radio transmitter 13A is largely affected by detection precision of vibration signal. The characteristics required for the first amplifier 34a, the second amplifier 34c and the filter 34b and transmitted vibration signals are determined by carrying out the following procedures.

First, vibration intensity of the upper surface plate 3 is measured by wire. Subsequently, an amplification factor of the first amplifier 34a is decided such that voltage obtained by amplifying the vibration intensity signal does not exceeds an allowable input voltage of the filter 34b. In addition, an amplification factor of the second amplifier 34c is decided such that voltage obtained by amplifying the vibration intensity signal passed through the filter 34b does not exceeds an allowable input voltage of the transmitter 13A.

In turn, a transmittance frequency bandwidth of the filter 34b in the vibration intensity frequency is decided. First, vibration frequency is transmitted by radio while carrying out polishing actually, and vibration frequency not to change vibration intensity is examined even when polishing advances. The transmittance frequency bandwidth not to transmit the vibration frequency is thus determined. Vibration components to which vibration intensity does not change even when polishing proceeds are vibration noises caused by the polishing apparatus itself.

Degradation of the abrasive cloth 1 and density change of the polishing liquid can be known by comparing a profile of spectrum measured beforehand with that of actual spectrum. In case these information are not needed and only end-point of polishing is to be detected, the vibration intensity signal in a particular frequency range may be converted into a DC signal corresponding to the root-mean-square value in the preceding stage of the transmitter 13A and then the DC signal may be transmitted from the transmitter 13A to the receiver 14.

In order to expand the amplitude range upon transmitting the vibration signal by radio, it would be understood that the vibration signal may be amplified by the logarithmic amplifier to be transmitted from the transmitter 13A by radio, then radio signal may be received by the receiver 14, and then the received signal may be restored into the original signal by the inverse logarithmic amplifier.

Figure 15B:
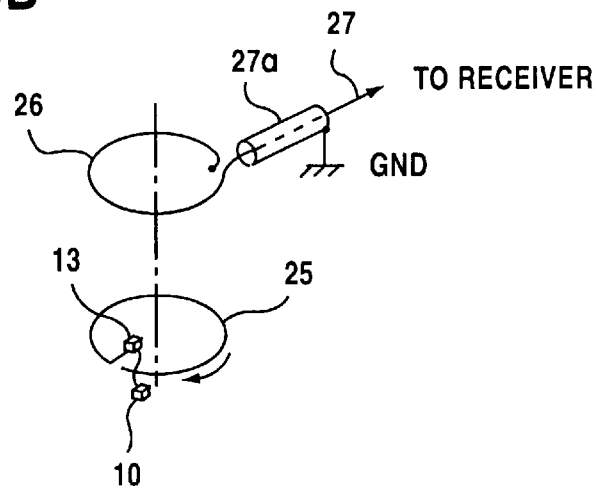
FIG. 15B is a perspective view showing an arrangement relation between a transmitting antenna and a receiving antenna in the polishing apparatus according to the sixth embodiment of the present invention.

Although in the eighth embodiment power is supplied to the oscillator 13A by virtue of the annular conductor 28, as shown in FIG. 15, but the battery may be used. Furthermore, the transmitter 13A may transmit the signal to the receiver 14 by means of an annular signal conductor having the same structure as that of the annular conductor for power supply by wire in place of radio. In addition, although the transmitter 13A is attached to the outside of the enclosure 8, it may be attached to the inner side of the cavity in the enclosure 8 like the vibration detecting device 10.

One upper surface plate 3 has been arranged on one lower surface plate 2 in FIG. 17. But, in the event that a polishing apparatus is employed wherein a plurality of upper surface plates may be displaced on one lower surface plate 2 or plural sets of the lower surface plates 2 and the upper surface plates 3 are provided, proceeding and end of polishing are respectively controlled independently by providing the above structure to every head.

The amplifiers and the filters explained in the eighth embodiment may be applied to the polishing apparatus discussed in the first to seventh embodiments.

(Ninth Embodiment)

Though the case where one vibration detecting device 10A is attached has been explained in the eighth embodiment, a rotation balance of the upper surface plate 3 can be improved to thus stabilize vibration of the upper surface plate 3 in rotating if a weight having the same weight as that of the vibration detecting device 10A or a second vibration detecting device is attached on the upper surface plate 3 in symmetrical to the vibration detecting device 10A.

Figure 22A:
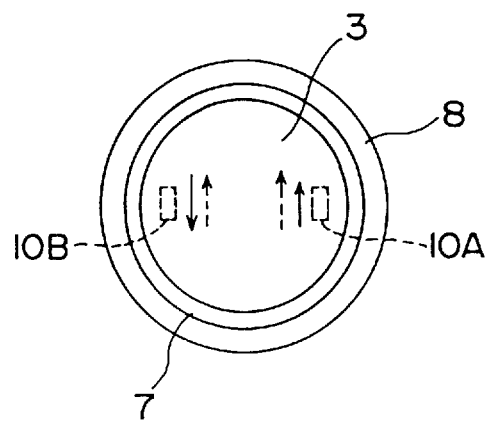
FIG. 22A is a side view showing a polishing apparatus according to a ninth embodiment of the present invention.
Figure 22B:
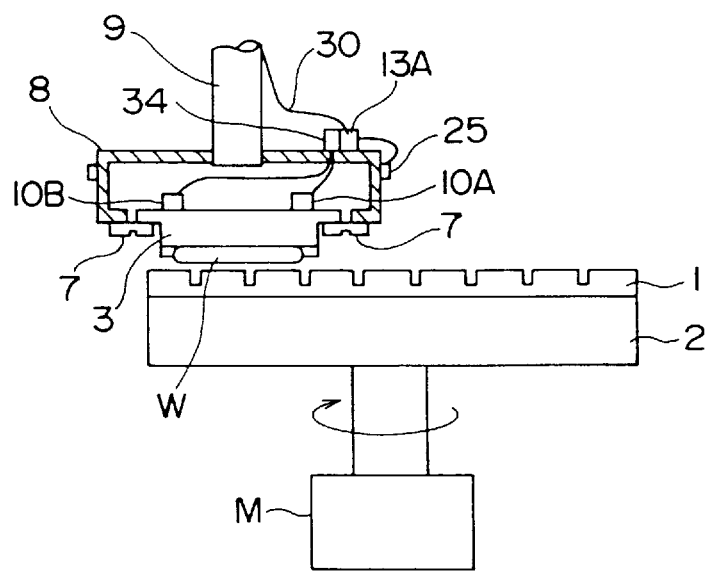
FIG. 22B is a bottom view showing an upper surface plate in the polishing apparatus according to the ninth embodiment of the present invention.

FIG. 22 shows a polishing apparatus to which the second vibration detecting device is attached. In this configuration, vibration noise caused by two vibration detecting devices 10A, 10B can be reduced by employing a circuit configuration discussed hereinbelow.

The vibration noise is caused due to a vibration component in the direction perpendicular to the measuring direction. In general, the vibration detecting devices 10A, 10B has a sensitivity of several % to the vibration component in the direction perpendicular to the measuring direction. In the ninth embodiment, the vibration component in the perpendicular direction is vibration in the vertical direction.

Figure 23A:
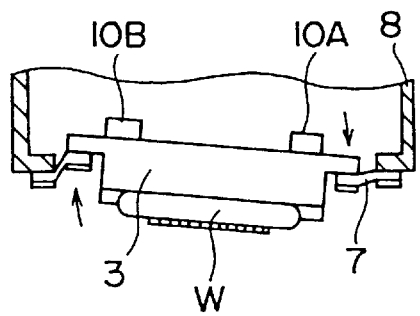
FIGS. 23A and 23B are side views showing a first example of vertical vibration of the upper surface plate in the polishing apparatus according to the ninth embodiment of the present invention.
Figure 23B:
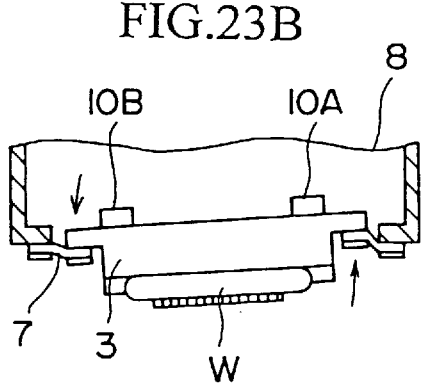
Figure 24A:
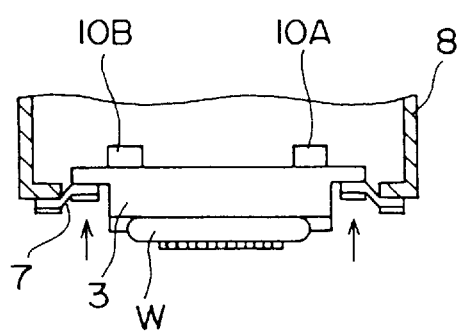
FIGS. 24A and 24B are side views showing a second example of vertical vibration of the upper surface plate in the polishing apparatus according to the ninth embodiment of the present invention.
Figure 24B:
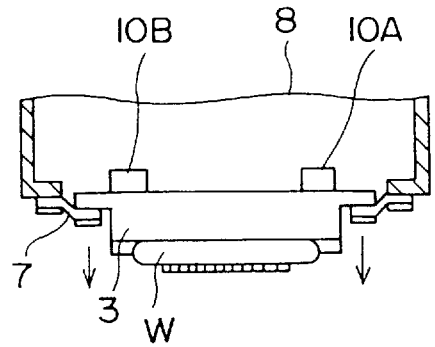

In FIG. 22, there are two cases where two vertical vibration noises being input respectively into two vibration detecting devices 10A, 10B are in the opposite directions, as shown in FIGS. 23A and 23B, and they are in the same directions, as shown in FIGS. 24A and 24B.

In case vertical vibration noises are caused in the opposite direction as shown in FIG. 23, an adder 36 is connected to output terminals of the first amplifiers 34d, 34e being connected to output terminals of the vibration detecting devices 10A, 10B, and thus output terminals of the adder 36 is connected to the filter 34b. In this event, as indicated by an arrow of a solid line in FIG. 22A, two vibration detecting devices 10A, 10B are respectively arranged so as to detect rotational vibration of the upper surface plate 3 in the same circumferential direction.

By arranging two vibration detecting devices 10A, 10B and inserting the adder 36 into the output side of the first amplifiers 34d, 34e, vertical vibration noise can be canceled or reduced. In addition, since vibration intensity in the circumferential direction which being input into the filter 34b is increased two times, an S/N ratio can be improved.

Figure 25A:
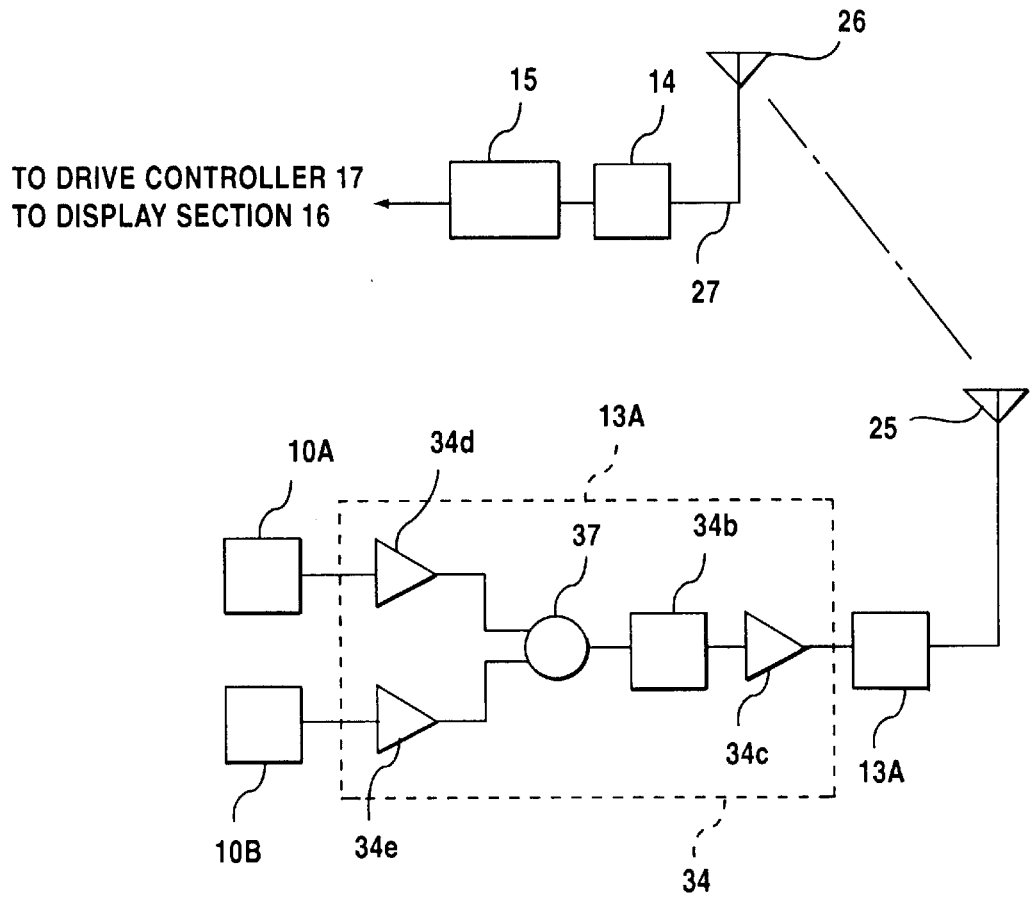
FIGS. 25A and 25B are block diagrams showing respectively examples of the signal system applied to the polishing apparatus according to the ninth embodiment of the present invention.
Figure 25B:
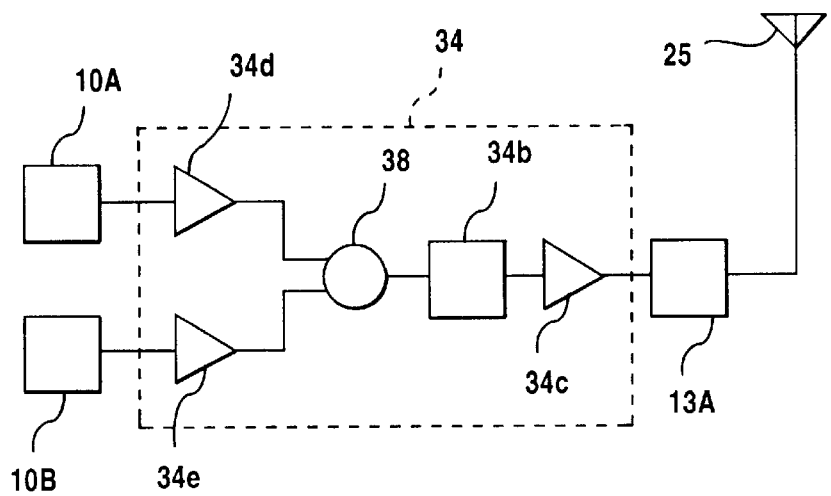

On the other hand, if vertical vibration noises are generated as shown in FIGS. 24A and 24B, a subtractor 38 is connected to output terminals of the first amplifiers 34d, 34e being connected to output terminals of the vibration detecting devices 10A, 10B, as shown in FIG. 25B, and thus output terminals of the subtractor 38 is connected to the filter 34b. In this event, as indicated by an arrow of a broken line in FIG. 22A, two vibration detecting devices 10A, 10B are respectively arranged so as to detect rotational vibration of the upper surface plate 3 in the opposite circumferential direction.

By arranging two vibration detecting devices 10A, 10B and inserting the subtractor 38 into the output side of the first amplifiers 24d, 24e, vibration noise can be reduced by adding opposite vibration noises. In addition, since absolute values of vibration intensity in the circumferential direction which being input into the filter 34b is increased two times by the subtractor 38, an S/N ratio can also be improved.

Depending on the polishing apparatus and the polishing conditions, it can be decided that vertical vibration shown in FIGS. 23A and 23B or vertical vibration shown in FIGS. 24A and 24B is set up in the upper surface plate 3. Therefore, it must be examined beforehand that the upper surface plate 3 takes either of vertical vibrations. Vertical vibrations of this kind may be selected by changing the direction of arrangement of two vibration detecting devices 10A, 10B or by selecting the adder or the subtractor to reduce noises mostly.

In the ninth embodiment, vibration component in the circumferential direction is selected as the detection object and vertical vibration component is neglected. But if vertical vibration component is selected as the detection object, vibration component in the circumferential direction is neglected. In this case, it is necessary to modify directions of two vibration detecting devices 10A, 10B.

(Tenth Embodiment)

Figure 26A:
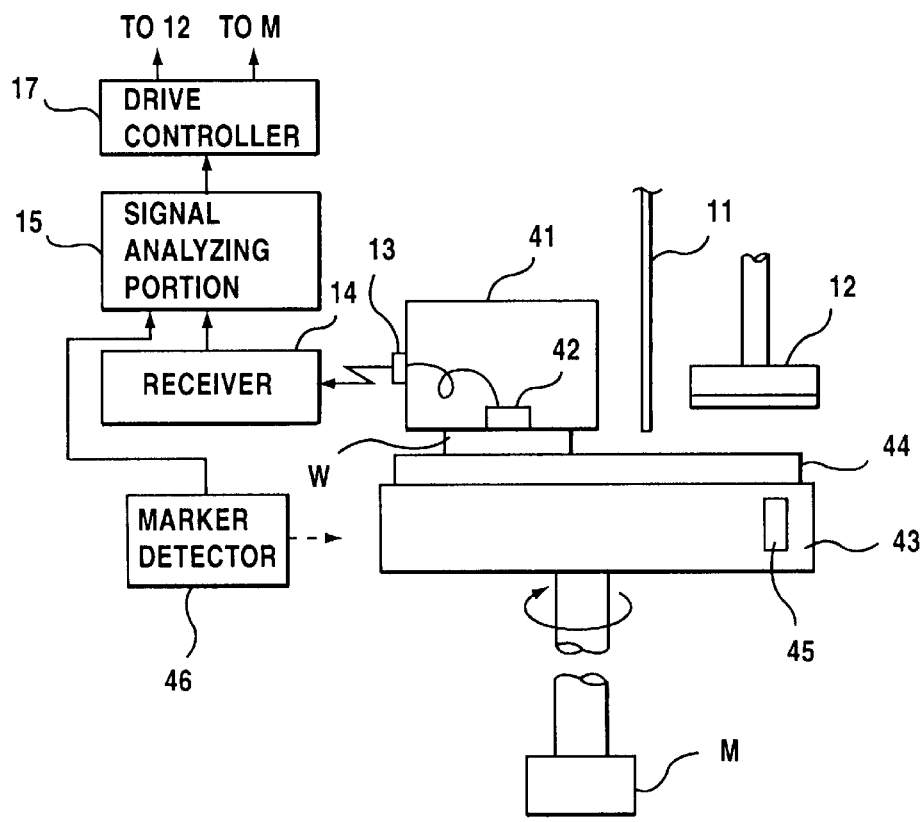
FIGS. 26A and 26B are respectively a side view and a plan view showing a polishing apparatus according to a tenth embodiment of the present invention.
Figure 26B:
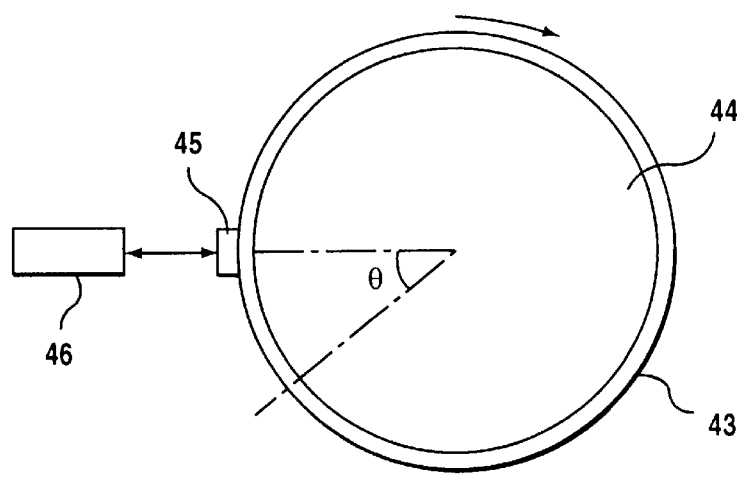

FIG. 26A is a side view showing a polishing apparatus according to a tenth embodiment of the present invention. The tenth embodiment may prevent the polished surface from being scratched by the dust in polishing, and facilitate removing of the dust. As the dust to scratch the polished surface, there are dried and stiffened silicon oxide included in the polishing liquid, fragment of the object to be polished, etc.

In FIG. 26A, an acceleration detecting device (vibration detecting device) 42 is arranged on the surface of a deadweight type upper surface plate 41. The semiconductor wafer as the object to be polished W, for example, is pasted up on the lower surface of the upper surface plate 41, which is mounted on an abrasive cloth 44 stuck to a lower surface plate 43.

A marker 45 having a large light reflection factor is fixed to the side surface of the lower surface plate 43. A marker position detector 46 is positioned on the side of the lower surface plate 43 to detect whether or not the marker 45 is positioned at a predetermined location. The marker position detector 46 comprises a light emitting device and a light receiving device and a quantity of received light is increased if it receives a reflected light from the marker 45, and therefore it may detect the existence of the marker 45.

A signal from the acceleration sensor 42 on the upper surface plate 41 is input into the signal analyzing portion 15 via the transmitter 13 and the receiver 14 shown in the first embodiment.

In the above polishing apparatus, the lower surface plate 43 is not rotated but the object to be polished W is rotated by the abrasive cloth 44. In this case, the object to be polished W is shifted in the fixed direction by an arm not shown. Vibration information of the upper surface plate 41 detected by the acceleration sensor 42 is input into the signal analyzing portion 15 at least a time or continuously via the transmitter 13 and the receiver 14 shown in the first embodiment every time when the marker 45 is rotated.

Figure 27A:
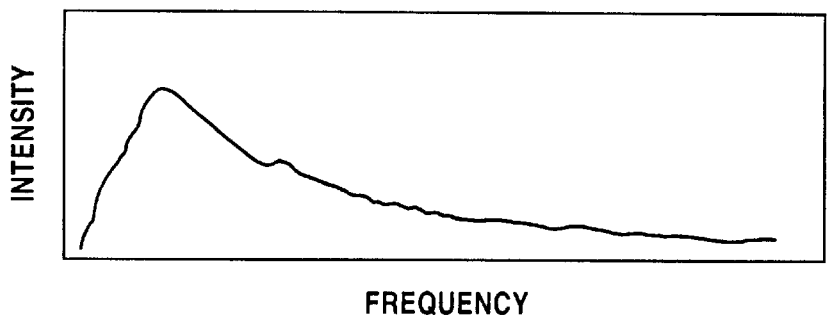
FIGS. 27A and 27B are graphs illustrating respectively a relation between vibration frequency and vibration intensity according to the tenth embodiment of the present invention.
Figure 27B:
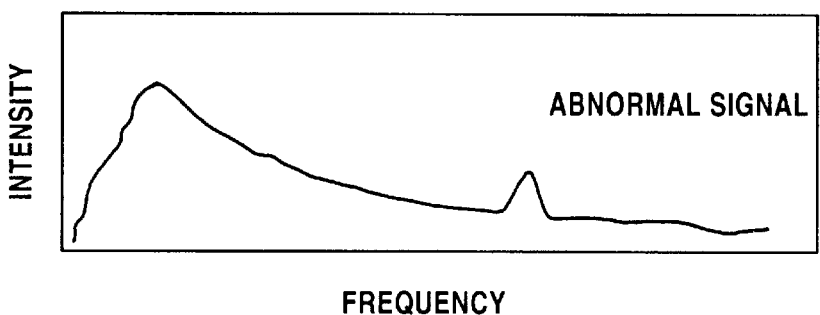

In case polishing is implemented properly, a spectrum between vibration frequency and vibration intensity in FIG. 27A can be derived. Conversely, in case the polished surface of the object to be polished W is scratched by the dust on the abrasive cloth 44, vibration intensity is increased in part of the frequency bandwidth, as shown in FIG. 27B. An increased spectrum serving as the decision criterion may be examined previously, otherwise spectrum before scratching may be used as the decision criterion.

If the dust is detected on the polished surface because of change in vibration intensity, the drive controller 17 may carried out such control that it lets the nozzle 11 supply the water to the abrasive cloth 44 and also lets the dresser 12 drive to thus remove the dust on the surface of the abrasive cloth 44 to the outside of the lower surface plate 43, and then restarts polishing.

Figure 28:
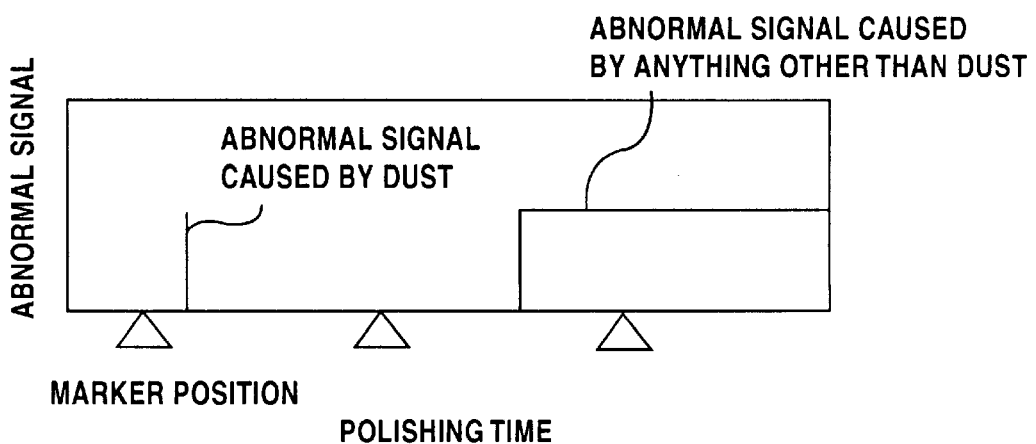
FIG. 28 is a view illustrating spectrum showing abnormal signal caused by dust and abnormal signal caused by anything other than dust in the polishing apparatus according to the tenth embodiment of the present invention.

If a location of the dust is to be identified, the following process will be accomplished. When vibration information of the upper surface plate 41 is input continuously to the signal analyzing portion 15 in polishing, it can be found when the marker 43 is detected by the marker detector 46. Hence, if the period of the marker 43 is recorded on the time axis as a marker location and in addition the abnormal signal is recorded, a characteristic as shown in FIG. 28 can be achieved, for example. Since the marker location appears periodically, generation time of the abnormal signal is recorded on the time axis if the scratch is formed by the dust on the polished surface. From the rate of the time interval between the marker locations to the time elapsed from the marker location to the generation of the abnormal signal, an angle θ indicating location of the dust can be detected readily relative to the line connecting the center of the abrasive cloth 44 with the marker 44.

Hence, the signal analyzing portion 15 outputs the drive signal to the drive controller 17 so as to make the dresser 12 drive. As a result, the surface of the abrasive cloth 44 is swept by the dresser 12 at least along a normal line of the angle θ to remove the dust in a short time.

If the abnormal signal is generated on the same location again and again after sweep is carried out by the dresser 12, or if the abnormal signal is generated on the same location after the object to be polished W is exchanged, polishing must be stopped immediately and the abnormal signal is generated to inform the operator of an anomalous state. The operator can then eliminate causes of the abnormal signal. As a result, since next polishing of the object to be polished W can be commenced in a normal state, the number of wasted polished object W, e.g., semiconductor wafer can be reduced to thus improve polishing efficiency.

As shown in FIG. 28, if the abnormal signal is halted within one period of the marker, it would be understood that the abnormal signal is generated by the dust. However, if the abnormal signal is continued over more then one periods of the marker, there is a strong possibility that the abnormal signal is generated by the cause other than the dust. In this event, it is requested that the signal analyzing portion 15 issues a stop instruction to stop polishing operation completely and also the abnormal signal sound is generated to inform the operator of the anomalous condition in addition to the stop instruction.

(Eleventh Embodiment)

An apparatus wherein an S/N ratio of the output of the vibration detecting device and an S/N ratio of the vibration input into the vibration detecting device can be improved will be explained with reference to FIGS. 29 to 35 in the eleventh embodiment. Noises in vibration input into the vibration detecting device are vibrations except for the vibration caused by friction between the object to be polished W and the abrasive cloth 1 and are generated mainly by the motor. Such noise is referred to as a background noise hereinafter.

In FIGS. 29 to 35, the reason why the vibration detecting device 10 is positioned at the center on the upper surface of the upper surface plate (bottom plate of the head) 3 is that the relative velocity between the object to be polished W as the vibration detected object and the abrasive cloth 1 may be stabilized to reduce detection error. A fundamental structure of the apparatus in the eleventh embodiment is similar to those in the first and seventh embodiments. Like reference symbols in the eleventh embodiment are intended to designate the same parts in those embodiments.

Figure 29:
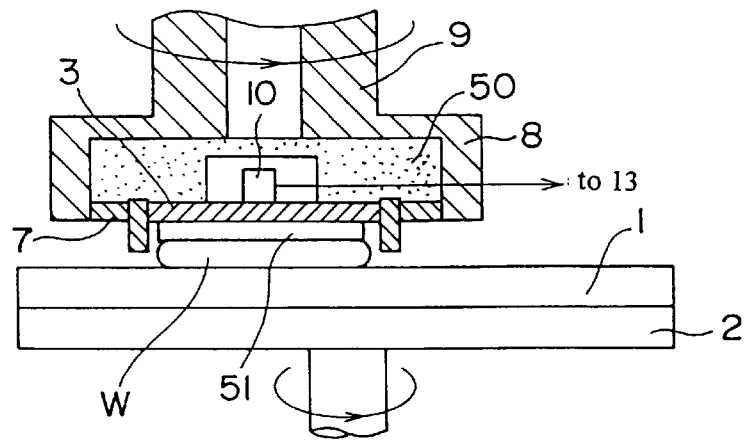
FIG. 29 is a side view, partially in section, showing an example wherein a noise absorbing material is provided in a head in a polishing apparatus according to an eleventh embodiment of the present invention.

In FIG. 29, a structure is adopted wherein the vibration detecting device 10 is surrounded by a sound-proof/sound absorbing material 50 through a clearance in the cavity in the enclosure 8 of the head. The sound-proof/sound absorbing material 50 is formed of an elastic substance such as a bellows type spring, rubber, etc. or porous resin which enables free vibration of the upper surface plate 3.

According to the above structure, a background noise propagated in a space in the enclosure 8 can be prevented and absorbed and therefore an S/N ratio input into the vibration detecting device 10 can be improved. Moreover, since the clearance is formed between the vibration detecting device 10 and the sound-proof/sound absorbing material 50, no new noise due to friction between the vibration detecting device 10 and the sound-proof/sound absorbing material 50 is generated.

When the natural vibration frequency of the upper surface plate 3 is set not to coincide with vibration frequency of the background noise, the S/N ratio can be further improved.

In FIG. 29, a reference 51 denotes an inner sheet which is interposed between the upper surface plate 3 and the object to be polished W to absorb variation in thickness of the object to be polished W.

Figure 30:
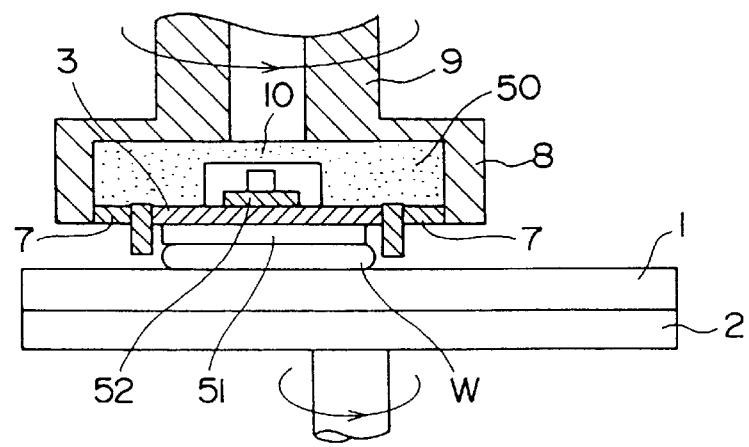
FIG. 30 is a side view, partially in section, showing an example wherein a vibrator is attached to a bottom of a vibration detecting device in the polishing apparatus according to the eleventh embodiment of the present invention.

FIG. 30 shows an apparatus wherein a resonance plate 52 is interposed between the vibration detecting device 10 and the upper surface plate 3 shown in FIG. 29. The resonance plate 52 vibrates in resonance with a particular frequency to be measured, and is formed of a spring coil, for example.

According to the apparatus, a background noise having a frequency being different from that of a resonance frequency of the resonance plate 52 is shielded by the resonance plate 52 and prevented from being input into the vibration detecting device 10. Therefore, the S/N ratio of input into the vibration detecting device 10 can be improved.

Figure 31:
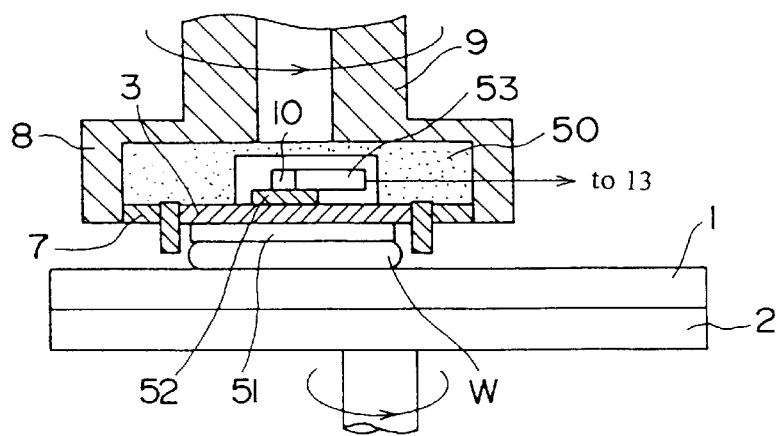
FIG. 31 is a side view, partially in section, showing an example wherein the vibrator is attached to the bottom of the vibration detecting device in the polishing apparatus according to the eleventh embodiment of the present invention.

FIG. 31 shows an apparatus wherein an amplifier 53 is provided on the side of the resonator 10 shown in FIG. 30.

In case an impedance of the vibration detecting device 10 per se is high, the noise is ready to input the output signal of the vibration detecting device 10 if the connection interconnection between the amplifier 53 and the vibration detecting device 10 is long. However, the connection interconnection is lessened by providing both the resonance 10 and the amplifier 53 on the upper surface plate 3, so that the noise being mixed into the vibration signal can be reduced significantly. As a result, the S/N ratio can also be improved.

Figure 32:
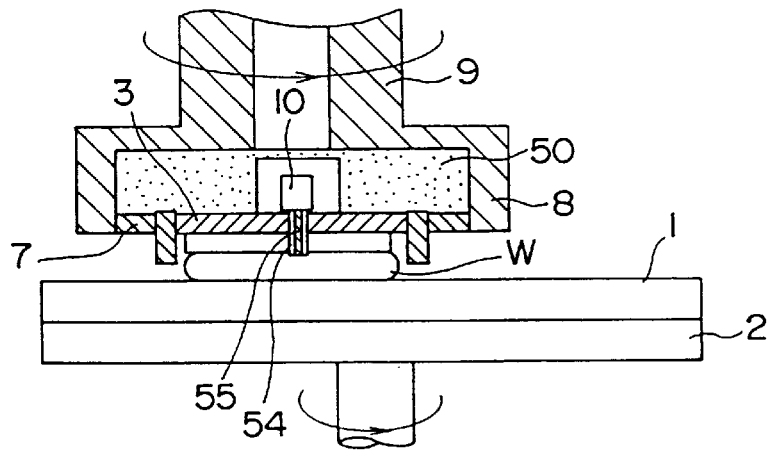
FIG. 32 is a side view, partially in section, showing an example wherein a vibration transmitting needle is interposed between the vibration detecting device and the detected object in the polishing apparatus according to the eleventh embodiment of the present invention.

In the head of the polishing apparatus shown in FIG. 32, a through hole 54 is formed in both the upper surface plate 3 and the inner sheet 51, and a vibration transmitting needle 55 contacting to both the vibration detecting device 10 and the object to be polished W is passed through the through hole 54. Vibration caused by friction between the abrasive cloth and the detected object W is not absorbed by the inner sheet 51, but transmitted to the vibration detecting device 10 via the vibration transmitting needle 55. Therefore, vibration intensity being input into the vibration detecting device 10 is enhanced to therefore improve the S/N ratio.

Figure 33:
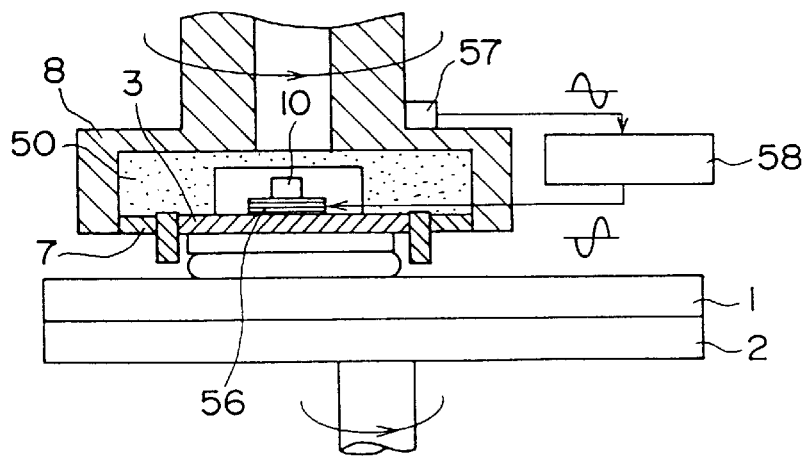
FIG. 33 is a side view, partially in section, showing an example wherein a circuit for removing noise vibration which being input into the vibration detecting device in the polishing apparatus according to the eleventh embodiment of the present invention.

FIG. 33 shows an apparatus wherein a vibration plate 56 is provided between the vibration detecting device 10 and the upper surface plate 3 shown in FIG. 29, and a second vibration detecting device 57 for measuring background noises is mounted on the enclosure 8. The background noise signal being output from the second vibration detecting device 57 is converted in opposite phase by a vibration controller 58, and then the vibration plate 56 is vibrated by the signal having the same waveform as that in opposite phase output from the vibration controller 58. The vibration plate 56 is formed of piezoelectric material such as piezo device.

According to the apparatus, vibration generated in the vibration plate 56 can cancel the background noise being input into the vibration detecting device 10. Hence, vibration caused by friction between the abrasive cloth 1 and the object to be polished W can be input selectively into the vibration detecting device 10. Thus, the S/N ratio can be improved extremely.

Figure 34:
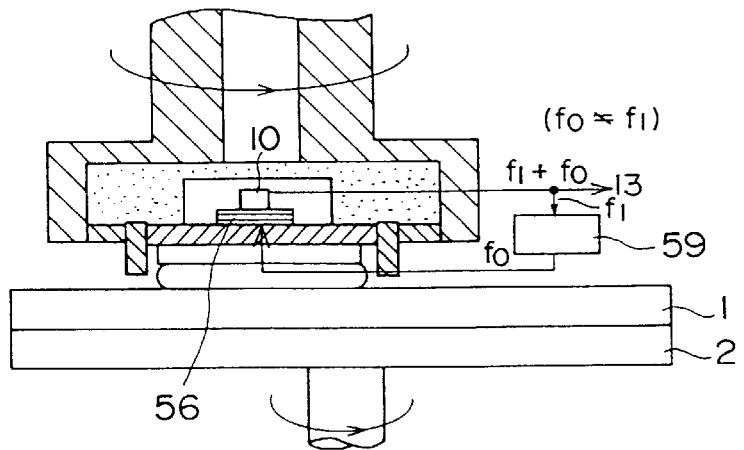
FIG. 34 is a side view, partially in section, showing an example wherein a circuit for changing vibration frequency which being input into the vibration detecting device in the polishing apparatus according to the eleventh embodiment of the present invention.

Meanwhile, the vibration detecting device 10 has the sensitivity to the resonance frequency f0 of 5 to 10 times the sensitivity to other frequencies. However, there is a case where the frequency $f_I$ of vibration to be detected does not coincide with the resonance frequency f0. In this case, as shown in FIG. 34, vibration in the detected frequency $f_I$ is first input into a frequency converting circuit 59 and then the vibration plate 56 is vibrated in the frequency f0 at the same intensity or proportional intensity as that of the vibration frequency $f_I$ detected by the frequency converting circuit 59 so as to feed back vibration in the frequency f0 to the vibration detecting device 10, so that it is feasible to detect vibration in high sensitivity. In this event, vibration in the frequency f0 is processed as discussed the first or sixth embodiments.

Figure 35:
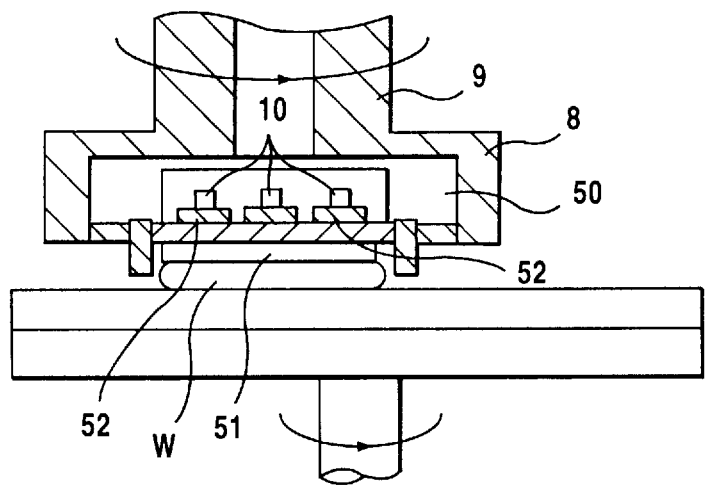
FIG. 35 is a side view, partially in section, showing an example wherein a plurality of vibration detecting devices and a plurality of vibration plates attached to respective bottoms thereof are provided in the polishing apparatus according to the eleventh embodiment of the present invention.

FIG. 35 shows an apparatus wherein a plurality of vibration detecting devices 10 shown in FIG. 29 are arranged on the upper surface plate 3 and a plurality of vibration plates 52 are interposed between the vibration detecting devices 10 and the upper surface plate 3 respectively. Respective sensitivities of the vibration detecting devices 10 are examined by applying a constant signal to respective vibration plates 52. Thereby, the vibration detecting device 10 having the highest sensitivity to vibration frequency to be detected can be selected by a selection circuit (not shown).

Variation in the characteristics of the vibration detecting devices 10 can be prevented, and another vibration detecting devices 10 can be selected by an electric circuit in place of the degraded vibration detecting devices 10. As a result, time and labor required for exchange operation of the vibration detecting devices 10 can be reduced.

As a method of improving the S/N ratio except for the above method, power supply for part or all motors in the polishing apparatus may be stopped in polishing. According to this method, the background noise can be significantly reduced. The stop time is set less than several seconds. Since the head and the lower surface plate 2 is continued to rotate by inertia for several seconds, polishing process can be continued. The time less than several seconds is sufficient to detect vibration and no trouble is caused in vibration detection. Power supply for the motor is stopped by the control signal from the drive controller 17 shown in FIG. 1.

If output from the vibration detecting devices 10 are output to the outside via the amplifier and the filter shown in the eighth embodiment, otherwise output to the outside after A/D conversion, noises generated in a signal transmission system can be reduced. In case A/D converted signal is transmitted by radio, an A/D converter (not shown) is provided between the oscillator 13A and the vibration detecting device 10A shown in FIG. 17.

Furthermore, if the head is being swung, the background noise due to the swing motion is enhanced at the location where the direction of the head is varied. For this reason, vibration detection should be avoided there.

Figure 36:
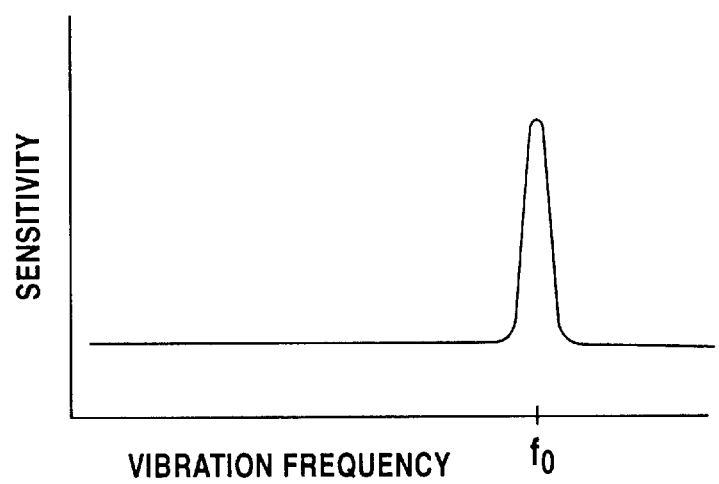
FIG. 36 is a characteristic view illustrating a relation between vibration frequency and sensitivity of the vibration detecting device applied to the polishing apparatus according to the eleventh embodiment of the present invention.

As an example of respective vibration detecting devices, there are piezoelectric device acceleration sensors of the types CE507M101, CE507M301 manufactured by Vibrometer Co. in the U.S., and if these sensors are used, as shown in FIG. 36, it is desired that vibration intensity is detected in the resonance frequency to achieve a high sensitivity. This can be applied to the above respective embodiments.

Figure 37:
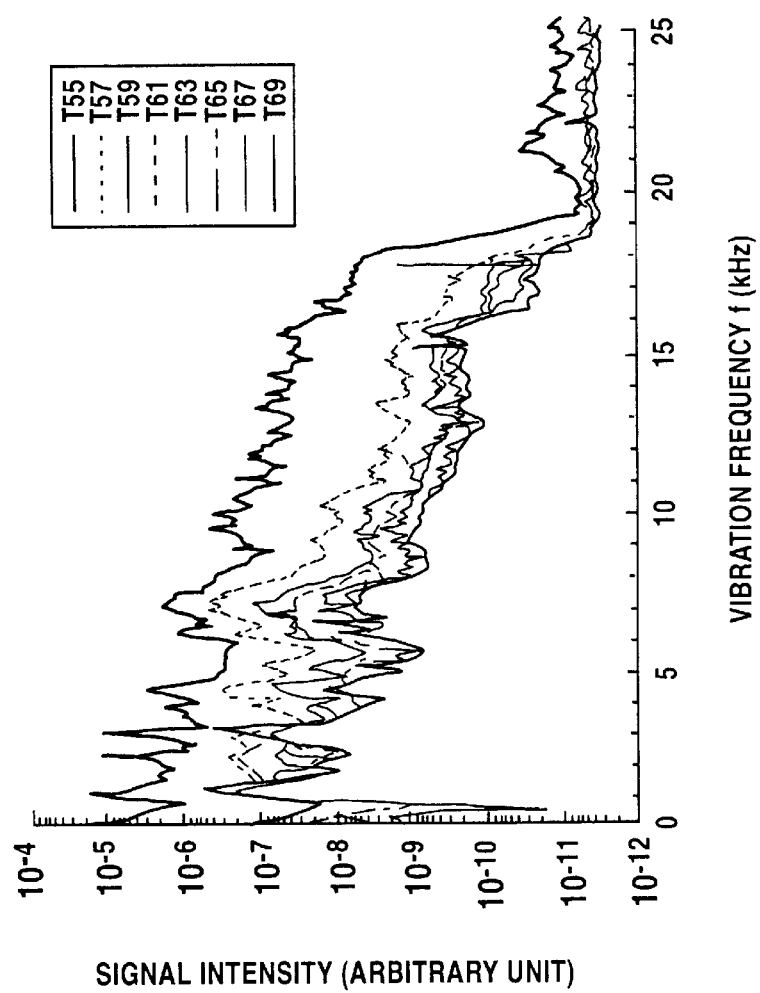
FIG. 37 is a graph illustrative of spectra showing relations between vibration frequency of proper polishing vibration and vibration intensity detected in the polishing apparatus according to the eleventh embodiment of the present invention.
Figure 38:
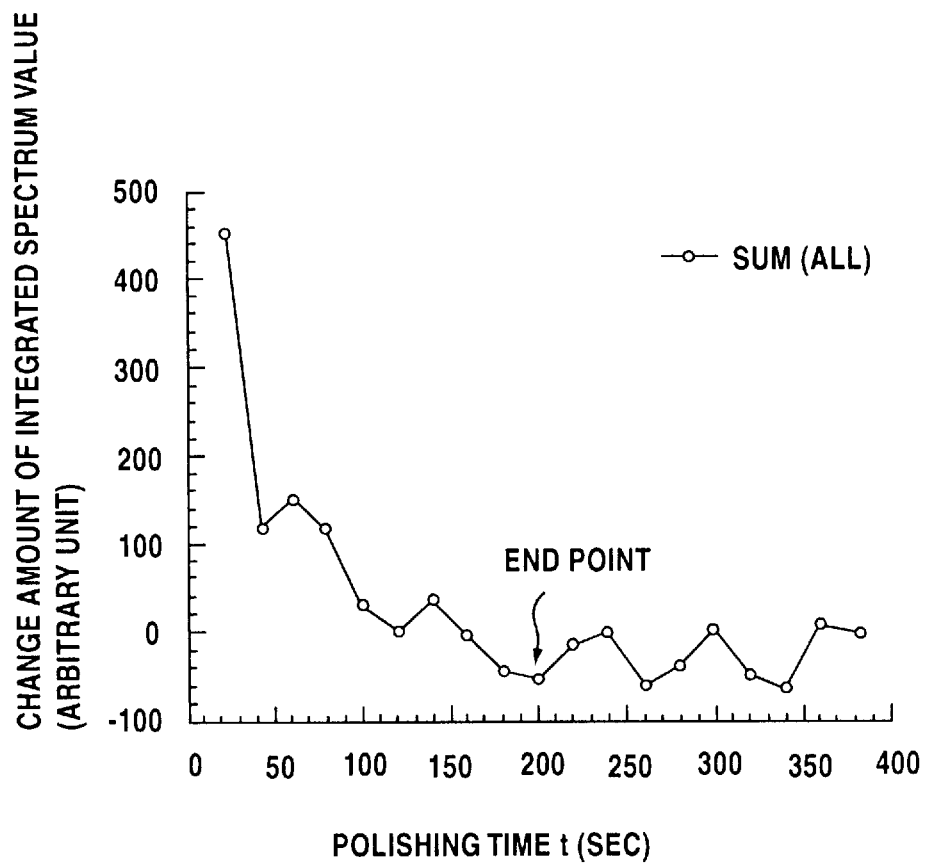
FIG. 38 is a characteristic view illustrating change amount of integrated spectrum value of proper polishing vibration relative to a polishing time in the polishing apparatus according to the eleventh embodiment of the present invention.

Next, measurement results will be shown in FIGS. 37 and 38.

FIG. 37 shows an example illustrating how frequency spectrum of vibration is changed as polishing time advances. According to this result, it can be found that vibration intensity is reduced with the progress of polishing time.

FIG. 38 illustrates that, after spectrum is integrated over a particular frequency range in the spectrum in FIG. 37, a change amount of integrated spectrum value in proper polishing vibration relative to a polishing time in the polishing apparatus. According to this result, it will be understood that a change amount of integral spectrum value is reduced with the progress of polishing time, which result in planalization of the polished surface by virtue of polishing.

An end-point of polishing is detected when there is caused no change in the integral value. This method of judging the end-point of polishing is true for the above embodiments.

In addition, if a structure is adopted wherein the upper surface plate 3 has a first natural vibration frequency identical to vibration frequency to be detected by the vibration detecting device 10 and at least one of motors M for driving the shaft driving portion 21 to drive the upper surface plate 3 and the lower surface plate 2 has a second natural vibration frequency different from the first natural vibration frequency, the background noise being input into the vibration detecting device 10 can be reduced.

Figure 39A:
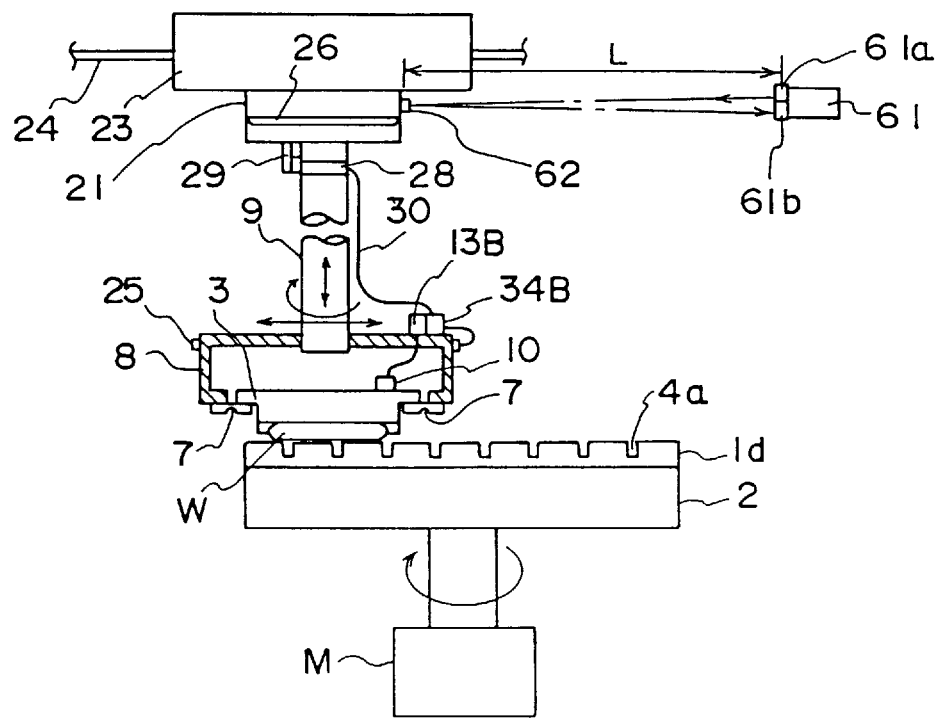
FIG. 39A is a side view showing a polishing apparatus according to a twelfth embodiment of the present invention.
Figure 39B:
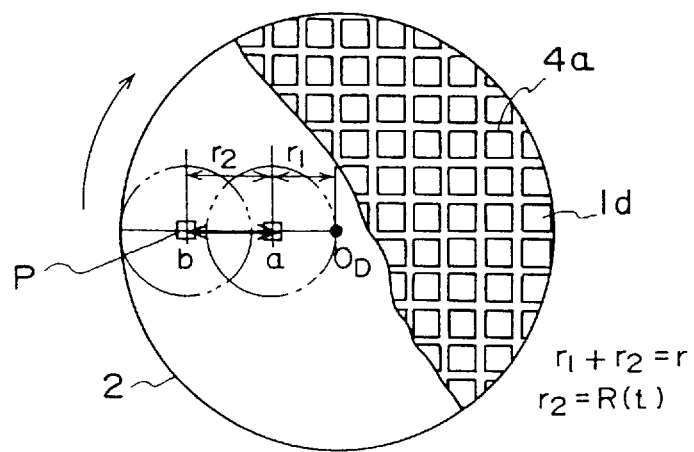
FIG. 39B is a plan view showing a lower surface plate and an abrasive cloth in FIG. 39A.

(Twelfth Embodiment) FIG. 39A is a side view showing mechanical portions in a polishing apparatus according to a twelfth embodiment of the present invention. FIG. 39B is a plan view showing a lower surface plate and an abrasive cloth in FIG. 39A. FIG. 40 is a block circuit diagram showing a signal processing portion in the polishing apparatus according to the twelfth embodiment of the present invention. In FIGS. 39A, 39B and 40, like reference symbols identify the same or corresponding parts in FIGS. 1 and 15.

In FIG. 39A, a location detector 61 for detecting location of the upper surface plate 3 is arranged on the side of the shaft driving portion 21. The location detector 61 comprises a light emitting device 61a for irradiating a light to a detection plate 62 attached to the shaft driving portion 21, and a light receiving device 61b for receiving a reflected light from the detection plate 62. The location detector 61 measures a distance L from the shaft driving portion 21 according to a quantity of incident light into the light receiving device 61b and inputs measured data to a computer 77 described later. For instance, a semiconductor laser may be used as the light emitting device 61a and a photo-diode may be used as the light receiving device 61b.

A abrasive cloth 1d in which a plurality of grooves 4a are formed in the vertical and horizontal directions is stuck to the lower surface plate 2. The abrasive cloth 1d as well as the lower surface plate 2 is rotated by the motor M in polishing. The upper surface plate 3 moves between a point a and a point b reciprocally on the abrasive cloth 1d in polishing and is rotated at a constant velocity. Reciprocating movement and rotational movement of the upper surface plate 3 is transmitted from the shaft driving portion 21 via the elastic substance 7, the enclosure 8, and the shaft 9. An operation of the shaft driving portion 21 is controlled by the drive controller 17, like the first embodiment.

A voltage is applied to an output end of the vibration detecting device 10 attached to the upper surface plate 3 via a rectifier 63, as shown in FIG. 40. The output terminal of the vibration detecting device 10 is connected to an FM transmitter 34B via a capacitor 64, an amplifier 65, a lowpass filter 66, and a highpass filter 67. Mechanical and electrical noises are removed by the capacitor 64 from a vibration signal being output from the vibration detecting device 10. The vibration signal is then amplified by the amplifier 65, then is narrowed into a particular vibration frequency bandwidth by the lowpass filter 66 and the highpass filter 67, and then input into the FM transmitter 34B. If, for example, the lowpass filter 66 may remove the vibration signal of more than 18 kHz and the highpass filter 67 may remove the vibration signal of less than 8 kHz, the particular vibration frequency bandwidth ranges over 8 kHz to 18 kHz. The FM transmitter 34B transmits the vibration signal to the FM receiver 69 by virtue of the transmitting antenna 25 provided around the enclosure 8 by radio.

As shown in FIG. 40, the vibration signal being input by the receiving antenna 26 provided around the shaft driving portion 21 is received by the FM receiver 69.

A recording unit 70 is connected to an output terminal of the FM receiver 69. Vibration signal data stored in the recording unit 70 are utilized for generation of data library, frequency analysis, adjustment of processing circuit, etc, An output terminal of the FM receiver 69 is connected to the computer 77 via a 1 kHz highpass filter 71, a first amplifier 72, a rectifier circuit 73, a 0.5 Hz lowpass filter 74, a second amplifier 75, and an A/D converter 76. The highpass filter 71 cuts off a DC component of the vibration signal. The rectifier circuit 73 and the lowpass filter 74 integrates the vibration signal in the particular vibration frequency bandwidth to calculate a root-mean-square (RMS) value of vibration.

Figure 41:
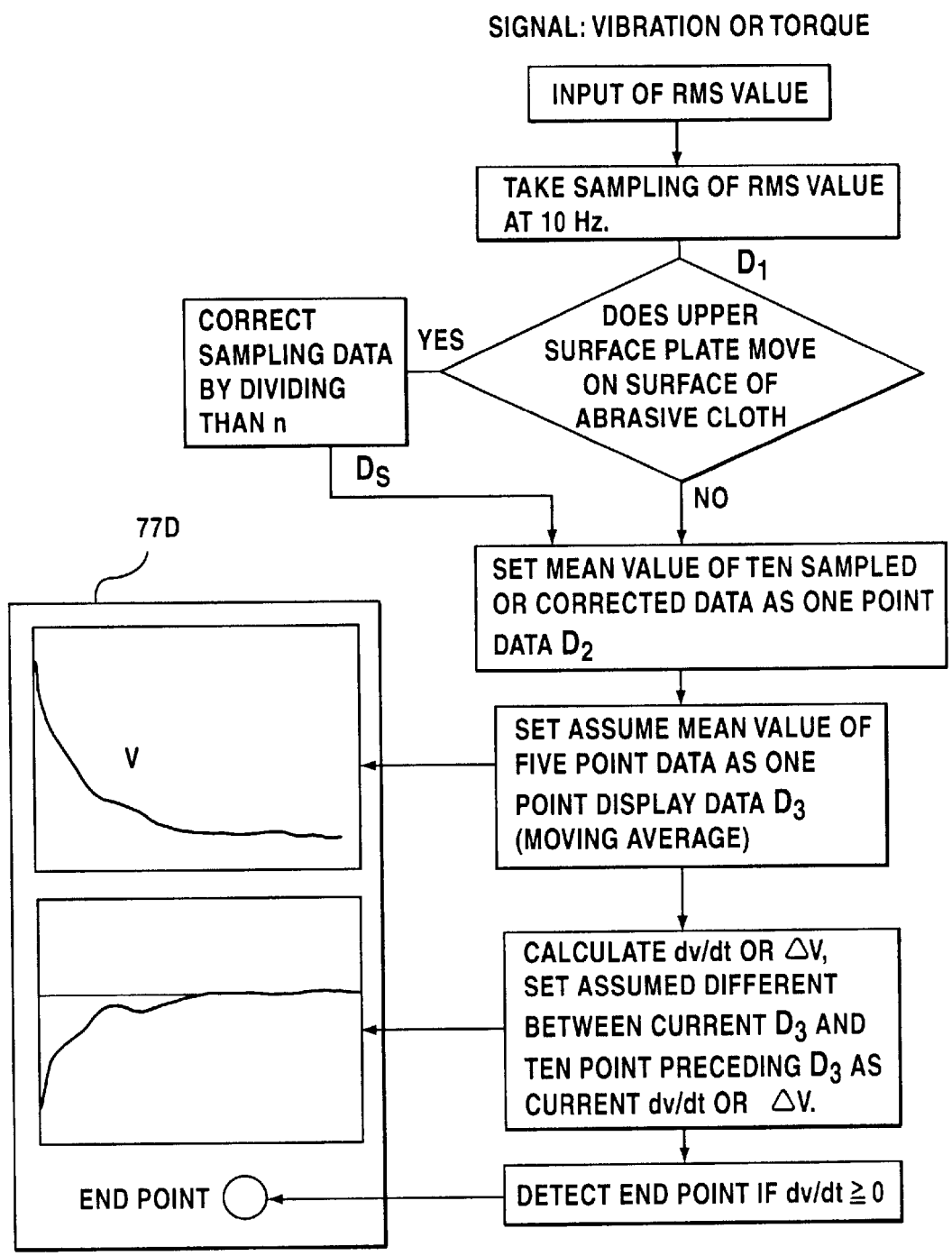
FIG. 41 is a flowchart illustrating signal processing procedure by a computer in the polishing apparatus according to the twelfth embodiment of the present invention.

In the computer 77, arithmetic operations and a display operation are implemented according to a flowchart in FIG. 41.

First, a case will be explained where the polished object W is polished only by virtue of rotation of the upper surface plate 3 while the center of rotation of the upper surface plate 3 does not shift on the surface of the abrasive cloth.

In the computer 77, the RMA value of continuously input vibration signal is sampled sequentially at a rate of 10 time per second (10 Hz), then an average value of sampled 10 data $D_1$ is calculated, and then the average data is set as a point data $D_2$.

In turn, if the point data $D_2$ is displayed with the passage of time as it is, a zigzag line is derived. Thus, to display the line smoothly, a point display data $D_3$ can be derived from an average value of five point data $D_2$. In this event, when an average of five point data $D_2$ is calculated while carrying up the point data $D_2$ one by one in the order of calculation, one point display data $D_3$ can be obtained every second. Such average is called as a moving average.

The point display data derived from this moving average are displayed sequentially on the image display portion 77D. A vibration intensity curve can be obtained by plotting a plurality of point display data.

As can be assumed from the above embodiments, in case the upper surface plate 3 is merely rotated, sampled data $D_1$ is gradually attenuated as polishing advances.

Figure 42A:
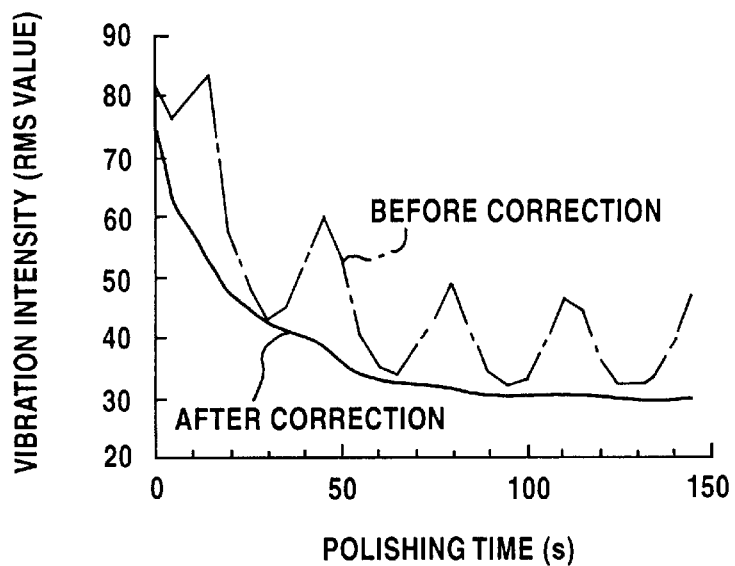
FIG. 42A is a view showing a vibration intensity curve as average sampling data before correction and a vibration intensity curve after correction in the polishing apparatus according to the twelfth embodiment of the present invention.
Figure 42B:
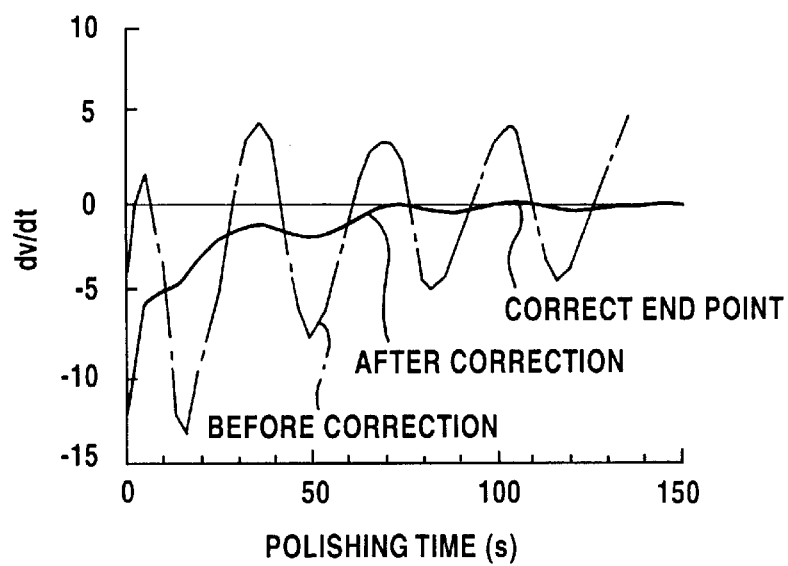
FIG. 42B is a view showing differentiated vibration intensity curves before and after correction in the polishing apparatus according to the twelfth embodiment of the present invention.

However, if the upper surface plate 3 takes an operation other than rotation operation, e.g., reciprocal operation on the abrasive cloth 1d, the point display data $D_3$ includes an AC component as shown by a chain line in FIG. 42A. Therefore, it becomes difficult to detect an end-point of polishing. For example, if the curve of the chain line in FIG. 42A is differentiated, a curve like the chain line in FIG. 42B can be derived. Therefore, a time point when the differential value becomes zero cannot be determined as an end-point of polishing.

Hence, if the upper surface plate 3 takes a reciprocal operation between a point a and a point b on the abrasive cloth 1d, a correction is made by dividing respectively the RMS data $D_1$ being sampled at 10 Hz by a correction factor η, then the point data $D_2$ and the point display data $D_3$ are calculated, and then the point display data $D_3$ is displayed on the image display portion 77D. Thus, a curve shown by a solid line in FIG. 42A can be derived. A curve obtained by differentiating the curve is obtained as a curve shown by a solid line in FIG. 42B. Since a period of the reciprocal operation is usually more than several tens seconds, the point data $D_2$ may be divided by the correction factor η.

Figure 43A:
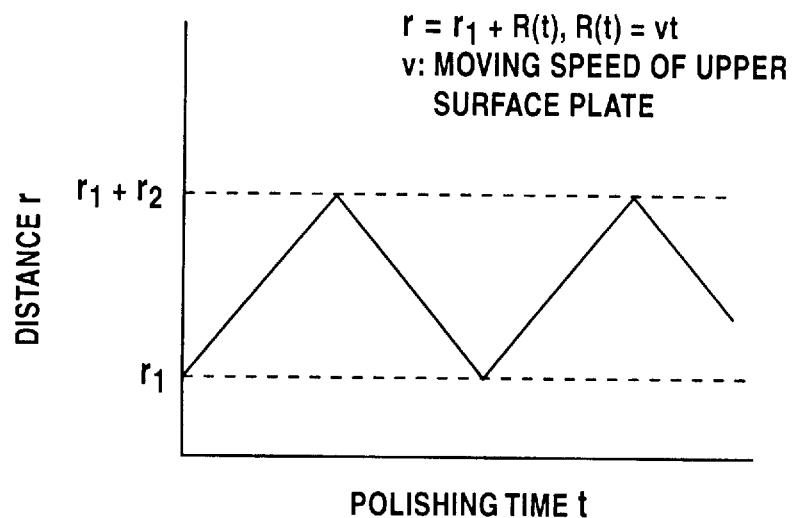
FIG. 43A is a waveform diagram illustrating variation in a distance r between a center of rotation of an upper surface plate and a center of rotation of the abrasive cloth when the upper surface plate is shifted in the diameter direction of the abrasive cloth in the polishing apparatus according to the twelfth embodiment of the present invention.
Figure 43B:
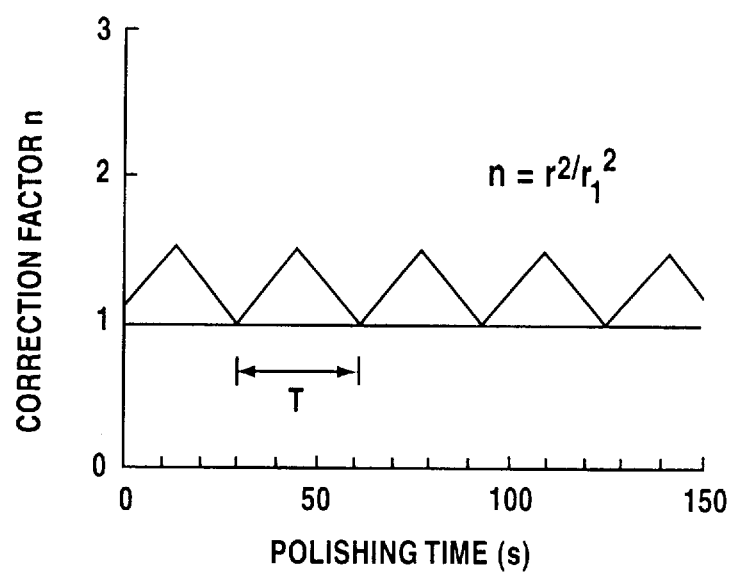
FIG. 43B is a waveform diagram illustrating correction factor expressed by virtue of the distance r in FIG. 43A.

As shown in FIG. 39B, in case the rotating upper surface plate 3 is reciprocated between two points a and b in the diameter direction from the center of revolution of the lower surface plate 2, variation of the distance r in time is shown in FIG. 43A, and the correction factor η is $r^2/r_1^2$ as shown in FIG. 43B. For instance, if a distance between the point a and the point b is 32 mm and moving rate v of the upper surface plate 3 is 2 mm/sec, a period T of a waveform in FIG. 43B is 32 second. In this case, the distance $r_1$ is 134 mm.

The correction factor η is determined as follows.

It is supposed that a minute portion P of the polished surface of the object to be polished W which locates at a distance r from the center of rotation of the abrasive cloth 1d is polished by the abrasive cloth 1d which is rotating at a angular velocity ω, a relative velocity between the minute portion P and the abrasive cloth 1d is a function of rω. The distance r can be calculated based on locational data supplied from the location detector 61. The minute portion P is set at the center of rotation of the upper surface plate 3.

Figure 44A:
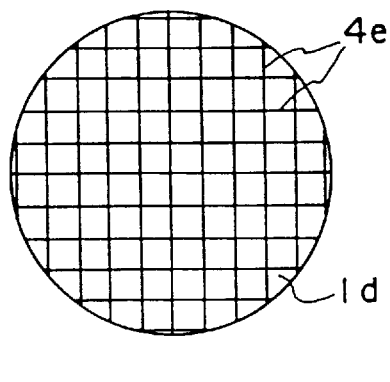
FIGS. 44A to 44D are plan views showing variations of the abrasive cloth used in the polishing apparatus according to the twelfth embodiment of the present invention.
Figure 44B:
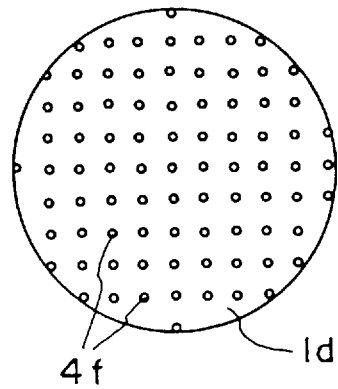
Figure 44C:
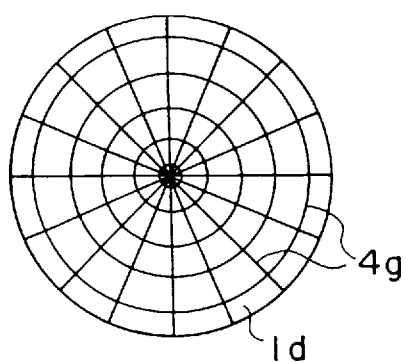
Figure 44D:
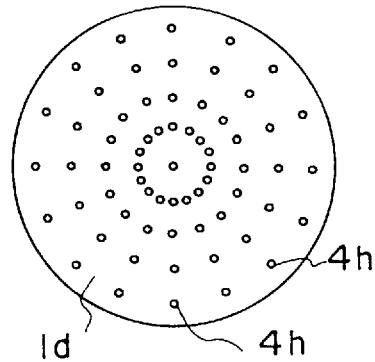

Further, as shown in FIGS. 44A and 44B, sometimes grooves 4e or micropores 4f are formed on the surface of the abrasive cloth id at predetermined density. In this case, the contact number of the minute portion P to the grooves 4e or the micropores 4f during one rotation of the abrasive cloth 1d is a function of rω. Furthermore, as shown in FIGS. 44C and 44D, if the grooves 4g or the micropores 4h are spread from the center of rotation of the abrasive cloth 1d in a radial manner, the contact number of the minute portion P to the grooves 4g or the micropores 4h during one rotation of the abrasive cloth 1d is a function of ω. If the abrasive cloth in which no groove or no micropore is formed is used, no influence to the minute portion P by the groove or the micropore is to be considered.

For this reason, a product of the relative velocity r and the contact number is adopted as the correction factor η. Basics of the correction factor η is given in Table I.

Since factors such as kinds of the polishing liquid, materials of the abrasive cloth, etc. may be considered not to scarcely change in polishing, they have not been included in the correction factor η. If the upper surface plate 3 does not takes operations other than the rotation, r is set to 1 since r is constant. The number of rotation of the upper surface plate 3 does not change in general during polishing, and therefore the correction factor η may be defined under the condition ω=1. Furthermore, the correction factor η may include other coefficients. For example, as shown in FIGS. 39B and 43B, the distance r may be divided by the distance $r_1$ (constant).

TABLE I

| | kinds of the polishing liquid | | |
|---|---|---|---|
| | grooves or micropores at predetermined density | grooves or micropores in a radical manner | without grooves or micropores |
| taking a reciprocal operation η | $r^2\omega^2$ | $r\omega^2$ | $r\omega$ |
| not taking a reciprocal operation η | $\omega^2$ | $\omega^2$ | $\omega$ |

With the above, as shown in FIG. 41, corrected sampling data Ds is averaged at 10 Hz and then converted into the point data $D_2$, and then converted into the point display data $D_3$. The point display data $D_3$ are displayed as relations between polishing time and vibration intensity, for example, as shown by the solid line in FIG. 42A, on the image display portion 77d.

Differential value (dV/dt) or variation amount relative to time ΔV of a curve being plotted based on the point display data $D_3$ are calculated in the computer 77. The calculation result is displayed as a curve shown in the solid line in FIG. 42B, for example, on the image display portion 77d.

Calculation of variation amount relative to time ΔV of the point display data is displayed by the value obtained by subtracting the point display data $D_3$ being ten data before from current point display data $D_3$. In this example, variation amount relative to time ΔV is displayed as one data per second.

A time point when differential value (dV/dt) or variation amount relative to time ΔA becomes zero or more is set as an end-point of polishing, and the result of the end-point detection is displayed on the image display portion 77d.

Since the computer 77 for implementing the above calculation and display serves as the drive controller 17 in the first embodiment, it may instruct halt of polishing to the shaft driving portion 21 at the time of detecting the end-point of polishing.

A reciprocating locus of the upper surface plate 3 between the points a and b on the abrasive cloth 1d is not restricted in the diameter direction from the center Oo of rotation of the abrasive cloth 1d. For example, as shown in FIG. 45A, a locus of the upper surface plate 3 presents as a linear locus perpendicular to the diameter direction, otherwise it presents as a circular arc locus because the upper surface plate 3 is swung by the arm of the robot, as shown in FIG. 46A.

Figure 45A:
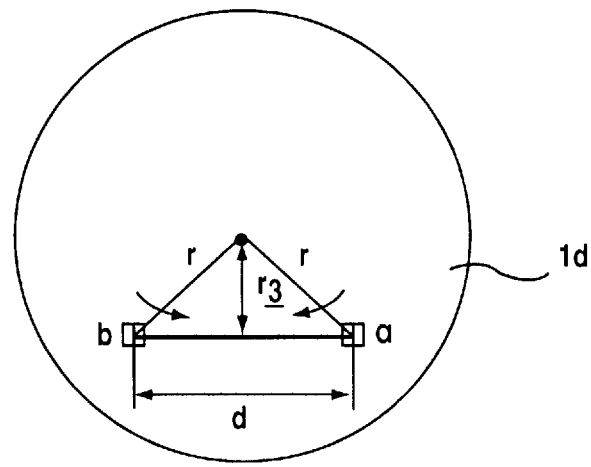
FIG. 45A is a plan view showing a second example of a locus of the upper surface plate in the polishing apparatus according to the twelfth embodiment of the present invention.
Figure 45B:
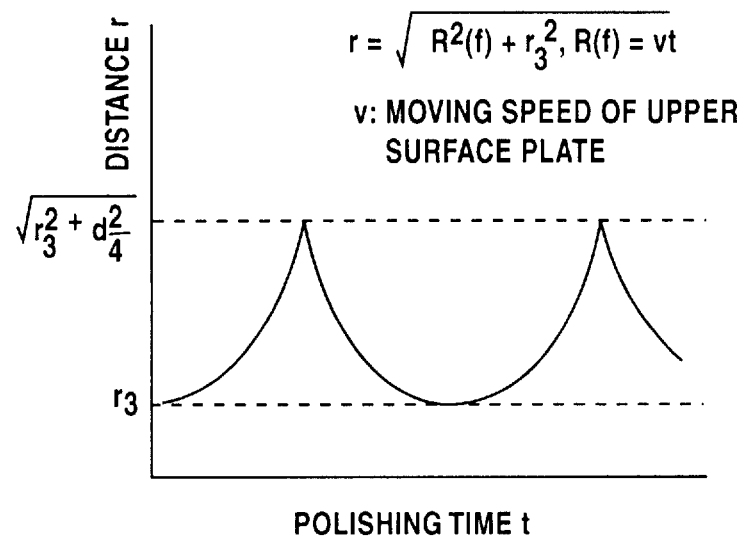
FIG. 45B is a waveform diagram illustrating variation in the distance r between the center of rotation of the upper surface plate and the center of rotation of the abrasive cloth on the locus in FIG. 45A.
Figure 46A:
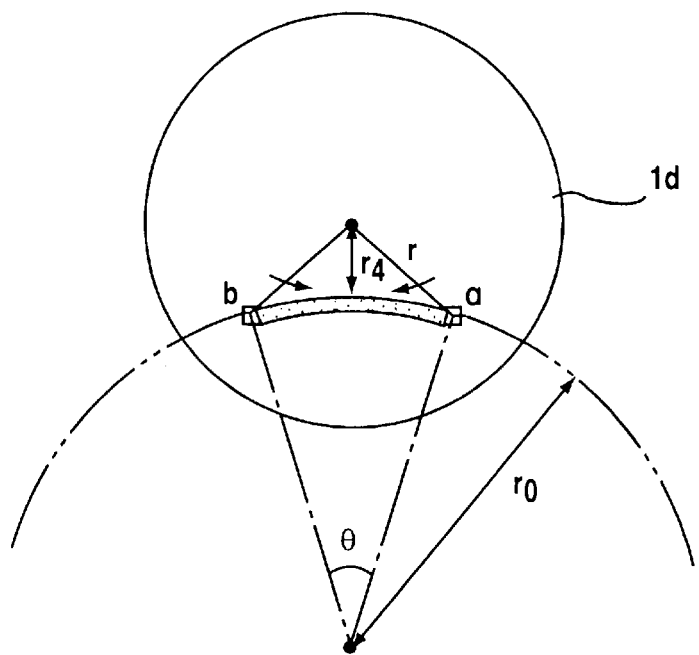
FIG. 46A is a plan view showing a third example of a locus of the upper surface plate in the polishing apparatus according to the twelfth embodiment of the present invention.
Figure 46B:
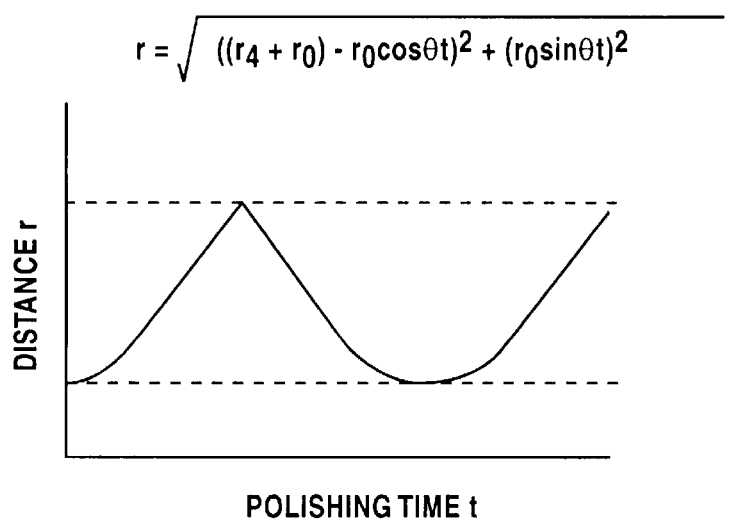
FIG. 46B is a waveform diagram illustrating variation in the distance r between the center of rotation of the upper surface plate and the center of rotation of the abrasive cloth on the locus in FIG. 46A.

In such cases, a distance r between the center of rotation of the upper surface plate 3 and the center Oo of rotation of the abrasive cloth 1d changes with respect to time as shown in FIG. 45B if the locus shown in FIG. 45A is taken, and also it changes with respect to time as shown in FIG. 46B if the locus shown in FIG. 46A is taken.

The distance r used in measuring the RMS value is calculated based on data detected by the location detector 61 in the computer 77, and is utilized as the correction factor η.

Figure 47A:
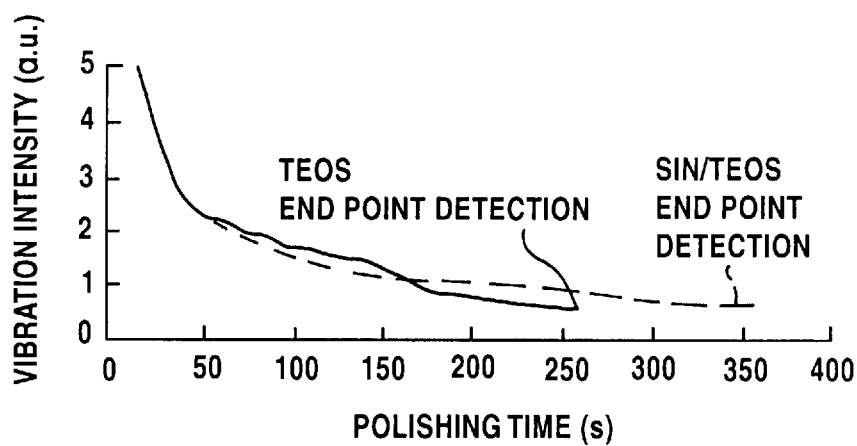
FIG. 47A is a view showing vibration intensity curves relative to a polishing time when the upper surface plate is not shifted on the abrasive cloth in the polishing apparatus according to the twelfth embodiment of the present invention.
Figure 47B:
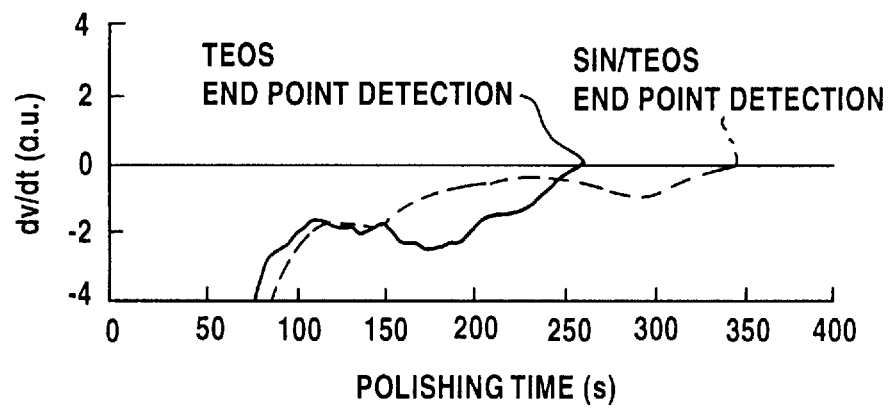
FIG. 47B is a view showing differentiated curves of the vibration intensity curves in FIG. 47A.

Meanwhile, if only the rotation operation is applied to the upper surface plate 3, the correction factor η is not needed to be considered. The curve by the point display data is given in FIG. 47A and the curve showing the differential value is given in FIG. 47B. In FIGS. 47A and 47B, the curve A represents a polishing state of the $SiO_2$ film formed with TEOS while the curve B represents a polishing state of the films in which the silicon nitride film is formed on the $SiO_2$ film.

In the foregoing, the end-point detection based on vibration intensity of the upper surface plate 3 has been explained. But the progress state of polishing can be grasped as change in torque of the motor being built in the shaft driving portion 21. Accordingly, after the RMS value is calculated as described above, polishing state can be grasped by a means for sampling or correcting the RMS value, and also the end-point can be detected by the same means.

(Thirteenth Embodiment)

In the thirteenth embodiment, an apparatus will be explained wherein vibration (sound) due to friction between the head and the abrasive cloth is not measured, but polishing state and end-point of polishing is measured on the basis of change in friction force between the head and the abrasive cloth.

Figure 48A:
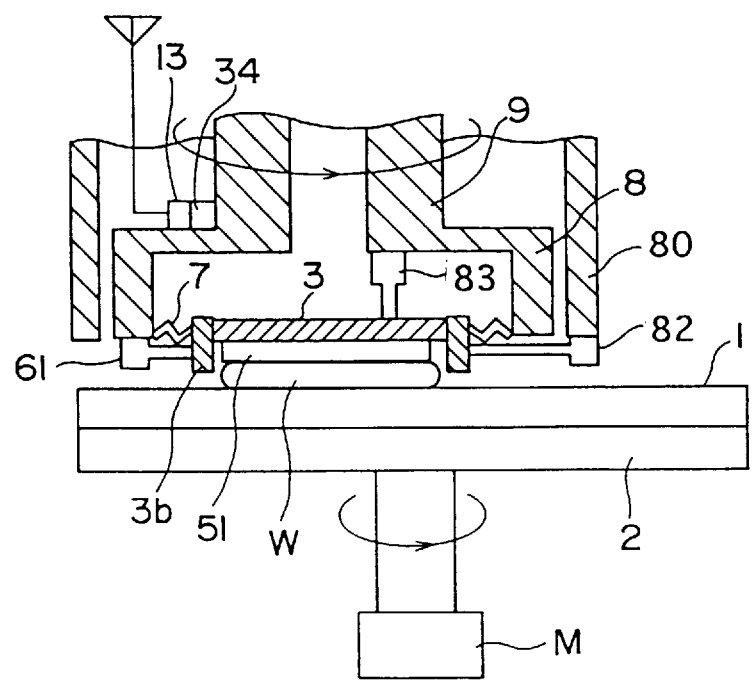
FIGS. 48A and 48B are respectively a sectional view and a bottom view showing a pertinent portion of a polishing apparatus according to a thirteenth embodiment of the present invention.
Figure 48B:
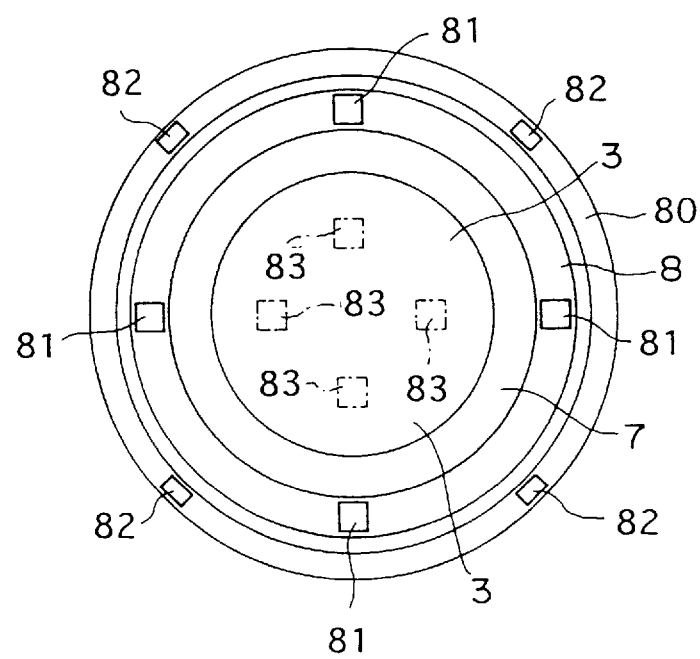

FIGS. 48A and 48B are respectively a sectional view and a bottom view showing a pertinent portion of a polishing apparatus according to the thirteenth embodiment of the present invention. In FIG. 48, like reference symbols identify like parts in FIGS. 1, 15, and 17.

In FIGS. 48A and 48B, the lower surface plate 2 to its upper surface of which the abrasive cloth 1 is stuck is rotated by the shaft driving portion 21 at a predetermined number of rotation. The polished object W which is pushed to the upper surface of the abrasive cloth 1 to be polished is stuck to the lower surface of the metal upper surface plate 3 positioned on the bottom of the air-back type head via the inner pad 51. A side wall 3b is formed around the upper surface plate 3, and the side wall 3b and the enclosure (supporting body) 8 of the head is coupled by the elastic substance 7. A cylindrical shaft 9 for rotating the enclosure 8 is provided in the center of the enclosure 8. A cylindrical head cover 80 not to be rotated is provided around the shaft 9 and the enclosure 8 so as to prevent contamination by the polishing liquid of the head.

A slant face (not shown) for converting a lateral displacement (divergence) amount of the upper surface plate 3 into a vertical displacement amount is formed on the upper surface of the upper surface plate 3.

A first displacement detector 81 for detecting displacement of the side wall 3b of the upper surface plate 3 is provided on the bottom surface of the enclosure 8. A second displacement detector 82 for detecting displacement of the side wall 3b of the upper surface plate 3 is provided on the bottom surface of the head cover 80. In addition, a third displacement detector 83 for detecting displacement of distance from the slant face of the upper surface plate 3 is provided on the ceiling surface of the enclosure 8 which is positioned over the slant face of the upper surface plate 3.

As the first, second and third displacement detectors 81 to 83, a stylus displacement meter for detecting a displacement amount by expansion and contraction of a stylus, a capacitive displacement meter for detecting a displacement amount by change in capacitance because of change in the distance from the side wall 3b of the upper surface plate 3, an eddy current displacement meter for detecting a displacement amount by a change amount in the flux density because of change in the distance from the side wall 3b of the upper surface plate 3, an optical displacement meter for detecting a distance by virtue of reflection of the light, and the like may be utilized.

Such first, second and third displacement detectors 81 to 83 may be arranged either in plural as shown in the bottom view of the head in FIG. 48B or in the singular. Further, all the first, second and third displacement detectors 81 to 83 are not always provided, as shown in FIGS. 48A and 48B, and at least one of them may be provided.

Outputs from the first, second and third displacement detectors 81 to 83 is connected to the transmitter 13b via the amplifier 34a and 34c, and the filter 34b shown in FIG. 19. The detection signal being transmitted from the transmitter 13b is input into the processing portion 35 via the receiver 14. The processing portion 35 determines an end-point of polishing according to change in the displacement signal and modifies the polishing conditions.

Although not shown especially, the polishing liquid supplying nozzle and the dresser are arranged over the abrasive cloth 1 like the above embodiments.

The first and second displacement detectors 81, 82 may be covered by a transparent cover to prevent the polishing liquid or the water. A cover for the third displacement detector 83 may be neglected because the detector 83 is disposed in the enclosure 8.

Subsequently, an end-point detection in polishing by the above polishing apparatus will be explained.

Figure 49A:
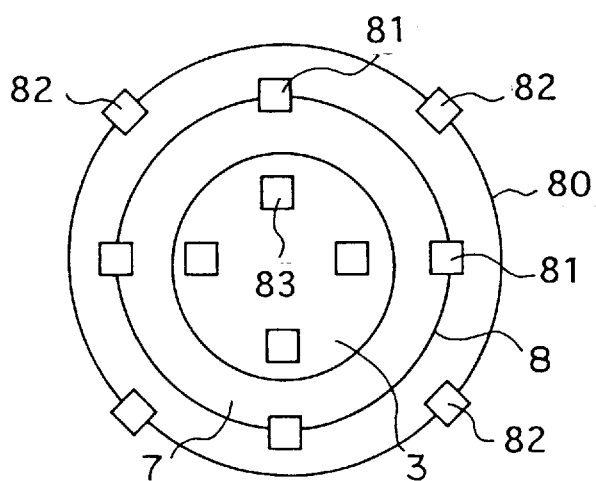
FIGS. 49A to 49C are bottom views showing polished conditions of a bottom surface of a head of the polishing apparatus according to the thirteenth embodiment of the present invention.
Figure 49B:
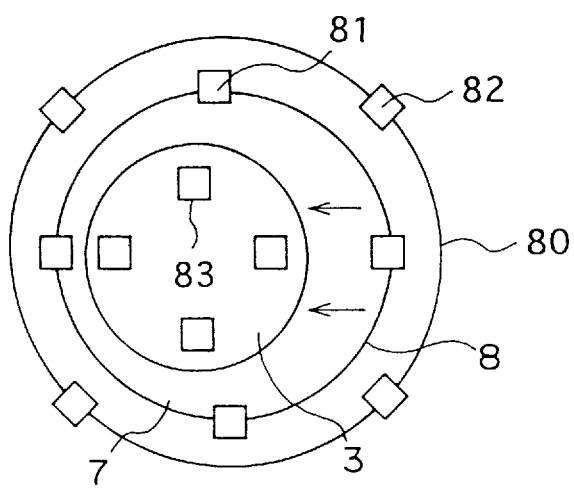
Figure 49C:
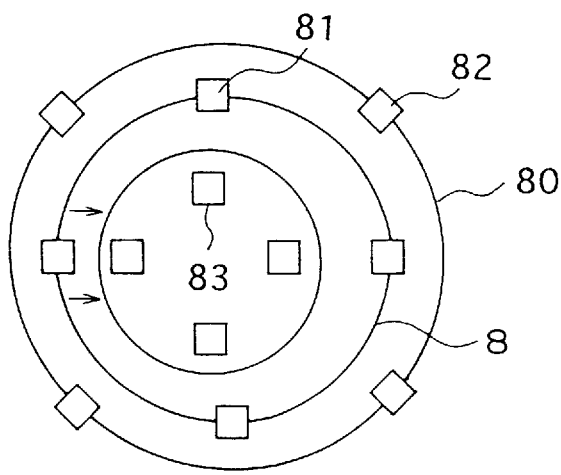

When a flat standard wafer is first positioned on the lower surface of the inner pad 51 and then polishing operation is carried out, location of the upper surface plate 3 is varied as shown in FIGS. 49A to 49C. At this time, displacement signals from the first, second and third displacement detectors 81 to 83 are recorded as reference signals. The standard wafer is removed after the reference signal has been measured.

Next, when a wafer in which an interlayer film is formed as the object to be polished W is positioned on the lower surface of the inner pad 51 and then polishing operation is carried out, the upper surface plate 3 positioned at a location in FIG. 49A is displaced like FIG. 49B accompanying to move of the enclosure 8. The cause why displacement of the upper surface plate 3 occurs is that stress applied to the elastic substance 7 around the upper surface plate 3 is biased since friction between the object to be polished W and the abrasive cloth 1 is great. For this reason, the upper surface plate 3 is inclined to be pulled toward the moving direction of the enclosure 8. This state is set to be an initial state, and at this time the displacement amount detected by the first, second and third displacement detectors 81 to 83 are assumed as the maximum values.

Figure 50:
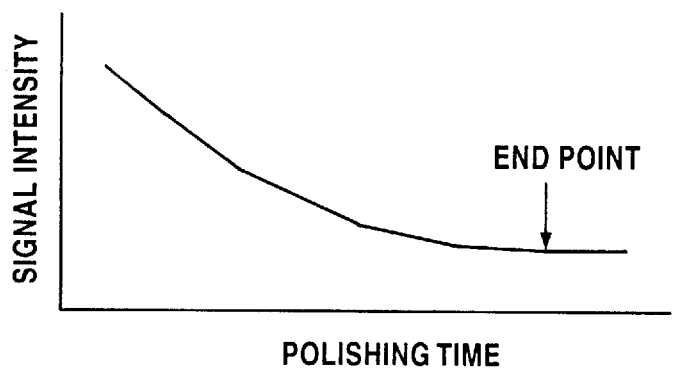
FIG. 50 is a view showing a change amount in displacement of the upper surface plate according to progress of polishing in the polishing apparatus according to the thirteenth embodiment of the present invention.

If polishing is continued still further, friction between the object to be polished W and the abrasive cloth 1 is decreased gradually with the progress of time, and the upper surface plate 3 is located near the center of the enclosure 8, as shown in FIG. 49C. Displacement of the upper surface plate 3 is also reduced. As shown in FIG. 50, change amount in displacement detected by the first, second and third displacement detectors 81 to 83 are also gradually decreased and finally the change amount become zero or almost zero. In this state, polishing is ended. End of polishing is carried out by reducing polishing pressure or separating the object to be polished W from the abrasive cloth 1 by lifting the enclosure 8.

Figure 51:
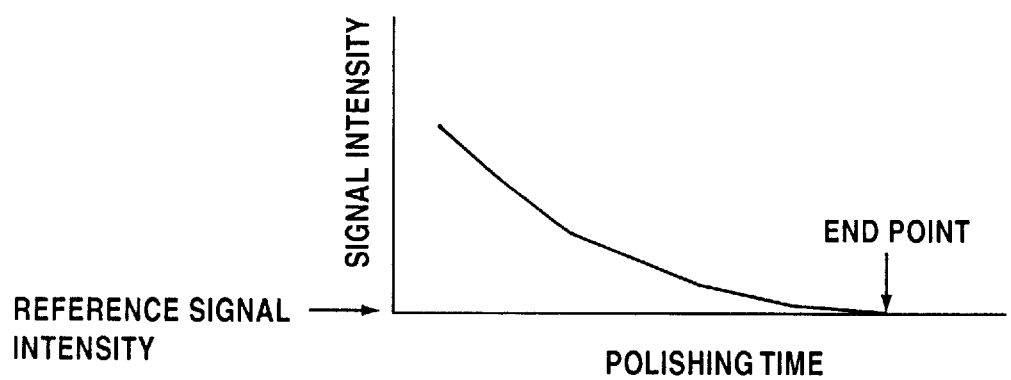
FIG. 51 is a view showing comparison of a change amount in displacement of the upper surface plate according to progress of polishing with a reference signal in the polishing apparatus according to the thirteenth embodiment of the present invention.

If it is difficult to detect an end-point of polishing according to change amount in displacement of the upper surface plate 3, a time point when the change amount coincide with the reference signal or difference between them is substantially eliminated may be assumed as an end-point of polishing, as shown in FIG. 51. As a different example of end-point detection, in case, for example, different material used to detect the end-point is formed in the object to be polished W, displacement is increased still more when the different material is exposed with the progress of planarization.

To check displacement of such surface plate, change in the output signal from the displacement detectors 81 to 83 is gentle and therefore may be measured as a DC component. According to rotation of the enclosure 8, the upper surface plate 3 and the abrasive cloth 1, if the detection signals from the displacement detectors 81 to 83 are low frequency signals of several tens Hz, only the low frequency component may be extracted as the detection signal. Since the high frequency signal such as background noise is removed by the filter, sensitivities of the displacement detectors 81 to 83 becomes high in contrast to that of the vibration detecting device 10. Like this, if the detection signal is the DC signal or if the frequency bandwidth is narrow such as almost 0 to 100 Hz, the signal may be transmitted with good precision to the detector rather than the high frequency signal. Therefore, high-sensitivity measurement can be accomplished in comparison with the above vibration measurement.

Since the first displacement detector 81 is rotated in synchronous with the head, a measuring range of the upper surface plate 3 is not varied. Therefore, measurement is not subjected by variation in profiles of the upper surface plate 3. However, in the first displacement detector 81, since a distance between the detector 81 and the upper surface plate 3 is varied during one rotation of the upper surface plate 3, intensity of the displacement signal and displacement direction change periodically in accordance with the rotation frequency. Because this rotation frequency is about 100 Hz at maximum and is synchronous with the rotation of the head, the S/N ratio is not degraded.

According to the second displacement detector 82, though the displacement signal is not changed periodically and change amount of the upper surface plate 3 can be detected linearly, it is readily subjected by variation in profiles of the enclosure 8 and the upper surface plate 3.

According to the third displacement detector 83, the detected object is vertical movement of the slant face formed on the upper surface plate 3. But vertical movement of the upper surface of the upper surface plate 3 may be used as the detected object W without such slant face.

According to a plurality of such displacement detectors 81 to 83, total abundant information content can be obtained by measuring front and rear movement, right and left movement, and up and down movement of the enclosure 8 and/or the upper surface plate 3. Therefore, by putting various forces together, a plenty of information as to falling-off of the wafer, injury of the wafer, polishing conditions (supply of the polishing liquid, abnormal of the abrasive cloth, change of pressure, change of rotation number, etc.) can be acquired.

Figure 52A:
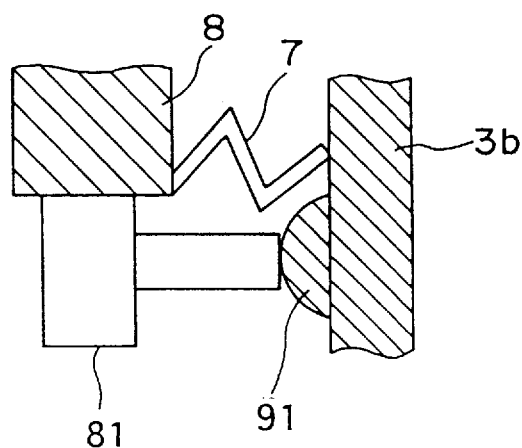
FIGS. 52A and 52B are side views, partially in section, respectively showing a head in which a projection is formed in vibration detecting area in the polishing apparatus according to the thirteenth embodiment of the present invention.
Figure 52B:
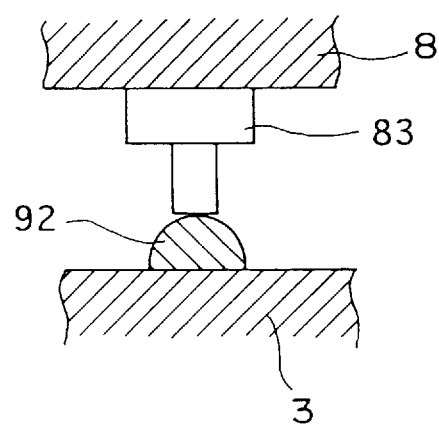

If hemispherical projections 91, 92 shown in FIGS. 52A and 52B or depressions (not shown) are formed at detection location on the side wall 3b of the upper surface plate 3, displacement at the same location can be detected in the multi-direction.

In case a plurality of the objects to be polished W are polished concurrently, a plurality of heads shown in FIG. 39 may be simultaneously started. If variations in polishing detected by respective heads are less than ten %, the end-point detection by all heads is not required. In such event, the displacement detectors 81 to 83 or the vibration detecting device 10 in the above embodiments may be provided to only part of the heads (only one head is possible). In this case, when the head having the displacement detectors 81 to 83 or the vibration detecting device 10 comes to the end-point, polishing by all heads may be terminated to thus achieve the good result. After reaching the end-point, polishing may be done excessively for a predetermined time interval.

If vibration detecting devices or displacement detectors are provided to all heads, the heads (upper surface plate 3) may be lifted in the order of detecting the end-point of polishing to halt polishing operation, and be waited until entire polishing are finished.

Halt instructions to a plurality of heads are issued by the controllers 17, 35 shown in FIGS. 1 and 19.

(Fourteenth embodiment)

A polishing apparatus will be explained hereinafter which is capable of detecting a polishing end-point with high precision even if unevenness of a polished surface of a object to be polished is small.

Figure 53:
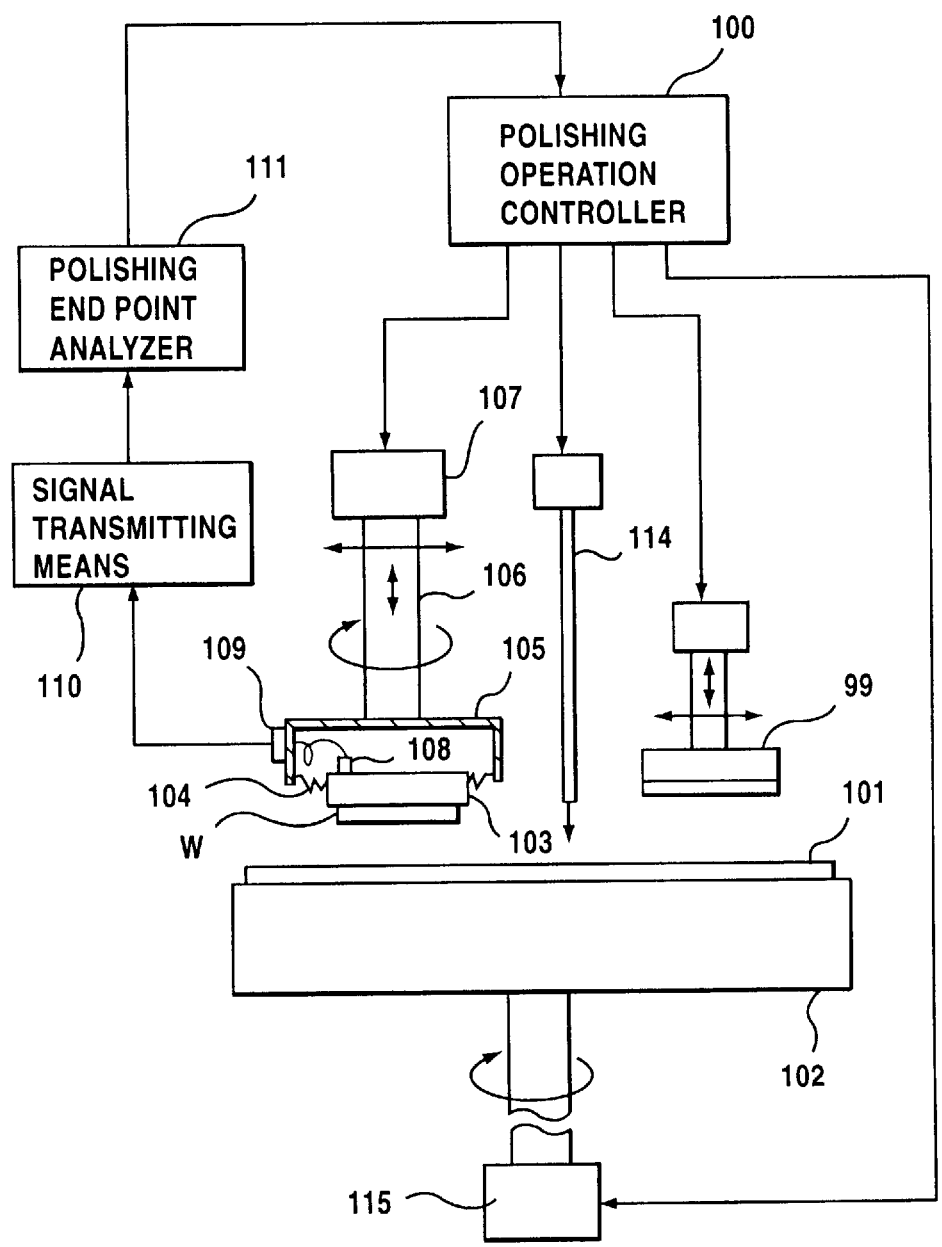
FIG. 53 is a side view showing a configuration of a polishing apparatus according to a fourteenth embodiment of the present invention.
Figure 54:
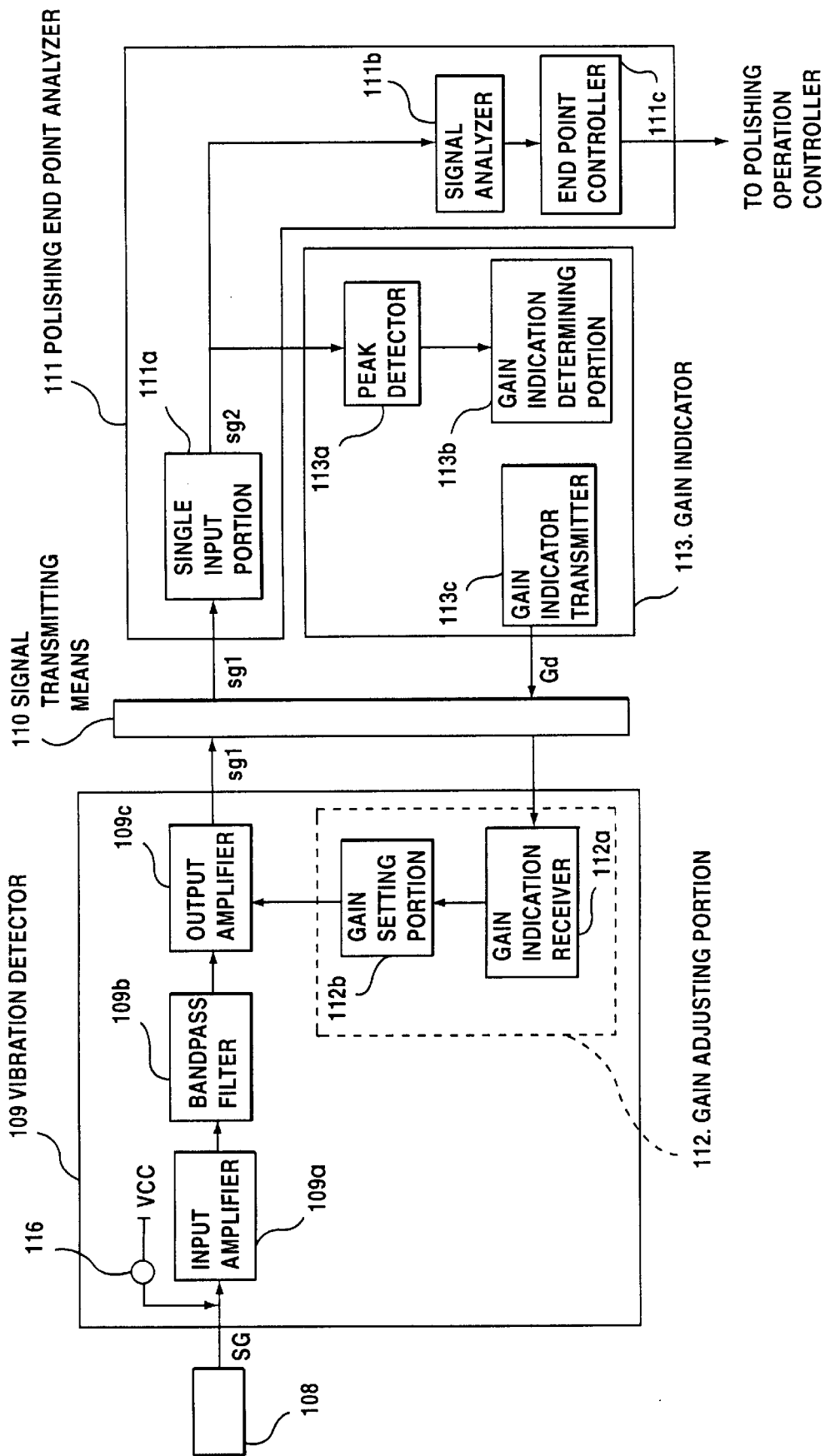
FIG. 54 is a block circuit diagram showing an example of a configuration from a vibration detecting device to a polishing end-point analyzer of the polishing apparatus shown in FIG. 53.

FIGS. 53 and 54 are views showing a configuration of pertinent portions of a polishing apparatus according to a fourteenth embodiment of the present invention respectively.

The polishing apparatus comprises a circular-disk type lower surface plate 102 on an upper surface of which an abrasive cloth 101 formed of cellular urethane is stuck, and an circular-disk type upper surface plate 103 for supporting a object to be polished W. The object to be polished W can be polished by virtue of friction caused between the abrasive cloth 101 and this object to be polished W.

An outer periphery of the upper surface plate 103 is secured to a lower end portion of a hollow enclosure 105 via an elastic substance 104 such as rubber, spring, etc. such that the upper surface plate 103 is not perfectly-brought in coincidence in movement with the enclosure 105. The enclosure 105, the upper surface plate 103, and the elastic substance 104 are called a head as a whole. An inner space of the head may supply an internal pressure to push the upper surface plate 103 downward.

An upper central portion of the enclosure 105 is secured to a shaft 106 which can be rotated and slid upward and downward by a shaft driving portion 107.

A vibration detecting device (which is also called an accelerate device hereinafter) 108 is secured to the upper surface plate 103. An output end of the vibration detecting device 108 is connected to a vibration detector 109 attached to the enclosure 105. A piezoelectric acceleration sensor, for example, a sensor of the type CE507M101 or CE507M301 available from Vibrometer Co. in U.S.A. may be used as the vibration detecting device 108.

The head having such a structure that a space surrounded by the enclosure 105, the upper surface plate 103, and the elastic substance 104 can be held at a predetermined pressure is called an air-bag type head. According to the air-bag type head, a downward pressure to restore a position of the upper surface plate 103 is then applied to the upper surface plate 103 if the upper surface plate 103 deviates upward, while an upward pressure to restore the position of the upper surface plate 103 is then applied to the upper surface plate 103 if the upper surface plate 103 deviates downward. The air-bag type head is then held at such pressure.

In addition, the vibration detector 109 may send information signals regarding the vibration frequency and the vibration intensity to a signal transmitting means 110. A polishing end-point analyzer 111, when receives the vibration signal via the signal transmitting means 110, may subtract natural vibration components (e.g., mechanical vibration components peculiar to the polishing apparatus) generated by causes other than the polishing operation from power spectrum of the vibration frequency and the vibration intensity included in vibration information, and then analyze the calculation result to determine an end-point of polishing. A polishing operation controller 100 may drive the shaft 106 and a dresser 99, and lift the shaft 106 and suspend a rotation of the shaft 106 based on the polishing end-point signal being supplied from the polishing end-point analyzer 111, and control a supply amount of abrasive liquid supplied from a nozzle 114 via the polishing operation controller 100.

Next, the vibration detector 109 and the polishing end-point analyzer 111 have configurations as shown in FIG. 54 respectively.

More particularly, in the vibration detector 109, an input amplifier 109a for amplifying a signal input from the vibration detecting device 108, a bandpass filter 109b for passing only a signal within a particular bandwidth out of signals being output from the input amplifier 109a, and an output amplifier for amplifying a signal being output from the bandpass filter 109b are connected in series. The output amplifier 109c is so constructed that gain of the output amplifier 109c can be adjusted by a gain adjusting portion 112.

The polishing end-point analyzer 111 comprises a signal input portion 111a for receiving a signal output from the vibration detector 109 via a signal transmitting means 110, a signal analyzer 111b for analyzing a signal being supplied from the signal input portion 111a, and an end-point controller 111c for determining an end-point of polishing based on the analyzed result being supplied from the signal analyzer 111b. Further, the polishing end-point analyzer 111 comprises a gain indicator 113 for indicating suitability of the gain of the output amplifier 109c based on the magnitude of the peak value of the signal being output from the signal input portion 111a, and a gain adjusting portion 112 is constructed to adjust the gain of the output amplifier 109c based on the signal being output from the gain indicator 113. In the vibration detector 109, the gain adjusting portion 112 comprises a gain indication receiver 112a for receiving a gain adjusting signal from the gain indicator 113, and a gain setting portion 112b for setting the gain of the output amplifier 119c based on the gain adjusting signal received from the gain indicator receiver 112a. Furthermore, in the polishing end-point analyzer 111, the gain indicator 113 comprises a peak detector 113a for detecting a peak value of the signal being supplied from the signal input portion 111a, a gain indication determining portion 113b for determining an optimal value of the gain of the output amplifier 109c based on peak value data being output from the peak detector 113a, and a gain indication transmitter 113c for transmitting decision data being output from the gain indication determining portion 113b to the gain indication receiver 112a via the signal transmitting means 110 as gain indication data.

Figure 55:
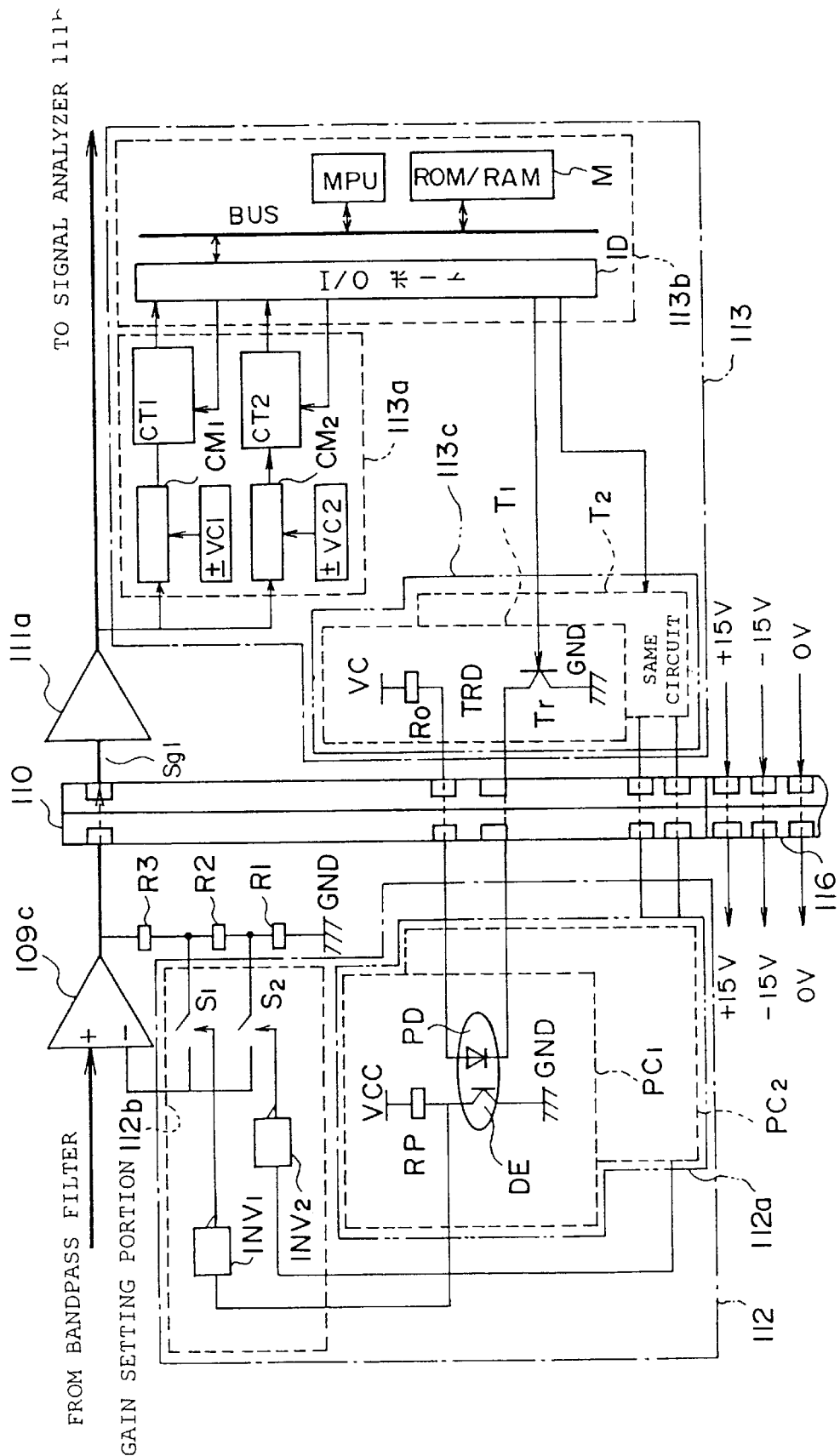
FIG. 55 is a circuit diagram showing in more detail the configuration from the vibration detecting device to the polishing end-point analyzer shown in FIG. 54.

Detailed configurations of the gain indicator 113 and the gain adjusting portion 112 in FIG. 54 may be given as circuits shown in FIG. 55, for example.

In FIG. 55, an input buffer amplifier is utilized as the signal input portion 111a in the polishing end-point analyzer 111 and an output end of the input buffer amplifier is connected to respective input ends of the signal analyzer 111b and the peak detector 113a. The peak detector 113a includes a first wind comparator CM1 for detecting a signal being larger than an absolute value of a first reference level voltage ±Vc1 and a second wind comparator CM2 for detecting a signal being larger than an absolute value of a second reference level voltage ±Vc2. The reference signal voltage ±Vc1 is desired to have an amplitude larger than noise signals which enter into the signal path from the external circuit.

The first wind comparator CM1, if receives the signal larger than the absolute value Vc1 of the first reference level voltage, may output such signal as a pulse signal. Similarly, the second wind comparator CM2, if receives the signal larger than the absolute value Vc2 of the second reference level voltage, may output such signal as a pulse signal.

A first counter CT1 is connected to an output end of the first comparator CM1 such that the number of pulses being output from the first comparator CM1 may be counted by the first counter CT1. Similarly, a second counter CT2 is connected to an output end of the second comparator CM2 such that the number of pulses being output from the second comparator CM2 may be counted by the second counter CT2.

Detection results of the peak detector 113a, i.e., counted results of the first counter CT1 and the second counter CT2 are input into a microprocessor MPU via an I/O port IO and a bus BUS provided in the gain indication determining portion 113b. In compliance with programmed data in a memory circuit M, the microprocessor MPU may determine based on an output value from the peak detector 113a whether or not an amplification factor of the output amplifier 109c in the vibration detector 109 is set in optimum.

An output signal from the gain indication determining portion 113b is input into the gain indication receiver 112a via the gain indication transmitter 113c and the signal transmitting means 110. The gain indication receiver 113c is equipped with a first switching transistor circuit T1 and a second switching transistor circuit T2. One of the first switching transistor circuit T1 and the second switching transistor circuit T2 or both of them are turned ON according to the signal from the gain indication determining portion 113b. When the first switching transistor circuit T1 is turned ON, a first photo coupler circuit PC1 is turned ON in the gain indicator receiver 112a to thus output an ON signal to the gain setting portion 112b. Also, when the second switching transistor circuit T2 is turned ON, a second photo coupler circuit PC2 is turned ON in the gain indicator receiver 112a to thus output an ON signal to the gain setting portion 112b.

The gain setting portion 112b is made up of a first inverter INV1, a first ON/OFF switch S1 whose ON/OFF is controlled by the first inverter INV1, a second inverter INV2, and a second ON/OFF switch S2 whose ON/OFF is controlled by the second inverter INV2. Respective one ends of the first ON/OFF switch S1 and the second ON/OFF switch S2 are connected to one input end of the output amplifier 109c. First to third resistor elements R1 to R3 are connected in series between an output end of the output amplifier 109c and a reference voltage terminal GND.

Other end of the first ON/OFF switch S1 is connected to a connection point between the first resistor element R1 and the second resistor element R2. Similarly, other end of the second ON/OFF switch S2 is connected to a connection point between the second resistor element R2 and the third resistor element R3.

In case resistance values of the first to third resistor elements R1 to R3 are set to 1 Ω respectively, the microprocessor MPU sends a signal to the gain indication transmitter 113b to execute following operations in accordance with the program.

Figure 56A:
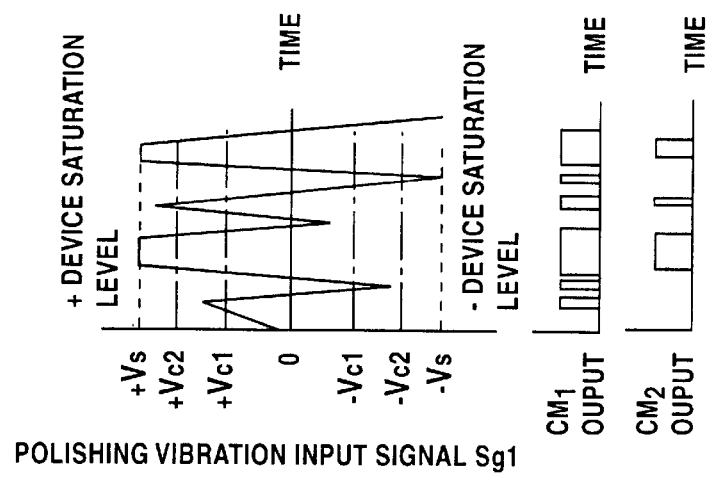
FIGS. 56A to 56C are waveform diagrams showing input signals to first and second comparators in a peak detector in the polishing end-point analyzer shown in FIG. 55.

First, if an amplitude of the polishing vibration signal from the output amplifier 109a, which is received via the input buffer amplifier 111a, is within the range between −Vc1 to +Vc1, as shown in FIG. 56A, for example, output signals of the first comparator CM1 and the second comparator CM2 are rendered zero.

Figure 56B:
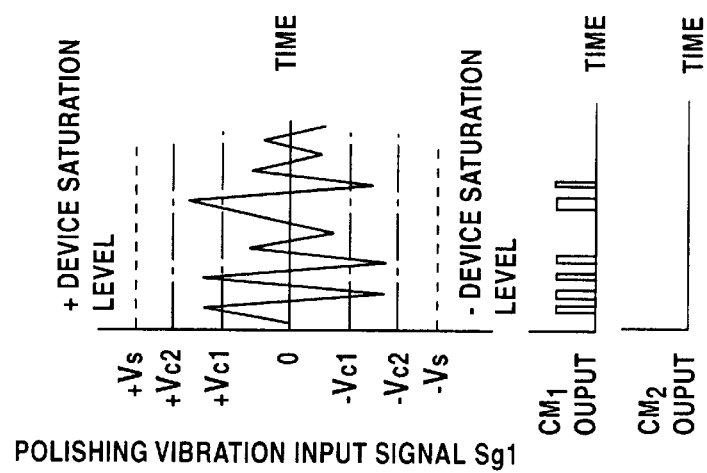

Then, if the amplitude of the polishing vibration signal from the output amplifier 109a, which is received via the input buffer amplifier 111a, is within the range between either −Vc1 to −Vc2 or +Vc1 to +Vc2, as shown in FIG. 56B, for example, the output signal of the first comparator CM1 may output a pulse signal in a period when an absolute value of an input signal Sg1 is in excess of Vc1. In this case, the output signal of the second comparator CM2 is rendered zero.

Figure 56C:
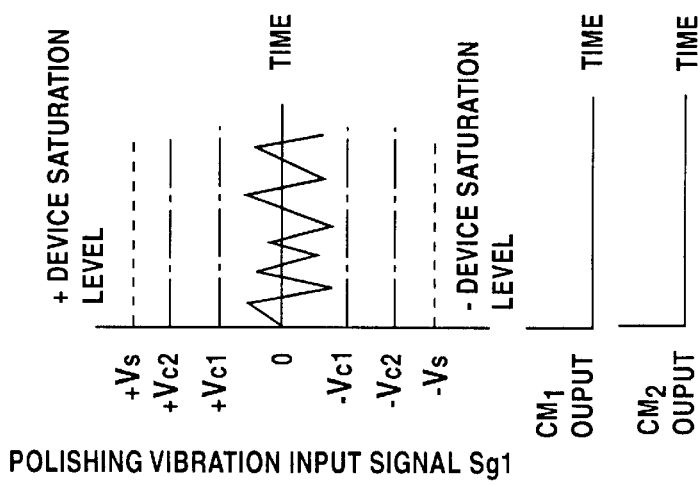

Further, if the amplitude of the polishing vibration signal from the output amplifier 109a, which is received via the input buffer amplifier 111a, is less than −Vc2 or more than +Vc2, as shown in FIG. 56C, for example, the output signal of the second comparator CM2 may output a pulse signal in a period when the absolute value of the input signal Sg1 exceeds Vc2. At the same time, the output signal of the first comparator CM1 may output a pulse signal in a period when the absolute value of the amplitude of the polishing vibration signal from the output amplifier 109c exceeds Vc1.

In this manner, if the signals being output from the first comparator CM1 and the second comparator CM2 are classified roughly, three situations shown in FIGS. 56A to 56C may be considered. If the pulse signal is output from the second comparator CM2, as shown in FIG. 56C, there is the case where the polishing vibration signal exceeds a device saturation level Vs.

Accordingly, stored in the memory circuit M is the program which can make both of the first and second switching transistor circuits T1, T2 turn OFF under the first condition that the output pulse signals of the first and second counters CT1, CT2 are not generated, then make both of the first and second switching transistor circuits T1, T2 turn ON under the second condition that the pulse signal is output from the first counter CT1 but the pulse signal is not output from the second counter CT2, and then make the first switching transistor circuit T1 turn ON and the second switching transistor circuit T2 turn OFF under the third condition that no pulse signal is output from the first and second counters CT1, CT2.

When the first switching transistor circuit T1 is turned ON, the first ON/OFF switch S1 is turned ON via the first photo coupler circuit PC1 and the first inverter INVL in the gain setting portion 112b. While, when the first switching transistor circuit T1 is turned OFF, the first ON/OFF switch S1 is turned OFF. Conversely, when the second switching transistor circuit T2 is turned ON, the second ON/OFF switch S2 is turned ON via the second photo coupler circuit PC2 and the second inverter INV2 and, when the second switching transistor circuit T2 is turned OFF, the second ON/OFF switch S2 is turned OFF in the gain setting portion 112b. In this case, it may be added to ON/OFF conditions of the first and second switching transistor circuits T1, T2 whether or not the number of pulses generated by the first comparator CM1 and the second comparator CM2 respectively per unit time exceeds a predetermined number.

Because the gain G of the output amplifier 109c can be given by Eq.(1), the relationship between ON/OFF of the first and second ON/OFF switches S1, S2 and the gain G of the output amplifier 109c can be given by Table II.

$$G=1+(R10/R11) \qquad (1)$$

Where R10 is a resistance value between—input end and output of the output amplifier 109c, and R11 is a resistance value between—input end of the output amplifier 109c and the reference voltage end GND.

TABLE 11

| S1 | ON | ON | OFF |
|---|---|---|---|
| S2 | OFF | OFF | ON |
| Gain | 1.5 | 2 | 3 |

In FIG. 55, a reference 116 denotes a power supply voltage supplying portion for supplying a voltage Vcc to the vibration detecting device 108, the input amplifier 109b, and the output amplifier 109c. In FIG. 53, a reference 115 denotes a motor for rotating the lower surface plate 2 according to the signal supplied from the polishing operation controller 100.

Out of a resistor Ro, a light emitting diode PD and a transistor Tr, all being connected in series between the reference voltage GND end and the voltage Vc end, the resistor Ro and the transistor Tr are provided in the first and second transistor switching circuits T1, T2. A base of the transistor Tr is connected to respective input ends of the first and second transistor switching circuits T1, T2.

In the first and second photo couplers PC1, PC2, a resistance RP and a light receiving device DE are connected in series between the reference voltage GND end and the voltage Vcc end, and the above light emitting diode PD is also arranged in parallel with the light receiving device DE. A connection point between the resistor RP and the light receiving device DE acts as an output end of the first and second photo couplers PC1, PC2. Both ends of the light emitting diode PD are connected to output ends of the first and second switching transistor circuits T1, T2 via the signal transmitting means 110 respectively.

As the object to be polished W being polished by the above polishing apparatus, there are wafers formed of silicon, germanium, compound semiconductor, etc., and conductive film, insulating film, metal film, etc. those being formed on the wafer, for example.

Subsequently, an operation of the above polishing apparatus will be explained hereinafter with taking polishing of the semiconductor wafer as an example.

Next, an operation of the above polishing apparatus will be explained hereinbelow.

At first, the polishing operation signal supplied from the polishing operation controller 100 to the shaft driving portion 107 moves the shaft 106 downward to bring the object to be polished W into contact with the abrasive cloth 101 and also rotates the upper surface plate 103 together with the enclosure 105. Concurrently, the polishing operation controller 100 makes the motor 115 drive so as to rotate the lower surface plate 102 and the nozzle 114 supply the abrasive liquid. Thus, polishing of the object to be polished W by the abrasive cloth 101 is commenced.

A signal SG output from the vibration detecting device 108 is input into the polishing end-point analyzer 111 at the time of starting the polishing through the input amplifier 109c, the bandpass filter 109b, the output amplifier 109c, and the vibration transmitting means 110. In the polishing end-point analyzer 111, an output signal Sg1 from the output amplifier 109c is amplified by the vibration input portion 111a, and the output signal Sg2 from the signal input portion 111a is also output to the peak detector 113a and the signal analyzer 111b.

Figure 57:
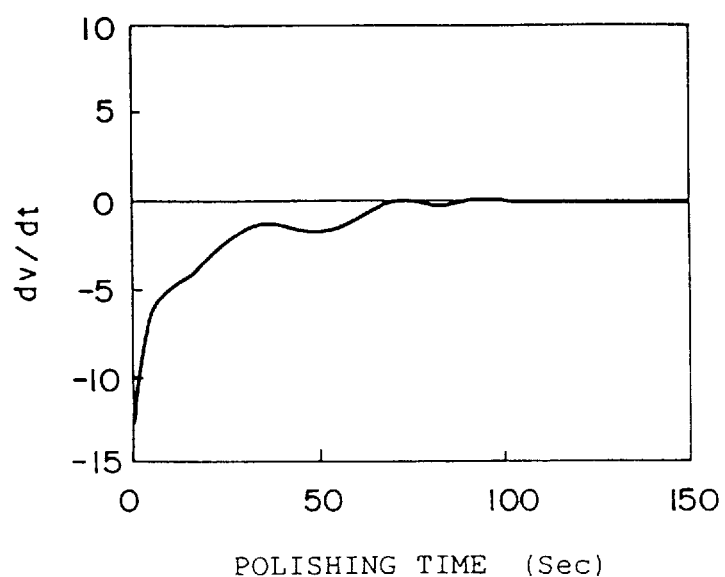
FIG. 57 is a chart showing change of differential value of a polishing vibration signal in the polishing end-point analyzer shown in FIG. 54.

The signal analyzer 111b analyzes change of the output signal Sg2 in time. When such change comes up to a predetermined level, the end-point controller 111c determines an end-point to output an end-point signal to the polishing operation controller 100. Then, the polishing operation controller 100 terminates an operation of the driving portion 107. The change of the output signal Sg2 in time may be given as a differential value, for example. The change shown in FIG. 57 can be derived.

In the gain indicator 113, the peak detector 113a measures the magnitude of the amplitude of the output signal Sg2 from the signal input portion 111a. If the magnitude of the amplitude is not appropriate, the gain indicator determining portion 113b outputs a gain adjusting signal to the gain indication transmitter 113c to supply it to the gain indication receiver 112a via the signal transmitting means 110. The gain indication receiver 112a outputs a gain modifying signal to the gain setting portion 112b. The gain setting portion 112b modifies the gain G of the output amplifier 109c.

In this manner, an end-point of polishing can be detected by the signal analyzer 111c and the end-point controller 111c based on the output signal Sg1 while optimizing the output signal of the output amplifier 109c.

Incidentally, the gain of the output amplifier 109c may be adjusted at plural stages by providing more than three comparators and counters respectively.

(Fifteenth embodiment)

Although the peak detector 113a has been composed of the comparators CM1, CM2 and the counters CT1, CT2 in the fourteenth embodiment, it is not limited to such configuration. For example, a circuit shown in FIG. 58 or FIG. 60 may be employed.

At first, a circuit shown in FIG. 58 will be explained hereinbelow.

Figure 58:
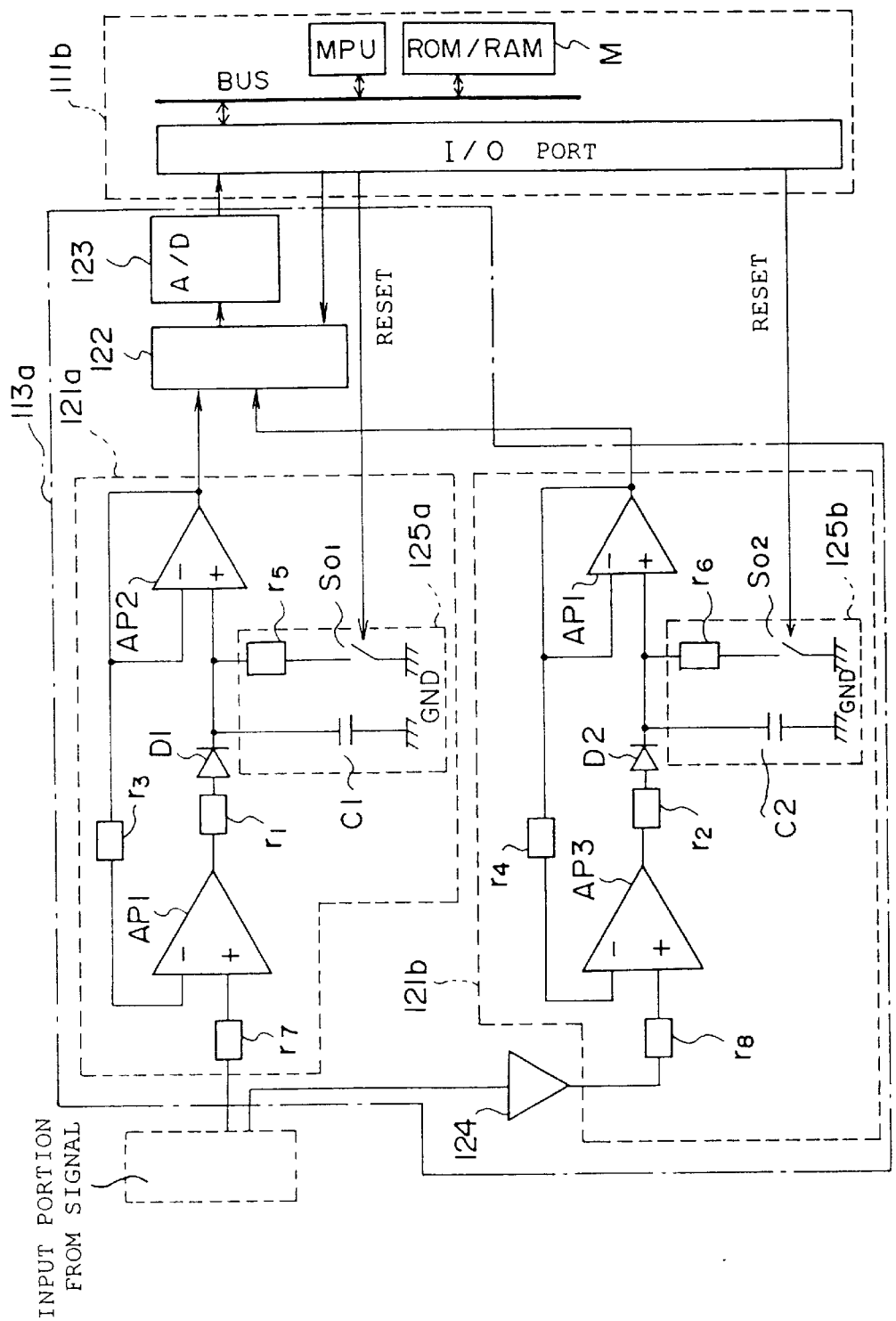
FIG. 58 is a circuit diagram showing a first example of a peak detector in a polishing end-point analyzer according to a fifteenth embodiment of the present invention.

In a peak detector 113a shown in FIG. 58, first and second peak holding circuits 121a, 121b for receiving an output signal of the signal input portion 111a are provided. Output ends of the first and second peak holding circuits 121a, 121b are connected to an input end of a multiplexer 122. An inverting amplifier 124 with an amplification factor 1 is connected between an input end of the second peak holding circuit 121b and an output end of the signal input portion 111a. Hence, the signal output from the signal input portion 111a is inverted and then input into the second peak holding circuit 121b.

Figure 59A:
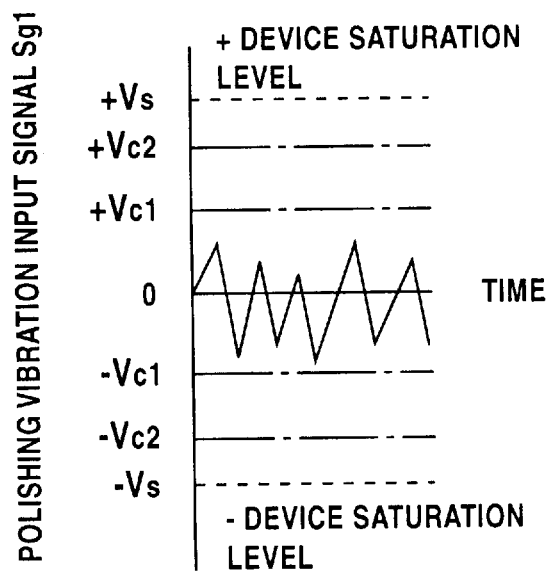
FIG. 59A is a waveform diagram showing an example of an input signal to the peak detector shown in FIG. 58.
Figure 59B:
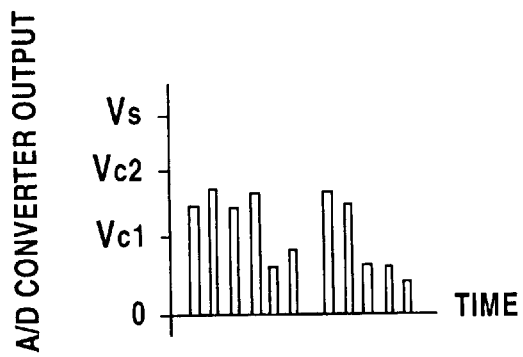
FIG. 59B is a waveform diagram showing an example of an output signal from the peak detector shown in FIG. 58.

The multiplexer 122 may select an output signal from either one of the first peak holding circuit 121a and the second peak holding circuit 121b based on a selection signal supplied from the gain indication determining portion 113b to output the output signal to an A/D converter 123. The A/D converter 123 may convert an analogue signal output from either the first peak holding circuit 121a or the second peak holding circuit 121b, as illustrated in FIG. 59A, into a digital signal, as illustrated in FIG. 59B, and then output the digital signal into the gain indication determining portion 113b. This analogue signal is the signal Sg2 being output from the signal input portion 111a.

If such peak detector 113a is installed, the gain indication determining portion 113b is programmed such that it may compare the amplitude and number of the pulse signal from the peak detector 113b with the data stored in the memory circuit M to determine the magnitude of the polishing vibration signal Sg2 and then output the signal to the gain indication transmitter 111b based on such decision. For instance, like the fourteenth embodiment, the first and second switching transistor circuits T1, T2 are turned OFF under the first condition that the first and second reference signal voltages are set to Vc1 and Vc2 and the peak value is smaller than Vc1, then both of the first and second switching transistor circuits T1, T2 are turned ON under the second condition that the absolute value of the peak value is between Vc1 and Vc2, and then the first switching transistor circuit T1 is turned ON and the second switching transistor circuit T2 is also turned OFF under the third condition that the peak value becomes larger than Vc2. In addition to the above conditions, such a condition may be additionally imposed that how many the absolute values of the peak value in excess of Vc1 or Vc2 can be detected every unit time.

In the first peak holding circuit 121a and the second peak holding circuit 121b, as shown in FIG. 58, for example, output ends of first operational amplifiers AP1, AP3 are connected to +input ends of second operational amplifiers AP2, AP4 via first resistors r1, r2 and rectifier diodes D1, D2 and also output ends of second operational amplifiers AP2, AP4 are connected to -input ends of the second operational amplifiers AP2, AP4 and the multiplexer 122. The second operational amplifiers AP2, AP4 and -input ends of the first operational amplifiers AP1, AP3 are also connected to each other via the second resistors r3, r4 respectively. In addition, CR circuits 125a, 125b are connected to output ends of the rectifier diodes D1, D2. In the CR circuits 125a, 125b, changes accumulated in a capacitor C1 or C2 are discharged through third resistors r5, r6, when a reset switche $S_{01}$, $S_{02}$ connected to the CR circuits 125a, 125b in series is closed temporarily ON according to reset signals supplied from the gain indication determining portion 111b. Under the assumption that an OFF time of the reset switches $S_{01}$, $S_{02}$ is set to 100 ms, for example, the capacitor C1, C2 can be charged by turning the reset switches $S_{01}$, $S_{02}$ OFF. Thus, the peak value of the signal from the signal input portion 111a can be detected every approximately 100 ms.

Figure 60:
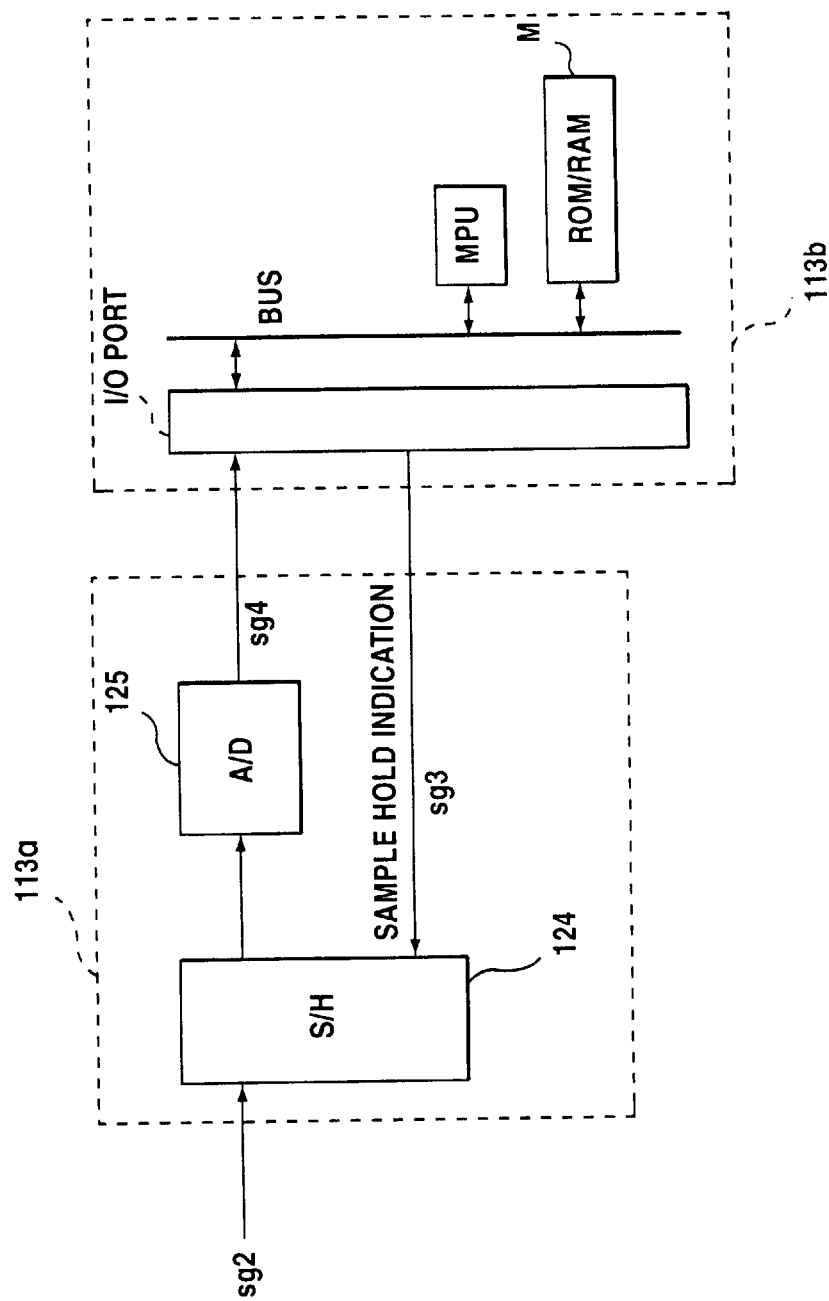
FIG. 60 is a circuit diagram showing a second example of a peak detector in the polishing end-point analyzer according to the fifteenth embodiment of the present invention.

In FIG. 60, references r7, r8 denote fourth resistors which are connected to +input ends of the first operational amplifiers AP1, AP3.

Next, a circuit shown in FIG. 60 will be explained. Examples of an output signal waveform of the signal input portion 113a and an output signal waveform of the A/D converter 123 are shown in FIG. 7.

Figure 61A:
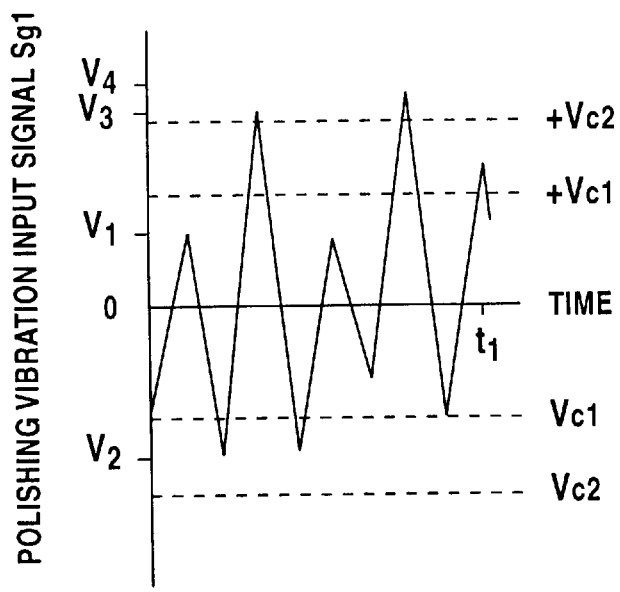
FIG. 61A is a waveform diagram showing an example of an input signal to the peak detector shown in FIG. 60.
Figure 61B:
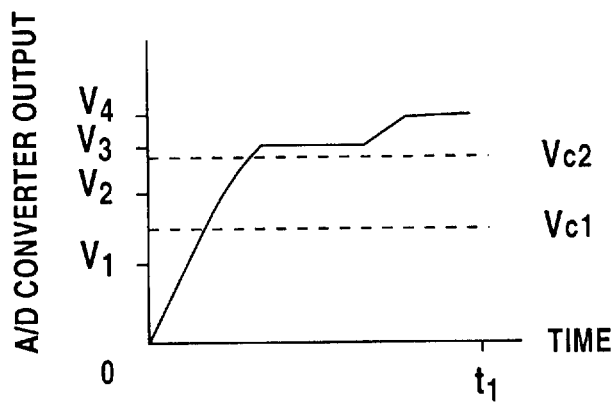
FIG. 61B is a waveform diagram showing an example of an output signal from the peak detector shown in FIG. 60.

In FIG. 60, in the peak detector 113a, a sample hold circuit 124 and an A/D converter 125 are connected in series between the output end of the signal input portion 111a and the gain indication determining portion 113b. The sample hold circuit 124 is so constructed that, when a sample hold indication signal Sg3 is input from the gain indication determining portion 113b, as shown in FIG. 61A, for example, it can hold the signal Sg2 from the signal input portion ills for a predetermined time, as shown in FIG. 61B, and then output a maximum amplitude (voltage) of the held signal to the gain indication determining portion 113b via the A/D converter 125.

If such peak detector 113a is employed, the gain indication determining portion 113b is programmed to accumulate data of the output signal Sg4 supplied from the A/D converter 125, then compare the data stored in the memory circuit M with the signal Sg4 in magnitude, and then supplies an output signal to the gain indication transmitter 113c according to such decision. For instance, both the first and second switching transistor circuits T1, T2 are turned OFF under the condition that the reference voltage is set to two values, i.e., Vc1 and Vc2, and the signal Sg4 being smaller than Vc1 is input into the gain indication determining portion 113b within a predetermined time, then both the first and second switching transistor circuits T1, T2 are turned ON under the condition that data Sg4 resides between Vc1 and Vc2 within a predetermined time, and then the first switching transistor circuit T1 is turned ON and the second switching transistor circuit T2 is turned OFF under the condition that the data Sg4 which becomes larger than Vc2 within a predetermined time is present.

The configurations of the polishing apparatus other than the peak detector 111a are similar to those in the fourteenth embodiments.

(Sixteenth embodiment)

Figure 62:
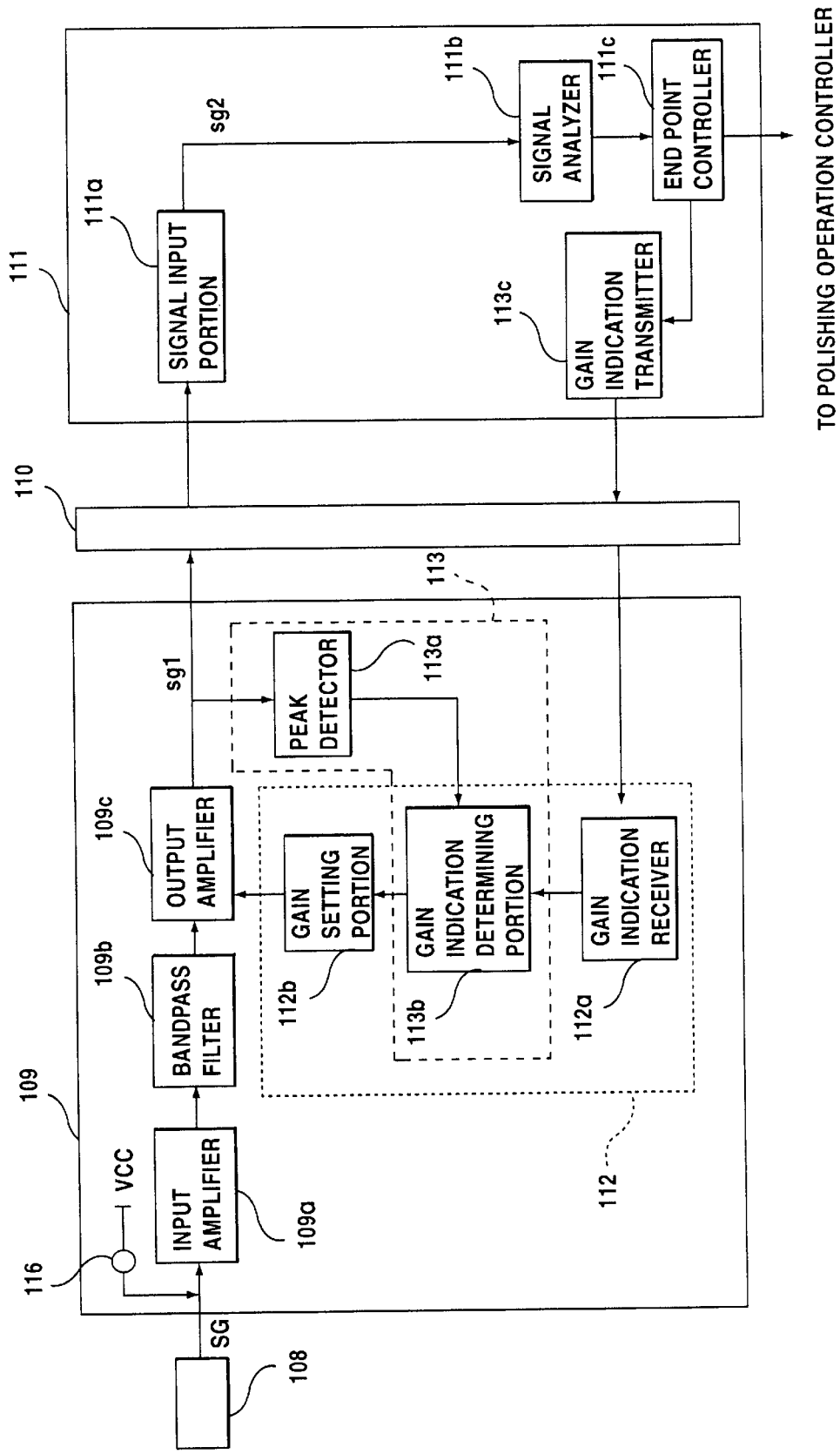
FIG. 62 is a block circuit diagram showing a configuration from a vibration detecting device to a polishing end-point analyzer of a polishing apparatus according to a sixteenth embodiment of the present invention.

The peak detector 113a has been provided only in the polishing end-point analyzer 113 in the fourteenth embodiment, but such peak detector may also be provided in the vibration detector 109, as shown in FIG. 62.

In FIG. 62, an input end of the peak detector 113a shown in FIGS. 55, 6, or 8, for example, is connected to an output end of the output amplifier 109c in the vibration detector 109. Also, like the first and fifteenth embodiments, the input end of the peak detector 113a is connected to an input end of the gain indication determining portion 113b which is then connected directly to the gain setting portion 112a.

An output end of the end-point controller 111c in the polishing end-point analyzer 111 is connected to not only an input end of the polishing operation controller 100 but also an input end of the gain indication receiver 112a via the gain indication transmitter 113c and the signal transmitting means 110 provided in the polishing end-point analyzer 111 and the gain indication receiver 112a provided in the vibration detector 109. The end-point controller 111c may instruct the gain indication determining portion 113b to commence gain indication decision before it detects the end-point of polishing, e.g., when it detects the end-point of polishing concurrently with start of polishing or after a predetermined time period elapsed from start of polishing. The end-point controller 111c may also instruct to terminate gain indication operation when it detects the end-point of polishing.

As evident from comparison, it is common to the circuits shown in FIGS. 54 and 52 in respects that peaks of the polishing vibration signal Sg1 being output from the output amplifier 109c is detected by the peak detector 113a and that the gain can be optimized by the gain indication determining portion 113b and the gain setting portion 112b based on the detection results. The basic operation of the circuit shown in FIG. 62 is similar to those in the first and fifteenth embodiments. However, the circuit shown in FIG. 62 is different from the circuit shown in FIG. 54 in structure in that start and stop of operation of the gain indication determining portion 113b is instructed by the end-point controller 111c via the gain indication transmitter 113c, the signal transmitting means 110, and the gain indication receiver 112a and that the polishing vibration signal Sg1 is input into the peak detector 113c without the signal transmitting means 110 and the signal input portion 111a.

(Seventeenth embodiment)

Concrete examples of the signal transmitting means 110 in the above-mentioned first to sixteenth embodiments will be explained hereunder. As the signal transmitting means 110, radio system, rotator, optical communication device, etc. described in the following, for example, can be listed.

First, the signal transmitting means 110 using the radio system will be explained with reference to FIG. 63.

Figure 63:
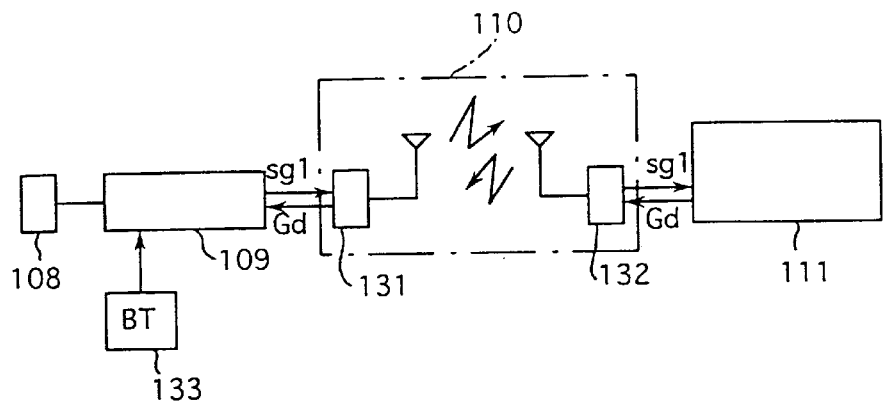
FIG. 63 is a block circuit diagram showing a first example of a signal transmitting means between a vibration detector and a polishing end-point analyzer of a polishing apparatus according to a seventeenth embodiment of the present invention.

In FIG. 63, a first radio transmitter/receiver 131 is connected to an input/output end of the vibration detector 109. A second radio transmitter/receiver 132 is connected to an input/output end of the polishing end-point analyzer 111.

Accordingly, the signal Sg1 being output from the output amplifier 109c in the vibration detector 109 is converted into a radio signal in the first radio transmitter/receiver 131 and then transmitted to the second radio transmitter/receiver 132. The second radio transmitter/receiver 132 then converts a received signal into the signal Sg1 to output to the signal input portion 111a in the polishing end-point analyzer 111. While, the signal Gd being output from the gain indication transmitter 113c in the polishing end-point analyzer 111 is converted into a radio signal by the second radio transmitter/receiver 132 and then transmitted to the first radio transmitter/receiver 131. The first radio transmitter/receiver 131 restores the received radio signal into the signal Gd to input into the gain indication receiver 112a in the vibration detector 109. In FIG. 63, a reference 132 denotes a battery connected to a power supply voltage supplying portion 116 in the vibration detector 109.

In turn, the signal transmitting means 110 employing slip ring and brush or rotary connector or radio transmitter/receiver will be explained with reference to FIG. 64 hereunder. The slip ring and brush and the rotary connector have a rotator and a contact respectively.

Figure 64:
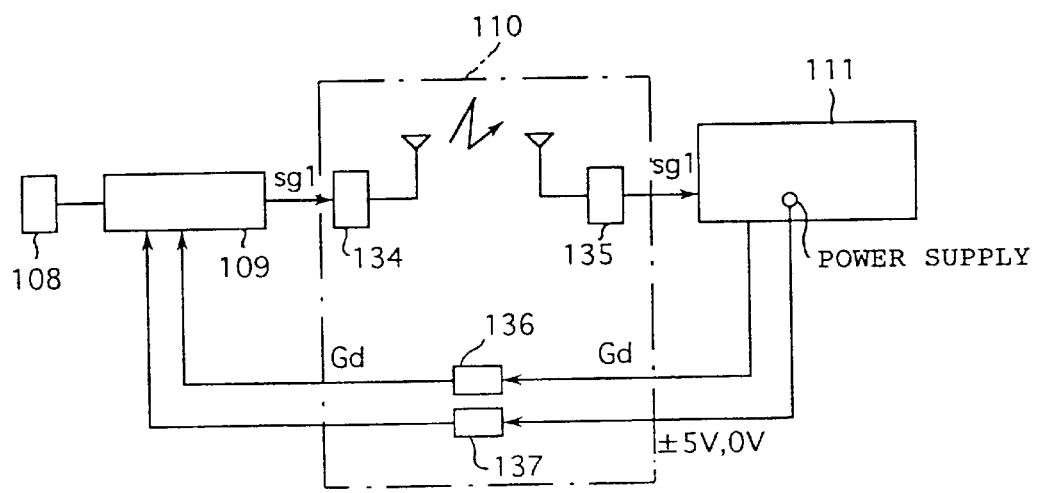
FIG. 64 is a block circuit diagram showing a second example of a signal transmitting means between the vibration detector and the polishing end-point analyzer of the polishing apparatus according to the seventeenth embodiment of the present invention.

In FIG. 64, a radio transmitter 134 is connected to an output end of the vibration detector 109 and a radio receiver 135 is connected to an input end of the polishing end-point analyzer 111. An output end of the polishing end-point analyzer 111 and an input end of the vibration detector 109 are connected to each other via a first slip ring 136. A power supply of the polishing end-point analyzer 111 is connected to a power supply voltage supplying portion 116 in the vibration detector 109 via a second slip ring 137.

Accordingly, the signal Sg1 being output from the output amplifier 109c in the vibration detector 109 is converted into a radio signal in the radio transmitter 134 and then transmitted to the radio receiver 135. The radio receiver 135 then converts a received signal into the signal Sg1 to output to the signal input portion 111a in the polishing end-point analyzer 111. While, the signal Gd being output from the gain indication transmitter 113c in the polishing end-point analyzer 111 is input into the gain indication receiver 112 in the vibration detector 109 via a first slip ring 136.

In addition, a power supply of the signal input portion 111a in the polishing end-point analyzer 111 is connected to the power supply voltage supplying portion 116 in the vibration detector 109 via the second slip ring 137.

Figure 65:
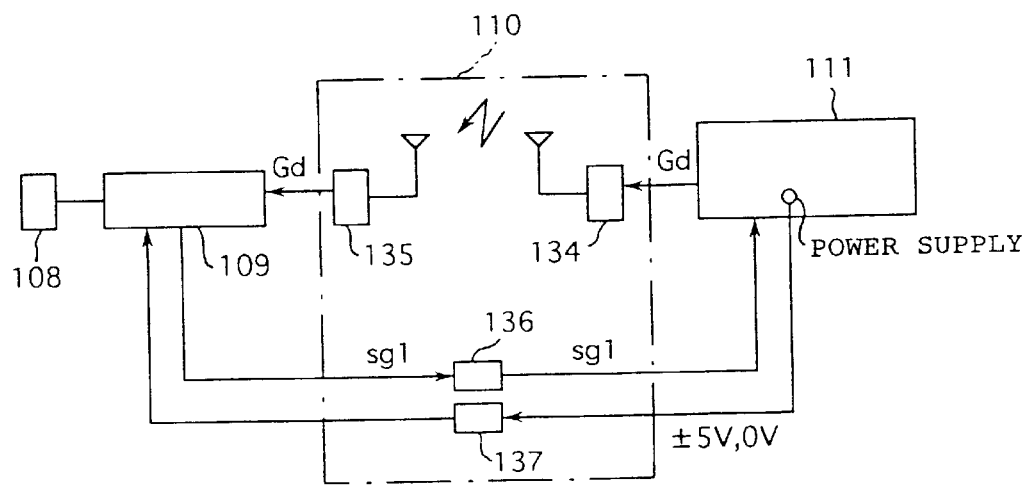
FIG. 65 is a block circuit diagram showing a third example of a signal transmitting means between the vibration detector and the polishing end-point analyzer of the polishing apparatus according to the seventeenth embodiment of the present invention.

In FIG. 65, an output terminal of the gain indication transmitter 113c in the polishing end-point analyzer 111 is connected to the radio transmitter 134. An input terminal of the gain indication receiver 112a in the vibration detector 109 is connected to the radio receiver 135. Thus, the output signal Sg1 of the gain indication transmitter 113c is input into the gain indication receiver 112a by radio. An output end of the output amplifier 109c in the vibration detector 109 is connected to the signal input portion 111a in the polishing end-point analyzer 111 via the first slip ring 136.

In FIGS. 63 to 65, like references refer to like parts or elements.

Next, antennas connected to the radio transmitter/receiver described above are arranged as follows, for example.

Figure 66A:
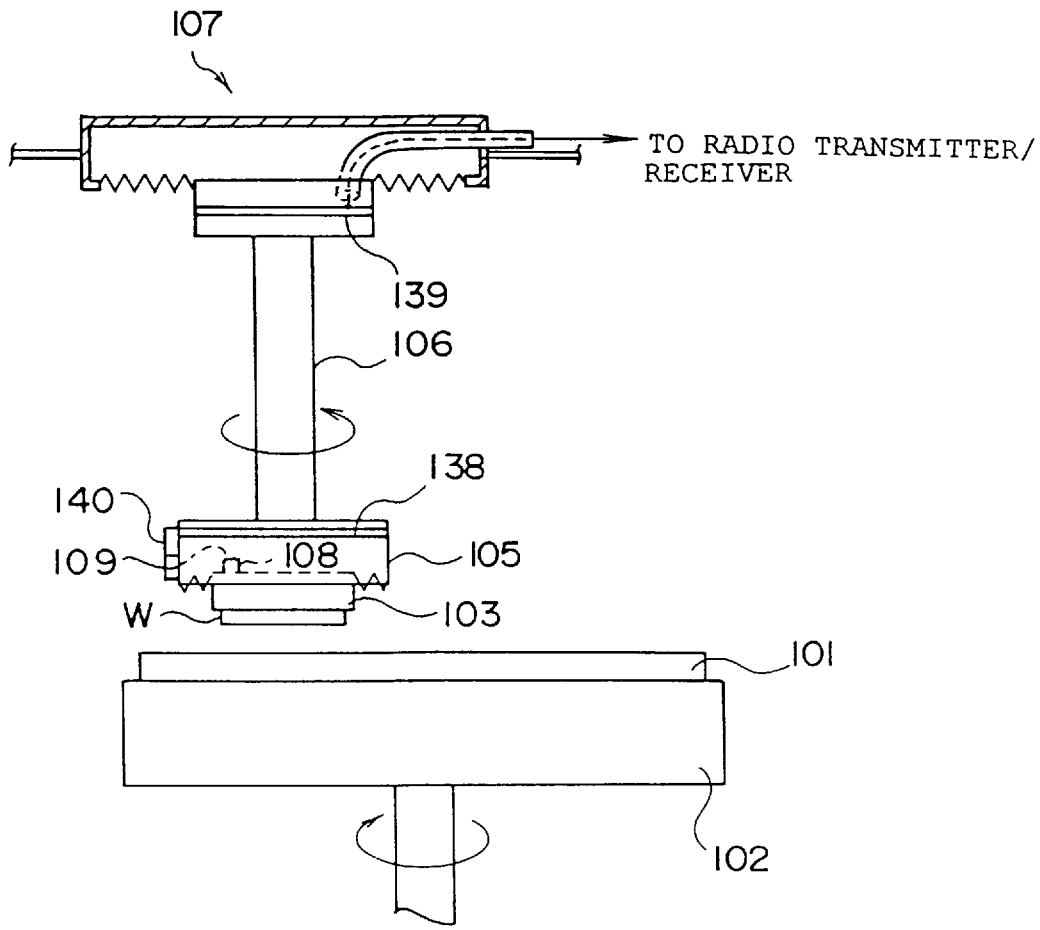
FIGS. 66A and 66B are views showing a placement of antennas employed in the signal transmitting means shown in FIGS. 63 to 65.
Figure 66B:
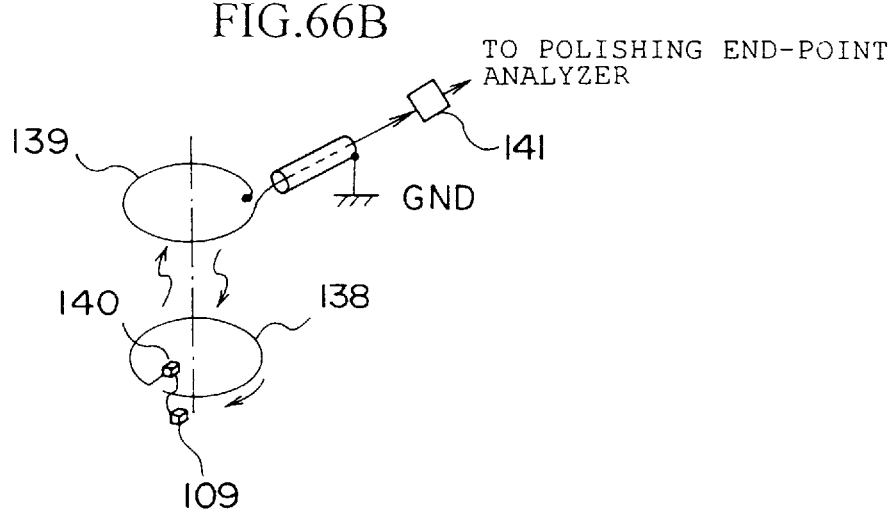

As shown in FIGS. 66A and 66E, a first annular antenna 138 is attached to an outer peripheral surface of the enclosure 105 for supporting the upper surface plate 103 and connected to a radio transmitter/receiver 140 on the vibration detector 109 side. A second annular antenna 139 is attached to the shaft driving portion 107 and connected to a radio transmitter/receiver 140 on the polishing end-point analyzer 111 side.

Figure 67:
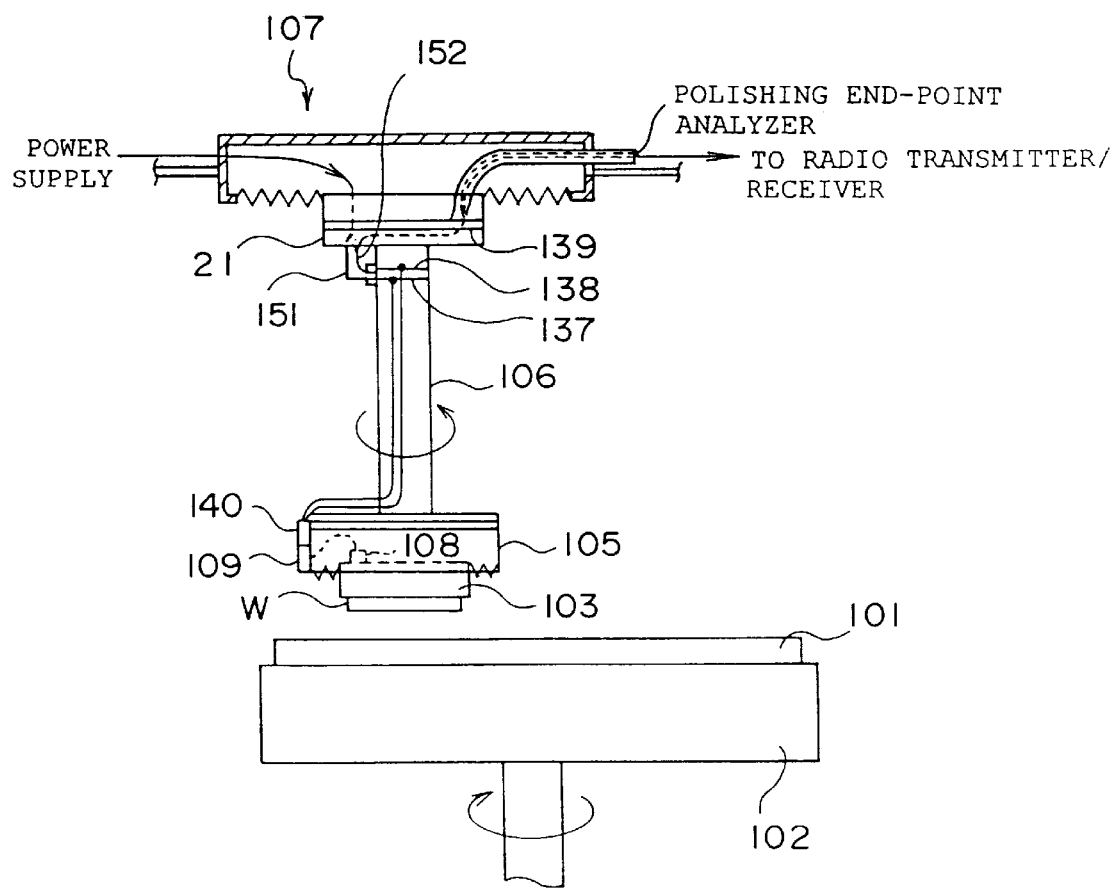
FIG. 67 is a side view showing placement of a slip ring employed in the signal transmitting means shown in FIGS. 63 to 65.

As shown in FIG. 67, first and second slip rings 136, 137 shown in FIGS. 64 and 65 are attached to an outer peripheral surface of the shaft 106 in an annular fashion. The first and second slip rings 136, 137 connected to the vibration detector 109 are connected to the polishing end-point analyzer 111 via first and second brushes 151, 152.

Figure 68:
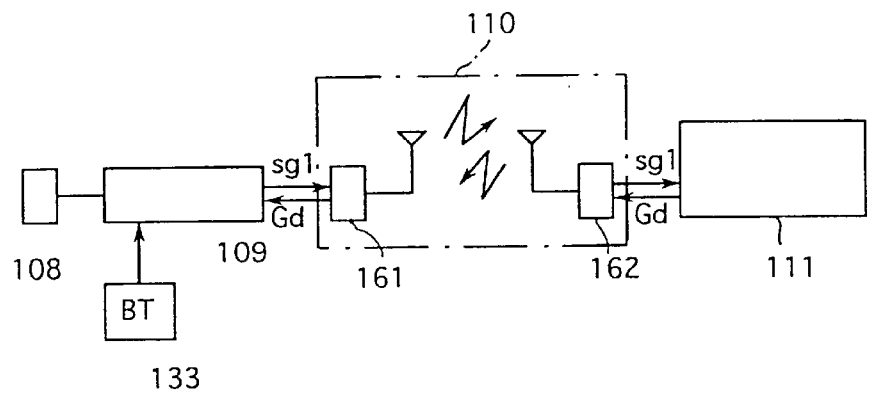
FIG. 68 is a block circuit diagram showing a first example of an optical communication device used as the signal transmitting means between the vibration detector and the polishing end-point analyzer of the polishing apparatus according to the seventeenth embodiment of the present invention.
Figure 69:
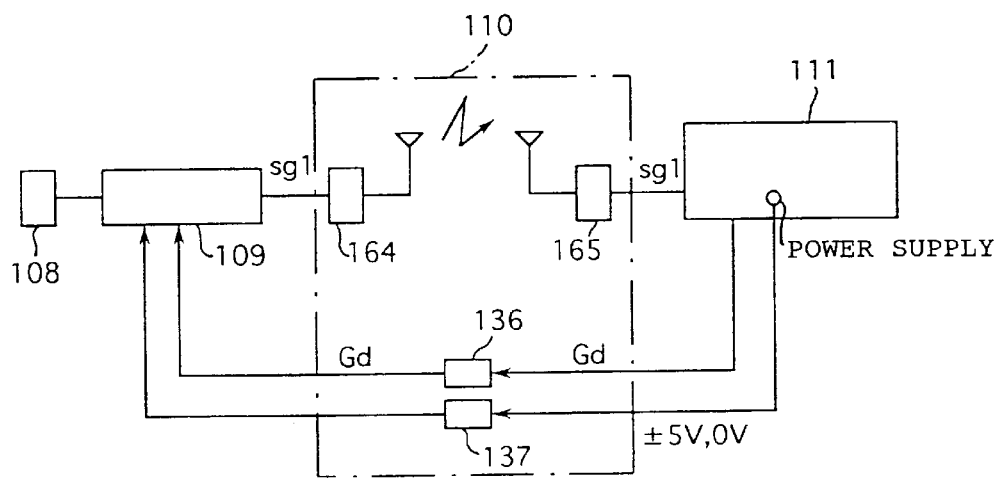
FIG. 69 is a block circuit diagram showing a second example of an optical communication device used as the signal transmitting means between the vibration detector and the polishing end-point analyzer of the polishing apparatus according to the seventeenth embodiment of the present invention.
Figure 70:
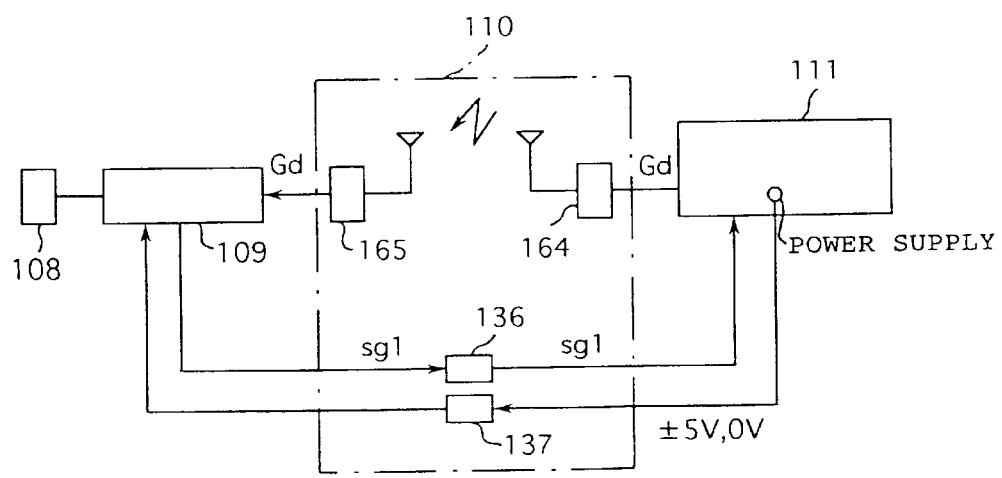
FIG. 70 is a block circuit diagram showing a third example of an optical communication device used as the signal transmitting means between the vibration detector and the polishing end-point analyzer of the polishing apparatus according to the seventeenth embodiment of the present invention.

The first and second radio transmitter/receivers 131, 132 have been utilized in FIG. 63, but first and second optical transmitter/receivers 161, 162 may be employed in place of these radio transmitter/receivers, as shown in FIG. 68. Furthermore, the radio transmitter 134 and the radio receiver 135 have been employed in FIGS. 64 and 65, but an optical transmitter 164 and an optical receiver 165 may be employed instead of these radio transmitter and receiver, as shown in FIGS. 17 and 18. Incidentally, in FIGS. 16 to 18, like references as those in FIGS. 63 to 65 denote like parts or elements.

What is claimed is:

1. A polishing apparatus comprising:
   a first surface plate on which an abrasive cloth is placed;
   a first driving mechanism for rotating said first surface plate;
   a second surface plate for supporting a object to be polished;
   a second driving mechanism for rotating said second surface plate over said abrasive cloth;
   a vibration detecting device attached on said second surface plate;
   an amplifier for amplifying a first signal being input from said vibration detecting device to output a second signal;
   a gain indicator for determining unsuitableness of gain of said amplifier based on a magnitude of said second signal output from said amplifier and then indicating correction of said gain;
   a gain adjuster for adjusting gain of said amplifier based on a gain correction signal output from said gain indicator;
   a polishing end-point analyzing portion for determining an end-point of polishing based on change in said second signal; and
   a control portion for terminating drive of said first surface plate by virtue of said first driving mechanism based on a polishing end-point signal output from said polishing end-point analyzing portion and also terminating drive of said second surface plate by virtue of said second driving mechanism.

2. A polishing apparatus according to claim 1, wherein said gain indicator contains a plurality of reference values to determine said magnitude of said second signal, and modifies said gain of said amplifier based on comparison result between said plurality of reference values and said second signal.

3. A polishing apparatus according to claim 1, wherein said polishing end-point analyzing portion and said amplifier are connected via a signal transmitting means.

4. A polishing apparatus according to claim 1, wherein an input end of said gain indicator is electrically connected to an output end of said amplifier via a signal transmitting means.

5. A polishing apparatus according to claim 3 or 4, wherein said signal transmitting means consists of a rotator and a contact which is brought into contact with said rotator.

6. A polishing apparatus according to claim 3 or 4, wherein said signal transmitting means consists of a plurality of radio systems.

7. A polishing apparatus according to claim 3 or 4, wherein said signal transmitting means consists of an optical communication device.

8. A polishing apparatus according to claim 1, wherein an input end of said gain indicator is directly connected to an output end of said amplifier.

9. A polishing apparatus according to claim 1, wherein said gain indicator comprises a peak detector for detecting peaks of waveform of said second signal, and a gain indication determining portion for outputting said gain correction signal to said gain setting portion based on a peak signal output from said peak detector if a magnitude of said second signal is not suitable.

10. A polishing apparatus according to claim 1, wherein said peak detector comprises a peak holding circuit for holding a peak value of waveform of said second signal, and an A/D converter connected to an output end of said peak holding circuit.

11. A polishing apparatus according to claim 1, wherein said peak detector comprises a sample hold circuit for holding a maximum value of waveform of said second signal per unit time, and an A/D converter connected to an output end of said sample hold circuit.

12. A polishing apparatus according to claim 1, wherein said peak detector comprises a plurality of comparators, voltage applying means for applying reference set voltages having different amplitudes to said plurality of comparators independently, and counters connected to output ends of said plurality of comparators.

13. A polishing method comprising the steps of:

starting polishing of a object to be polished by moving said object to be polished being supported by a second surface plate on an abrasive cloth being mounted on a first surface plate;

amplifying by an amplifier a first output signal of polishing vibration which is detected by a vibration detecting device being attached to said second surface plate;

determining suitableness of gain of said amplifier based on a magnitude of said second signal output from said amplifier, and modifying a magnitude of said gain of said amplifier if said gain is not set to a suitable magnitude; and determining an end-point of polishing based on change in said second signal being output from said amplifier, and terminating polishing by stopping movement of said first surface plate.

14. A polishing method according to claim 13, wherein suitableness in magnitude of said gain of said amplifier is determined based on whether or not an amplitude of waveform of said second signal does not reside in a set range.

15. A polishing method according to claim 13, wherein suitableness in magnitude of said gain of said amplifier is determined based on whether or not a maximum value of waveform of said second signal per unit time resides in a predetermined range.

* * * * *